(12) United States Patent
Silverstein et al.

(10) Patent No.: US 7,458,687 B2
(45) Date of Patent: *Dec. 2, 2008

(54) HIGH EFFICIENCY DIGITAL CINEMA PROJECTION SYSTEM WITH INCREASED ETENDUE

(75) Inventors: Barry D. Silverstein, Rochester, NY (US); James R. Kircher, Mendon, NY (US); Joseph R. Bietry, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/739,761

(22) Filed: Apr. 25, 2007

(65) Prior Publication Data

US 2007/0273796 A1    Nov. 29, 2007

Related U.S. Application Data

(60) Provisional application No. 60/808,813, filed on May 26, 2006.

(51) Int. Cl.
*G03B 21/14* (2006.01)
*G03B 21/00* (2006.01)
*G03B 21/28* (2006.01)
*G02F 1/1335* (2006.01)
*H04N 5/74* (2006.01)

(52) U.S. Cl. .............................. 353/20; 353/31; 353/33; 353/99; 349/5; 348/751; 348/752

(58) Field of Classification Search .................. 353/20, 353/31, 33, 34, 81, 98, 99, 102, 119; 349/5, 349/117; 348/751, 752; 359/483, 486, 488; 358/1.2, 60

See application file for complete search history.

(56) References Cited

U.S. PATENT DOCUMENTS 4,864,390 A    9/1989    McKechnie et al.

(Continued)

FOREIGN PATENT DOCUMENTS

EP    1 398 972 A1    3/2004

(Continued)

OTHER PUBLICATIONS

Matthijs H. Keuper, et al., *P-126: Ultra-Compact LED based Image Projector for Portable Applications*, SID 03 Digest, pp. 713-715.

(Continued)

*Primary Examiner*—Melissa Jan Koval
(74) *Attorney, Agent, or Firm*—Peyton C. Watkins

(57) ABSTRACT

A digital cinema projection apparatus having an illumination source with a first etendue value for providing polarized polychromatic light. A first lens element lies in the path of the polarized polychromatic light for forming a substantially telecentric polarized polychromatic light beam. A color separator separates the telecentric polarized polychromatic light beam into at least two telecentric color light beams. At least two transmissive spatial light modulators modulate the two telecentric color light beams. There is an etendue value associated with each spatial light modulator. The etendue value is within 15% or greater than the first etendue value corresponding to the illumination source. A color combiner combines the modulated color beams along a common optical axis, forming a multicolor modulated beam thereby; and a projection lens directs the multicolor modulated beam toward a display surface.

58 Claims, 34 Drawing Sheets

U.S. PATENT DOCUMENTS

| | | | |
|---|---|---|---|
| 5,758,940 | A | 6/1998 | Ogino et al. |
| 5,798,819 | A | 8/1998 | Hattori et al. |
| 5,808,795 | A | 9/1998 | Shimomura et al. |
| 5,889,614 | A | 3/1999 | Cobben et al. |
| 5,918,961 | A | 7/1999 | Ueda |
| 6,010,221 | A | 1/2000 | Maki et al. |
| 6,062,694 | A | 5/2000 | Oikawa et al. |
| 6,113,239 | A | 9/2000 | Sampsell et al. |
| 6,231,192 | B1 | 5/2001 | Konno et al. |
| 6,431,709 | B1 | 8/2002 | Tiao et al. |
| 6,452,724 | B1 | 9/2002 | Hansen et al. |
| 6,505,940 | B1 | 1/2003 | Gotham et al. |
| 6,585,378 | B2 | 7/2003 | Kurtz et al. |
| 6,637,888 | B1 | 10/2003 | Haven |
| 6,676,260 | B2 | 1/2004 | Cobb et al. |
| 6,758,565 | B1 | 7/2004 | Cobb et al. |
| 6,808,269 | B2 | 10/2004 | Cobb |
| 6,831,722 | B2 | 12/2004 | Ishikawa et al. |
| 6,924,849 | B1 | 8/2005 | Clifton et al. |
| 6,930,797 | B2 | 8/2005 | Ramanujan et al. |
| 7,198,373 | B2 | 4/2007 | Silverstein et al. |
| 2006/0061862 | A1 | 3/2006 | Mi et al. |
| 2007/0273797 | A1 * | 11/2007 | Silverstein et al. .......... 348/752 |
| 2007/0273798 | A1 * | 11/2007 | Silverstein et al. .......... 348/752 |

FOREIGN PATENT DOCUMENTS

| | | |
|---|---|---|
| EP | 1 492 354 A2 | 12/2004 |
| WO | 2006/041596 A2 | 4/2006 |

OTHER PUBLICATIONS

Hüseyin Murat, et al., *Increased lumens per étendue by combining pulsed LED's, Projection Displays XI*, edited by Ming H. Wu, Proceedings of SPIE vol. 5740, pp. 1-12.

*Polarization Engineering for LCD Projection*, by Michael G. Robinson, Jianmin Chen, Gary D. Sharp, John Wiley& Sons Ltd, England, 2005, p. 41.

*Projection Display Throughput: Efficiency of Optical Transmission and Light Source Collection* by F. E. Doany et al. in IBM J. Research Development vol. 42, No. 3 / 4 May/Jul. 1998, pp. 387-399.

* cited by examiner

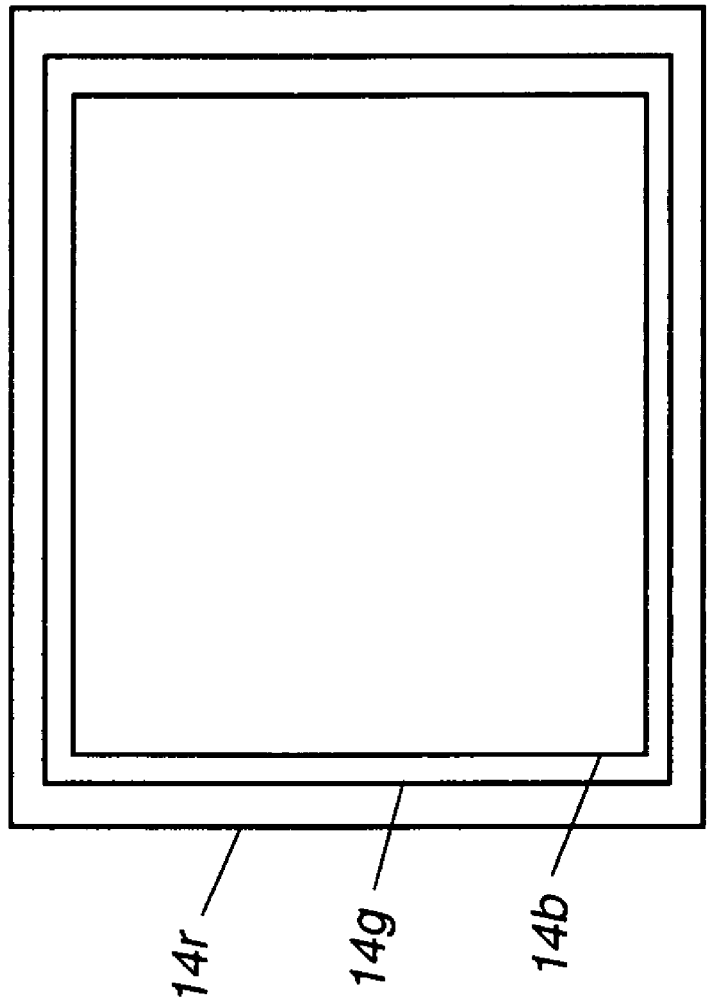

HIGH EFFICIENCY DIGITAL CINEMA PROJECTION SYSTEM WITH INCREASED ETENDUE

CROSS REFERENCE TO RELATED APPLICATIONS

Reference is made to and priority claimed from U.S. Provisional Application Ser. No. 60/808,813, filed May 26, 2006, entitled HIGH EFFICIENCY DIGITAL CINEMA PROJECTION SYSTEM WITH INCREASED ENTENDUE.

The present application also relates to U.S. Pat. No. 7,198,373, issued on Apr. 3, 2007, by Joshua M. Cobb, David Kessler, and Barry Silverstein, and entitled DISPLAY APPARATUS USING LCD PANEL. The contents of U.S. Pat. No. 7,198,373 are hereby incorporated by reference in their entirety.

FIELD OF THE INVENTION

This invention generally relates to electronic projection and more particularly relates to an electronic projection apparatus using multiple transmissive light modulator panels for forming a full color projection image.

BACKGROUND OF THE INVENTION

With the advent of digital cinema and related electronic imaging opportunities, considerable attention has been directed to development of electronic projection apparatus. In order to provide a competitive alternative to conventional cinematic-quality film projectors, digital projection apparatus must meet high standards of performance, providing high resolution (2048×1080 pixels or higher), wide color gamut, high brightness (5000 lumens or greater), and frame-sequential contrast ratios exceeding 1,500:1.

Liquid-Crystal (LC) technology has been successfully harnessed to serve numerous display applications, ranging from monochrome alphanumeric display panels, to laptop computers, and even to large-scale full color displays. As is well known, an LC device forms an image as an array of pixels by selectively modulating the polarization state of incident light for each corresponding pixel. Continuing improvements of LC technology have yielded the benefits of lower cost, improved yields and reliability, and reduced power consumption and with steadily improved imaging characteristics, such as resolution, speed, and color.

While numerous different types of pixilated LC devices have been developed, any specific LC device is constructed according to one of two basic architectures:

The microdisplay architecture provides a pixel control structure that is based on high-density microlithography similar to that used for integrated circuit devices fabricated on semiconductor wafers. This includes LCOS (Liquid Crystal on Silicon) and HTPS (High Temperature Polysilicon) Transmissive LCDs, where the pixel structures are less than 50 um, typically on the order of 8-20 um.

The direct view TFT (Thin-Film Transistor) architecture, where the pixel control structure is formed on a transparent substrate, generally amorphous silicon (glass) and the pixel size is visible to the eye (approximately 50 um).

In the first basic LC architecture, LCOS takes advantage of miniaturization and the utilization of microlithographic technologies to fabricate highly dense spatial light modulators in which the liquid crystal light-modulating material is sealed against the structured backplane of a silicon circuit. Essentially, LCOS fabrication combines LC design techniques with complementary metal-oxide semiconductor (CMOS) manufacturing processes.

LCOS LCDs appear to have some advantages as spatial light modulators for high-quality digital cinema projection systems. These advantages include a manageable device size (up to about 1.7" diagonal), small gaps between pixels, and favorable device yields. Using LCOS technology, LC chips having imaging areas typically smaller than one square inch are capable of forming images having several million pixels. The relatively mature level of silicon etching technology has proved to be advantageous for the rapid development of LCOS devices exhibiting high speeds and excellent resolution. LCOS devices have been used as spatial light modulators in applications such as rear-projection television and business projection apparatus.

Referring to FIG. 1A, there is shown a simplified block diagram of a conventional electronic projection apparatus 10 using LCOS LCD devices. Each color path (r=Red, g=Green, b=Blue) uses similar components for forming a modulated light beam. Individual components within each path are labeled with an appended r, g, or b, appropriately. Following the red color path, a red light source 20r provides unmodulated light, which is conditioned by uniformizing optics 22r to provide a uniform illumination. A polarizing beamsplitter 24r directs light having the appropriate polarization state to a spatial light modulator 30r, which selectively modulates the polarization state of the incident red light over an array of pixel sites. The action of spatial light modulator 30r forms the red component of a full color image. The modulated light from this image, transmitted along an optical axis $O_r$ through polarizing beamsplitter 24r, is directed to a dichroic combiner 26, typically an X-cube or a Philips prism. Dichroic combiner 26 combines the red, green, and blue modulated images from separate optical axes $O_r/O_g/O_b$ to form a combined, multicolor image for a projection lens 32 along a common optical axis O for projection onto a display surface 40, such as a projection screen. Optical paths for blue and green light modulation are similar. Green light from green light source 20g, conditioned by uniformizing optics 22g is directed through a polarizing beamsplitter 24g to a spatial light modulator 30g. The modulated light from this image, transmitted along an optical axis $O_g$, is directed to dichroic combiner 26. Similarly, blue light from blue light source 20b, conditioned by uniformizing optics 22b is directed through a polarizing beamsplitter 24b to a spatial light modulator 30b. The modulated light from this image, transmitted along an optical axis $O_r$, is directed to dichroic combiner 26.

Among examples of electronic projection apparatus that utilize LCOS LCD spatial light modulators with an arrangement similar to that of FIG. 1A are those disclosed in U.S. Pat. No. 5,808,795 (Shimomura et al.); U.S. Pat. No. 5,798,819 (Hattori et al.); U.S. Pat. No. 5,918,961 (Ueda); U.S. Pat. No. 6,010,221 (Maki et al.); U.S. Pat. No. 6,062,694 (Oikawa et al.); U.S. Pat. No. 6,113,239 (Sampsell et al.); and U.S. Pat. No. 6,231,192 (Konno et al.).

A related spatial light modulator LC technology that is similar in dimensional scale to that of LCOS devices is the transmissive LCD microdisplay. An example of this technology is the recently announced High-Temperature PolySilicon (HTPS) TFT device from Seiko Epson, a 2048×1080 pixel, 1.6" diagonal device. The HTPS modulator is formed by lithographic etching on a quartz wafer, using methods similar to those followed for conventional LCOS device fabrication.

The second type of basic LC architecture, commonly used for laptop computers and larger display devices, is the so-called "direct view" LCD panel, in which a layer of liquid crystal is sandwiched between two sheets of glass or other transparent material. A backlighting assembly is utilized in conjunction with the panel. The backlighting assembly typically consists of an illumination source, such as either cold cathode florescent tubes or light emitting diodes, plus a series of optical components and optical films to improve the uniformity, polarization state, and angular distribution of the light delivered to the transmissive panel. Continuing improvement in Thin-Film Transistor (TFT) technology has proved beneficial for direct view LCD panels, allowing increasingly denser packing of transistors into an area of a single glass pane. In addition, new LC materials that enable thinner layers and faster response time have been developed. This, in turn, has helped to provide direct view LCD panels with improved resolution and increased speed. Thus, larger, faster LCD panels, having improved resolution and color, are being designed and utilized successfully for display imaging. These developments have been primarily directed to the goal of improved performance in the desktop monitor and home television marketplace.

As the above-cited patents show, developers of motion-picture quality projection apparatus have primarily directed their attention and energies to the first architecture, using LCOS LCD technology, rather than to the second architecture using TFT-based, direct view LC panels. There are a number of clearly obvious reasons for this. For example, the requirement for making projection apparatus as compact as possible argues for the deployment of miniaturized components, including miniaturized spatial light modulators, such as the LCOS LCDs, or other types of microdisplay devices, such as digital micromirror devices (DMDs). Its highly compact pixel arrangement, with pixels typically sized in the 8-20 micron range, allows a single LCOS LCD to provide sufficient resolution for a large projection screen, requiring an image in the range of 2048×1080 or 4096×2160 pixels, or better, as required by SMPTE (Society of Motion Picture and Television Engineers) specifications for Digital Cinema Projection. Other reasons for interest in LCOS LCDs over their direct-view LCD panel counterparts relates to performance attributes of currently available LCOS components, attributes such as response speeds of less than 4 ms, larger color gamut, and contrast ratios of 2000:1 and higher. In addition, reflective LCOS components allow higher power density when provided with heat-sinking, have an aperture ratio of above 70%, and typically don't employ color filter arrays or backlight units.

Yet another factor that tends to bias projector development efforts toward miniaturized devices relates to the dimensional characteristics of the film that is to be replaced. That is, the image-forming area of the LCOS LCD spatial light modulator, or its Digital Micromirror Device (DMD) counterpart, is comparable in size to the area of the image frame that is projected from the motion picture print film. This may somewhat simplify some of the projection optics design, including adapting existing designs from film-based imaging. However, this interest in LCOS LCD or DMD devices also results from an assumption on the part of designers that image formation at smaller dimensions would be most favorable. Thus, for conscious reasons, and in line with conventional reasoning and expectations, developers have assumed that the miniaturized LCOS LCD or DMD provides the most viable image-forming component for high-quality digital cinema projection.

While compact size and favorable response speeds are advantages offered by wafer-based LCD device architectures, these same devices have some inherent shortcomings that complicate their use in large-scale cinematic projection applications. One problem inherent with the use of miniaturized LCD and DMD spatial light modulators relates to brightness and efficiency. As is well known to those skilled in the imaging arts, any optical system is constrained by geometrical considerations, expressed in terms of etendue or, alternately, in terms of the Lagrange invariant, i.e., a product of the acceptance solid angle and the size of the aperture at any given plane in an optical system. Where systems are matched and symmetric, Lagrange and etendue are identical. In optical systems that are not matched or symmetric, the etendue is the smallest value that allows light through the system. (Refer to *Polarization Engineering for LCD Projection*, by Michael G. Robinson, Jianmin Chen, Gary D. Sharp, John Wiley & Sons Ltd, England, 2005, page 41.)

Etendue and the corollary, Lagrange invariant, provide a way to quantify an intuitive principle: only so much light can be provided from an area of a certain size. As the Lagrange invariant shows, when the emissive area is small, a large angle of emitted light is needed in order to achieve a certain level of brightness. Added complexity and cost result from the requirement to handle illumination at larger angles. This problem is noted and addressed for high-density LCOS devices in commonly assigned U.S. Pat. No. 6,758,565 entitled "Projection Apparatus Using Telecentric Optics" to Cobb et al.; U.S. Pat. No. 6,808,269 entitled "Projection Apparatus Using Spatial Light Modulator" to Cobb; and U.S. Pat. No. 6,676,260 entitled "Projection Apparatus Using Spatial Light Modulator with Relay Lens and Dichroic Combiner", to Cobb et al. These patents disclose an electronic projection apparatus design using higher numerical apertures at the spatial light modulator for obtaining the necessary light, while reducing angular requirements elsewhere in the system.

Still other related problems with LCDs relate to the high angles of modulated light needed. The mechanism for image formation in LCD devices, and the inherent birefringence of the LCD itself, limit the contrast and color quality available from these devices when incident illumination is highly angular. In order to provide suitable levels of contrast, one or more compensator devices must often be used in an LCD system. This, however, further increases the complexity and cost of the projection system. An example of this is disclosed in commonly assigned U.S. Pat. No. 6,831,722 entitled, "Compensation Films for LCDs" to Ishikawa et al., which discloses the use of compensators for angular polarization effects of wiregrid polarizers and LCD devices. For these reasons, one should appreciate that microdisplay LCOS, HTPS LCD and DMD solutions face inherent limitations related to component size and light path geometry.

In addition to area and light angle considerations, a related consideration is that image-forming components also have limitations on energy density. With miniaturized spatial light modulators, and with LCDs in particular, only so much energy density can be tolerated at the component level. That is, a level of brightness beyond a certain threshold level can damage the device itself. Typically, energy density above about 15 W/cm$^2$ would be excessive for an LCOS LCD with inorganic alignment layers. This, in turn, constrains the available brightness when using an LCOS LCD of 1.3 inch in diameter to no more than about 15,000 lumens. Heat build-up must also be prevented, since this would cause non-uniformity of the image and color aberrations, and could shorten the lifespan of the light modulator and its support components. For example, the behavior of absorptive polarization components used can be significantly compromised by heat build-up. This requires substantial cooling mechanisms for the spatial light modulator itself and careful engineering considerations for supporting optical components. Again, this adds cost and complexity to an optical system design.

Compounding this problem is the continuing trend toward further miniaturization in fabrication techniques for wafer devices, in order to obtain higher yields and improved manufacturing efficiency. It is apparent that the ongoing development of LCD spatial light modulators is following this same trend toward higher compactness and miniaturization. Light modulators near 0.5 in. diagonal have been developed, dramatically reducing the size of these devices from the 1.3 in. diagonal of earlier generation devices. However, considerations of etendue (or, similarly, Lagrange invariant) and energy density, as described earlier, show that further miniaturization will hamper the development of large-scale, theatre-quality projection apparatus using LCD devices, since it becomes increasingly more difficult to provide the needed brightness from smaller and smaller light-modulating devices. Yet another difficulty relates to relative defect size and fabrication yields. As pixels become increasingly smaller, such as in the 8-20 micron range, a small defect of only 1 or 2 microns in size can have a substantial affect on display quality. The same size defect on a device with larger pixels has correspondingly less impact on image quality.

In addition to etendue constraints, with any LC device, inherent constraints on aperture ratio must be considered. In general an aperture is provided for each pixel by a "black-matrix" pattern, in order to block incident light from negatively affecting the controlling transistor, which can be photosensitive, resulting in contrast loss. This aperture reduces the effective transmission of the device, resulting in an aperture ratio of 60% or less for HTPS LC devices, compared with approximately 90% for LCOS. With a substantially larger transmissive panel, and consequently, a larger pixel area, such a relatively small aperture ratio can still provide acceptable brightness. However, with the small pixel sizes of a micro-display (such as the HTPS device), an aperture ratio this low is of a particular disadvantage. With respect to image quality, this aperture ratio may cause a visible "screen door" artifact when magnified to the display screen sizes required for typical theaters, that are around 40 feet wide or wider. Additionally, in micro-displays at the scale of the HTPS array, the device active area is still relatively small, and heat dissipation of this light absorbing aperture from an intense light source can further negatively affect the performance of the light modulator or the performance of its supporting optical components. Therefore, while this device type may be suitable for a digital projection application in a smaller venue, such as in a screening room or for business presentations, it does not appear to be capable enough for handling the amount of light required in typical cinema screen environments, where the average screen size generally requires a minimum of 10,000 lumens and where the largest of cinema display screens can require over 60,000 lumens. This high demand is well above what LCD micro-display devices (that is, both HTPS and LCOS devices with less than 2 inch diagonals) are able to provide at their physical limits, without taking exceptional measures for heat compensation and other factors that raise the potential cost of the projection system substantially.

Using conventional optical approaches in projector design, an illumination beam that is directed toward color separation and modulation components is concentrated so that it has as narrow a beam width as can be obtained. This strategy is preferred, because it allows favorable sizing of lenses, filters, polarizers, and other individual optical components and allows compact packaging of the overall optical system to condition, split, modulate, and recombine light. In the conventional LCOS embodiment of FIG. 1A, a narrow illumination beam is needed in order to concentrate light onto the small LCOS spatial light modulators themselves.

One significant limitation of conventional design approaches using LCOS devices, then, relates to brightness. As noted earlier with respect to the Lagrange invariant, only a certain amount of light can be obtained from a beam of a given width (that is, a given two-dimensional area) at narrow angles. Increasing the angle of the light beams decreases the image quality obtained when using dichroic separators and combiners, since dichroic coatings shift their spectral edges as a function of angle. Concentrating or expanding a light beam over any part of the optical path requires intervening lenses or other light-conditioning optical components. Thus, the task of contracting or expanding the illumination and modulated light beams in each color channel adds cost and complexity to the optical design. FIG. 1B shows an earlier embodiment in which the incident light angle is steep at the LCOS device to increase collection efficiency, but reduced before and after to decrease the spectral shift effects of the coatings, as well as the speed of the optical components. When applying conventional optical design practices to the problem, the design of an electronic color projection apparatus that provides high light output has been shown to be particularly challenging, since each additional optical component in the system tends to reduce light output and to introduce tradeoffs between image quality and light output. Conventional solutions constrain both the light output levels and overall image quality.

Low-end LCOS-based electronic projection designs have been successfully commercialized for home use in rear projection televisions delivering approximately 1000 lumens and for business presentation markets in which a modest amount of optical efficiency and brightness and reasonably good image quality at low cost are suitable. In order to meet the demands for higher brightness and improved image quality projector output that would be competitive with film-based projection apparatus, however, it appears that considerable tradeoffs must be made. To compensate for optical efficiencies of less than 10%, conventional LC-based electronic imaging apparatus must employ very bright light sources. For example the Sanyo PLVHD20, an HTPS LCD microdisplay projector with a 1.6" diagonal Seiko-Epson LC chip, utilizes four 300 W UHP lamps, yet delivers only 7000 lumens. In this case, multiple lamps of lower wattage are used, to increase the output without enlarging the etendue as much as utilizing a single high wattage lamp, since the lamp arc gap grows in size (illumination etendue) faster than the available wattage. Similarly, the Sony SRX-R110 with 1.55" LCOS microdisplays utilizes two more expensive 2.0 kW lamps to deliver 10,000 lumens. In both of these cases, lamp output is insufficiently matched to the LC spatial light modulator, with concomitant impact on heat, cost, and lamp lifetime. To withstand high energy density levels needed to optimize brightness, more costly components must be used in illumination and modulated light paths. For example, lower cost absorptive polarizers are supplanted by more costly wire grid polarizers in many designs. Thus, in an effort to obtain every available lumen at the output, conventional designs employ expensive, low reliability approaches that use either high-cost, high-performance optical components or multiples of lower cost, lower performance components.

In electronic projection apparatus, light of each component color, or spectral band, is separately modulated; then the modulated light of the component color channels is typically recombined to provide a full color image. Recombination of the modulated light can be performed directly on the projected surface when using separate projection optics in each color channel; alternately, modulated component colors can be recombined for projection from a single projection lens assembly. When recombining colors for a single projection lens assembly, one goal is to provide equal length optical paths in each color channel. Some conventional solutions for equalizing optical path lengths are given in U.S. Pat. No. 4,864,390 entitled, "Display System with Equal Path Lengths" to McKechnie et al. and in U.S. Pat. No. 6,431,709, entitled "Triple-Lens Type Projection Display with Uniform Optical Path Lengths for Different Color Components" to Tiao et al.

Given the substantial challenges in creating a high lumen projector utilizing micro-display LCD devices, such as HTPS and LCOS, creating a projector with large panel "direct view" type LC panels appears desirable. These "direct-view" LC panels have significantly improved their resolution, contrast and speed making them more of an alternative to micro-display than initially perceived. However, the "direct-view" panels as currently fabricated for use in flat panel applications, are not well suited for use in a high lumen projector. For example, the use of absorptive polarizers, which may be directly attached to TFT LCD panels, as these devices are commonly manufactured, is disadvantageous for image quality. Heat created from light absorption in these polarizers, which typically exceed about 20% of the light energy, causes consequent heating of the LCD materials, potentially resulting in a loss of contrast and contrast uniformity across the panel.

Similarly, high speed, high contrast LC panels dedicated for desktop monitors and televisions typically contain color filter arrays (CFA) inside the structure of the panel in order to provide the color performance required by these applications. These absorptive color filter arrays would not be suitable for use in a high lumen projector, again because heat absorption could result in non-uniform image artifacts and damage to the device. While high-resolution monochrome panels have been made for the medical industry, these panels typically have slow response times as they are often used for viewing still radiographic images. Newer panel technologies are being developed with faster responses times for improved video performance. Most significantly is a panel technology known as optically compensated bend mode (OCB) that offers speeds on the order of 2 ms. This mode is being pursued for the flat panel industry to allow field sequential color illumination offering a reduction in "direct view" backlighting cost and lower panel cost with the elimination of the expensive CFA. The OCB mode would be ideally suited for a high lumen digital projection system.

There have been various projection apparatus solutions proposed using the alternative direct view TFT LC panels. However, in most cases, these apparatus have been proposed for specialized applications, and are not intended for use in high-end digital cinema applications. For example, U.S. Pat. No. 5,889,614 (Cobben et al.) discloses the use of a TFT LC panel device as an image source for an overhead projection apparatus. U.S. Pat. No. 6,637,888 (Haven) discloses a rear screen TV display using a single subdivided TFT LC panel with Red, Green, and Blue color sources, using separate projection optics for each color path. Commonly assigned U.S. Pat. No. 6,505,940 (Gotham et al.) discloses a low-cost digital projector with a large-panel LC device encased in a kiosk arrangement to reduce vertical space requirements. While each of these examples employs a larger LC panel for image modulation, none of these designs is intended for motion picture projection at high resolution. Nor do the previous examples have sufficiently high brightness levels, or color comparable to that of conventional motion picture film, or acceptable contrast, or a high level of overall cinematic image quality. As a result, none of these proposed solutions would be suitable candidates for competing with conventional motion picture projection apparatus.

One attempt to provide a projection apparatus using TFT LC panels is disclosed in U.S. Pat. No. 5,758,940 entitled "Liquid Crystal Projection Display" to Ogino et al. In the Ogino et al. '940 apparatus, one or more Fresnel lenses is used to provide collimated illumination to the LC panel; another Fresnel lens then acts as a condenser to provide light to projection optics. Because it provides an imaging beam over a wide area, with a corrected illumination uniformity, the Ogino et al. '940 apparatus is advantaged for its relatively high light output, based on consideration of the Lagrange invariant described above. Notably, Ogino et al. '940 also describes using a single panel for modulation of all three primary colors, RGB (Red, Green, and Blue). For illumination of a monochrome LC panel, however, colors are provided in rapid sequence. This system would not produce color efficiently, nor would it modulate the successive color frames quickly enough to prevent motion artifacts. Therefore, while it may have some promise for TV sized projection apparatus and small-scale projectors, the proposed sequential color solution of the Ogino et al. '940 disclosure still falls short of the performance levels necessary for high-resolution projection systems that provide imaged light output having high intensity, at levels of 5,000 lumens and beyond.

Another recent attempt to utilize direct view TFT LC panels for projection for the command and control center marketplace is disclosed in U.S. Pat. No. 6,924,849 entitled, "Image Projection System With Multiple Arc Lamps and Flyseye Lens Array Light Homogenizer Directing Polychromatic Light on a Liquid Crystal Display" to Clifton et al. In the Clifton '849 apparatus, a 15" TFT LC panel with color filters is used as the light modulator for a 67" diagonal projection system. The solution proposed in the Clifton '849 disclosure is to increase brightness, without loss of contrast, by using combined multiple light sources, in an arrangement of reflective surfaces, to form a small effective light source. In the illumination portion of the Clifton '849 apparatus, light from multiple lamps is combined using a pinwheel mirror arrangement. This arrangement helps to illuminate the LC panel at low incident angles, nearly normal to the preferred LC optimum contrast direction, and thereby helps to improve the contrast ratio of the projection apparatus without the use of compensation films. The approach described in the '849 Clifton et al. patent also includes modifying the direct-view LCD panel for increased contrast, removing the wide view angle film that is conventionally provided with the panel. A further increase in contrast is claimed by redirecting the illumination through the LCD panel at an angle that is offset from normal to take advantage of inherent light modulation properties of the LC material. A Fresnel lens on the output light side of the LCD then compensates for the redirection of illumination on the input side of the LCD.

In spite of some considerable measures taken in the '849 Clifton solution, however, the efficiency of the resulting projector apparatus still remains relatively low. Moreover, while contrast may be improved in the apparatus of the '849 Clifton et al. disclosure, the apparatus still falls short of the brightness requirements for digital cinema projection. Significantly, the proposed solutions of the '849 Clifton et al. design fail to take advantage of increased etendue when using a large LC panel size. Some of the components of the proposed '849 Clifton et al. disclosure can adversely affect image quality. For example, the use of an output fresnel lens in front of the LC panel may be acceptable for the SXGA resolution levels of the apparatus described, but may cause significant contrast and image artifacts when utilized in a projection system with a minimum of 2048×1080 pixels and 5000 lumens. The use of lamps having arc gaps of up to 7 mm would not provide high efficiency, even where an LC panel of a 2-inch diagonal is used. The single panel color or monochrome configuration described in the '849 Clifton et al. patent would not be efficient with color light, whether using common absorptive color filter arrays that would cause problems in a high lumen system, or using sequential color that would cause motion artifacts. Additionally, continuing improvements in LCD panel design, including improved overall contrast ratio, may obviate the need for film removal to obtain high contrast or for illumination redirection solutions, both of which are proposed in the '849 Clifton et al. disclosure.

Thus, it can be seen that, although some digital cinema projection apparatus solutions have been predicated on the use of LCOS LCDs for image forming, there are inherent limitations in brightness and efficiency when using the miniaturized LCOS LCD components for this purpose. Direct view TFT LC panel solutions, on the other hand, because they do not have the same etendue-related limitations as do LCOS devices, have the potential to provide enhanced brightness levels over LCOS solutions. However, while projection apparatus using TFT LC panels have been disclosed, these have exhibited efficiency levels that are disappointing and have not been well suited to the demanding brightness levels combined with the additional requirements of contrast ratio, color uniformity, color gamut, and resolution as specified by the Society of Motion Picture and Television Engineers for certified digital cinema projectors.

The Society of Motion Picture and Television Engineers (SMPTE) is currently establishing a set of standards regarding certified digital cinema projection equipment. A consortium of motion picture studios, known as the Digital Cinema Initiative (DCI), created these baseline requirements. The DCI established stringent performance parameters that include contrast ratio, pixel resolution, light level at the screen, ANSI contrast, as well as color gamut and artifact allowance. These standards, in addition to the general competitive marketplace, require that a digital cinema projector have a sequential contrast on the order of 2000:1 with no color shifts, approximately 10,000 lumens or higher (for most screens), and a pixel count of 2048×1080 or 4096×2160.

The business of theatrical presentation of motion pictures is substantially different from that of projection in the home or conventional business environments. Traditionally theatres have built their business around the use of film, film projection equipment, and a revenue sharing stream in which different studios provide content to the theatre in return for a portion of the ticket sale price. The cost of the equipment to the theatre has been typically amortized over ten to thirty years, with few technology changes during this period. Servicing is minimal, with an occasional mechanical part failure, and periodic lamp replacement. Profits tend to be squeezed to the point where wattage of the projector lamp itself can be a significant cost factor that affects solvency.

Digital projection substantially changes this business model, but risks creating a somewhat more costly infrastructure for the theatrical venue. Conventional microdisplay-based projectors, built using costly, high-performance components, can cost as much as three times the cost of film projection equipment. Further, the life expectancy of modern digital projection equipment is unknown. Judging from the history of other benchmarks in the electronics industry such as digital television, computers, and telecommunication equipment, this lifetime can be less than that for conventional film projection apparatus, with a likely range from five to ten years. Planned obsolescence and component failure with conventional electronic projection apparatus raises profitability concerns. Without a significant gain in terms of cost effectiveness, light output, and optical efficiency, digital cinema may not be favorably poised to compete with film-based projection in the near future.

Thus, it can be seen that there is a need for a full-color projection apparatus of digital cinema performance levels that takes advantage of LC device technology at favorable cost, with increased optical efficiency, and overall light throughput.

SUMMARY OF THE INVENTION

The aforementioned need is addressed, according to one embodiment of the present invention, by providing a digital cinema projection apparatus that includes: an illumination source having a first etendue value for providing polarized polychromatic light; a first lens element in the path of the polarized polychromatic light for forming a substantially telecentric polarized polychromatic light beam; a color separator for separating the telecentric polarized polychromatic light beam into at least two telecentric color light beams; at least two transmissive spatial light modulators that modulate the two telecentric color light beams and form at least two modulated color beams, wherein there is an etendue value associated with each spatial light modulator, and wherein the etendue value is within 15% or greater than the first etendue value corresponding to the illumination source; a color combiner for combining the modulated color beams along a common optical axis, forming a multicolor modulated beam thereby; and a projection lens for directing the multicolor modulated beam toward a display surface.

It is a feature of the present invention that, unlike current approaches that use miniaturized LCOS or LCD devices, the apparatus of the present invention employs large TFT LCD panels for imaging in a projection apparatus intended for high-end electronic imaging applications, requiring It is an advantage of the present invention that it allows added brightness of at least 5000 lumens for the projected image. Various types of light sources could be used.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIG. 6 is a plan view showing lateral color effects for the telecentric lens of the present invention;

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

The Society of Motion Picture and Television Engineers (SMPTE) is currently establishing a set of standards regarding certified digital cinema projection equipment. A consortium of motion picture studios, known as the Digital Cinema Initiative (DCI), created these baseline requirements. The DCI established stringent performance parameters that include contrast ratio, pixel resolution, light level at the screen, ANSI contrast, as well as color gamut and artifact allowance. These standards, in addition to the general competitive marketplace, require that a digital cinema projector have a sequential contrast on the order of 2000:1 with no color shifts, approximately 10,000 lumens or higher (for most screens), and a pixel count of 2048×1080 or 4096×2160.

The present invention provides a digital cinema projection apparatus having high brightness levels using large-scale TFT light modulator panels for light modulation. Alternately, other types of large transmissive panels could also be utilized for this invention, such as magneto-optic polarization switching based display panel devices from Panorama Labs Inc., referred to as Magneto-Photonic Crystal (MPC) devices. Unlike conventional digital cinema projector designs using conventional miniaturized LCOS LC or transmissive LCD devices, the present invention employs large transmissive devices, such as LC or MPC devices, formed as panels and having diagonals of at least about 5 inches. The large sized LC or MPC panels can accept light that is provided over a greater area, thereby increasing the available light that can be provided, according to the etendue or Lagrange invariant principles previously described in the background section. Advantageously, the present invention requires only a small number of relatively slow lenses, mirrors, or other components in the light path. A relatively wide light beam is provided in both illumination and modulated light paths, maximizing brightness without the concomitant compromise in dichroic surface performance and fast complex optics that is typically associated with high brightness projection apparatus. Unlike designs using microdisplay devices such as LCOS LC devices, the etendue of each of the LC modulators, or of a large-scale MPC modulator, is closely matched, or in excess to that of the illumination source.

Figure 1B:
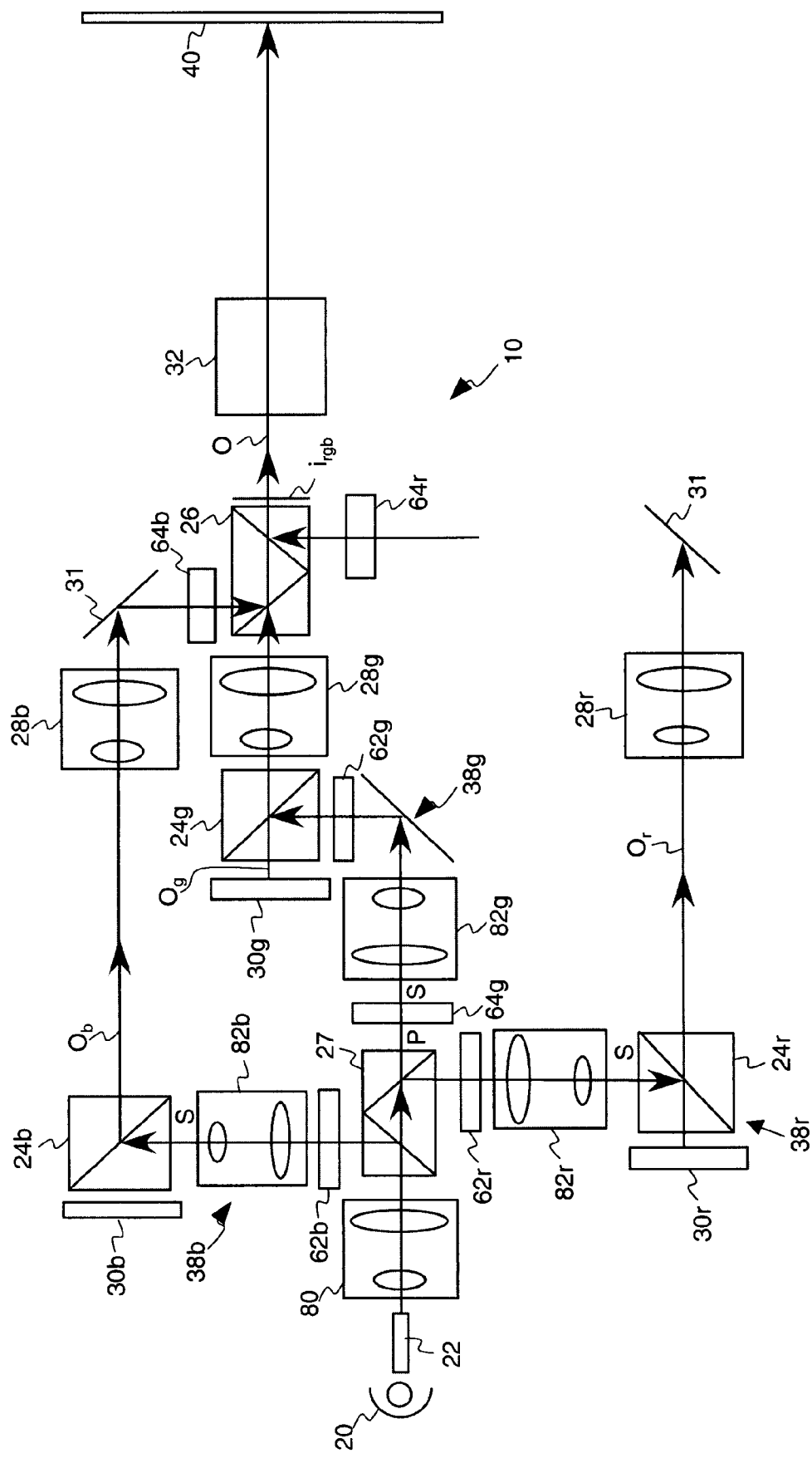
FIG. 1B is a block diagram showing an earlier projection apparatus.
Figure 2:
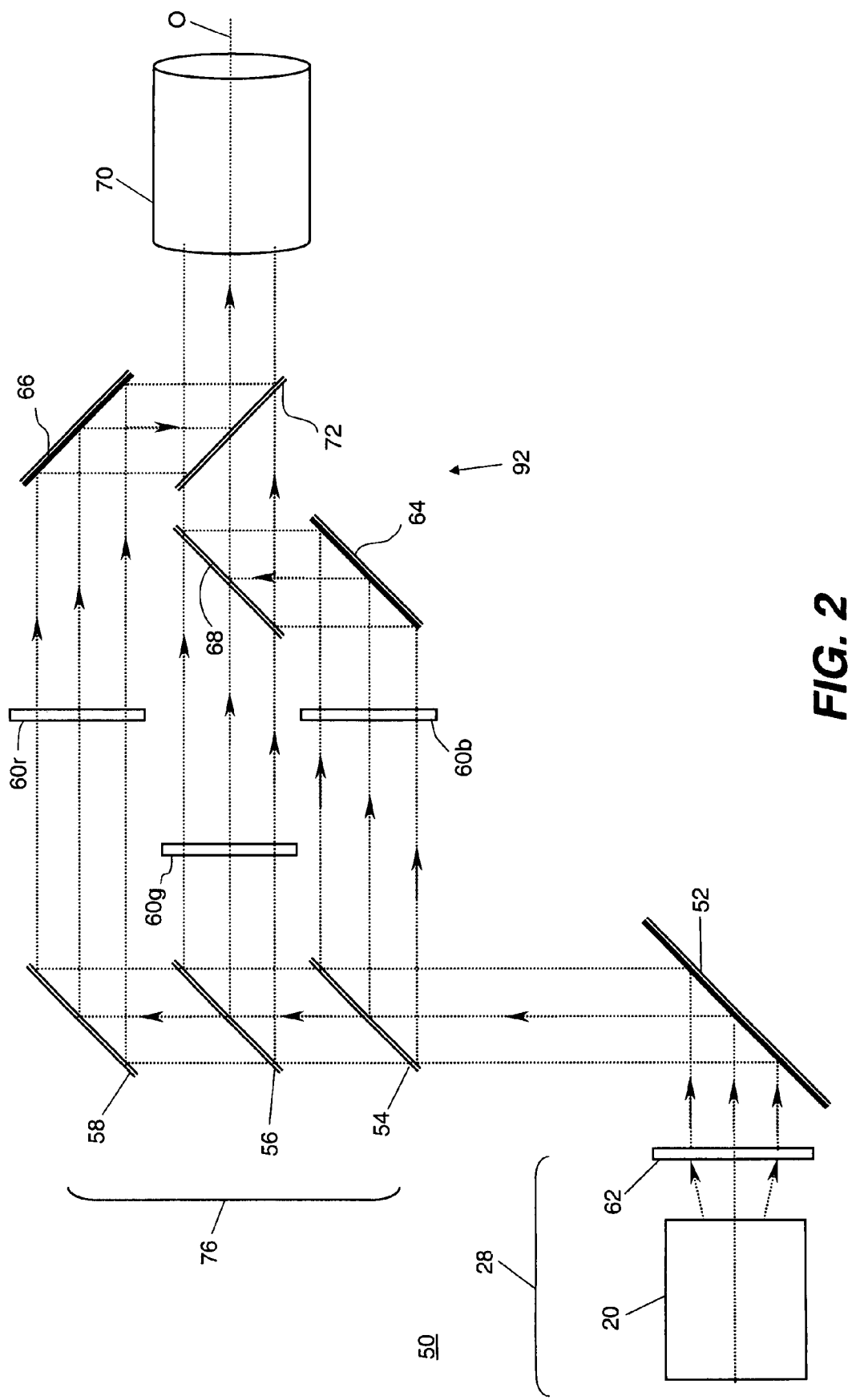
FIG. 2 is a block diagram showing a projection apparatus using a large-scale TFT LC display according to one embodiment of the present invention.

Referring to FIG. 2, there is shown an embodiment of a projection apparatus 50 designed for large-scale, high-brightness projection applications according to an embodiment of the present invention. When compared against conventional projection apparatus described in the background section given above, projection apparatus 50 has a minimum number of optical components, yet is capable of providing high brightness exceeding that of more complex projection devices that employ microdisplays such as LCOS LC modulators or other types of LC transmissive panel designs. For example, earlier systems, such as that described in U.S. Pat. No. 6,758,565 issued to Cobb et al., and shown in FIG. 1B, require either a relay lens to create an intermediate image from the microdisplay device to allow a relatively simple projection lens, or a long working distance low f# projection lens. In either case, these solutions call for complex and very costly lenses. The color splitting and polarization optics must also be able to handle relatively high energy light at high angles without creating polarization nonuniformity. Conventionally, this can require the use of high cost specialty glasses, as well as wire grid polarizers. Additionally, the earlier solution requires substantial cooling, both for the microdisplay device and for at least some of the polarization elements, in order to handle the high energy densities.

In the embodiment shown in FIG. 2, projection apparatus 50 has an illumination source 28, a color separator 76, a color modulation section 90, a color combiner 92, and a projection lens 70. Illumination source 28 has a polychromatic light source 20 that provides a polarized, uniformized light and a telecentric lens 62 for conditioning the polarized, uniformized light to provide a telecentric, polarized, polychromatic light beam as the illuminant for modulation and display. Cold mirror 52 is used to fold the optical path and direct the telecentric, polarized, polychromatic light beam to color separator 76.

Color separator 76 has a first dichroic surface 54 for spectral separation of the polychromatic light, reflecting a first spectral band toward a first spatial light modulator 60b, as a telecentric color light beam for blue light modulation in this embodiment, and transmitting other light. The transmitted light goes to a second dichroic surface 56 for further spectral separation, with a second spectral band reflected as a telecentric, color light beam toward a second spatial light modulator 60g, for green light modulation in this embodiment and transmitting other light. A reflective surface 58, which may also be a dichroic surface, then directs a third spectral band toward a third spatial light modulator 60r. A modulated color beam from each of spatial light modulators 60r, 60b, and 60g passes to color combiner 92. In color combiner 92, light from each of the modulated color beams is combined, using dichroic surfaces 68 and 72, and directed along a common optical axis O, toward projection lens 70, which is coaxial to the common optical axis. Mirrors 64, 66 are used to fold the optical path toward the combining optics of dichroic surfaces 68 and 72. Projection lens 70, shown for one embodiment in FIGS. 8 and 9, directs the modulated, combined multi-color light beam onto display surface 40 (not shown in FIG. 2, but shown in FIGS. 1 and 8).

Figure 3:
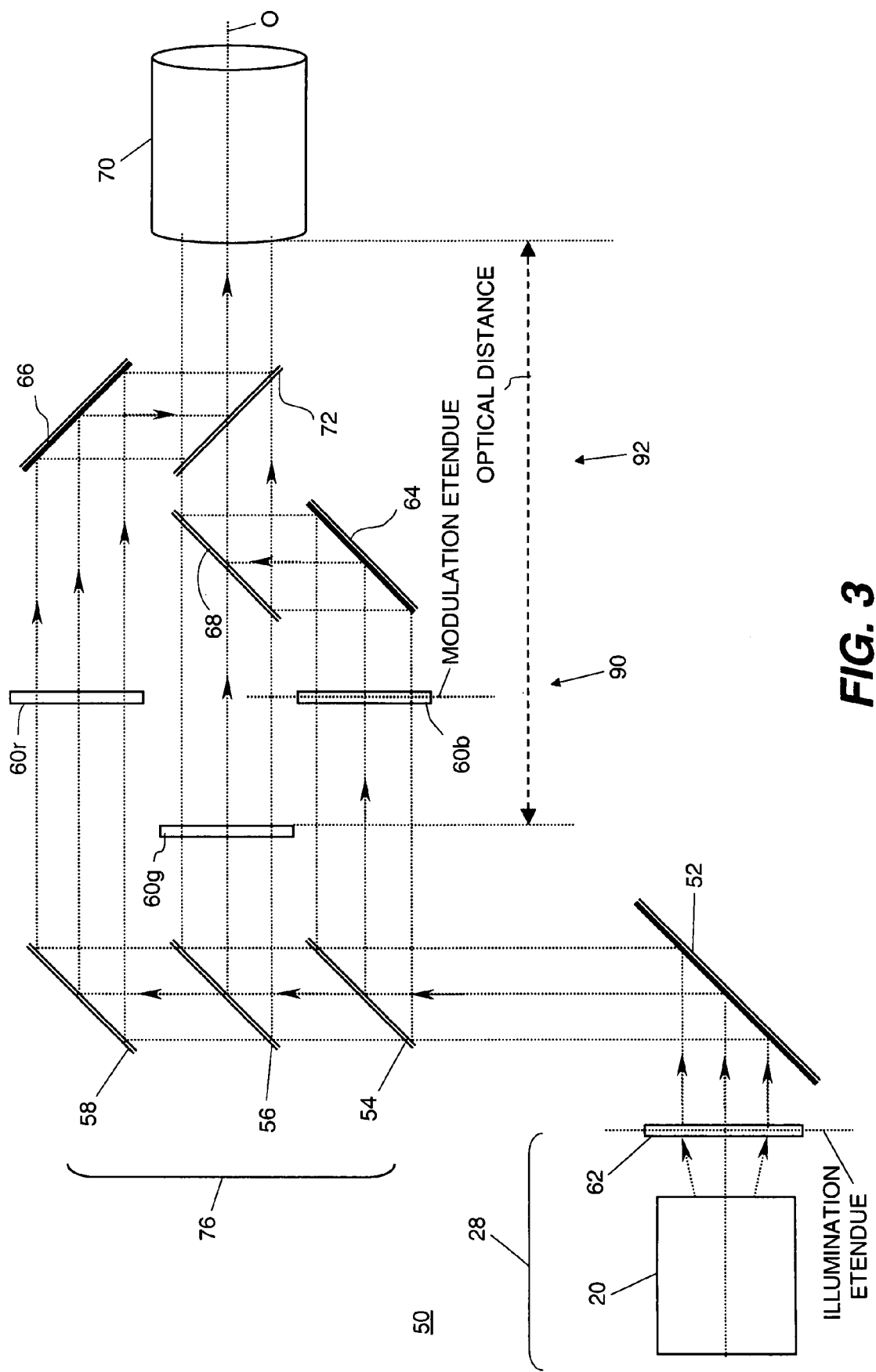
FIG. 3 is a block diagram showing additional features of the projection apparatus of FIG. 2 according to the present invention.
Figure 4:
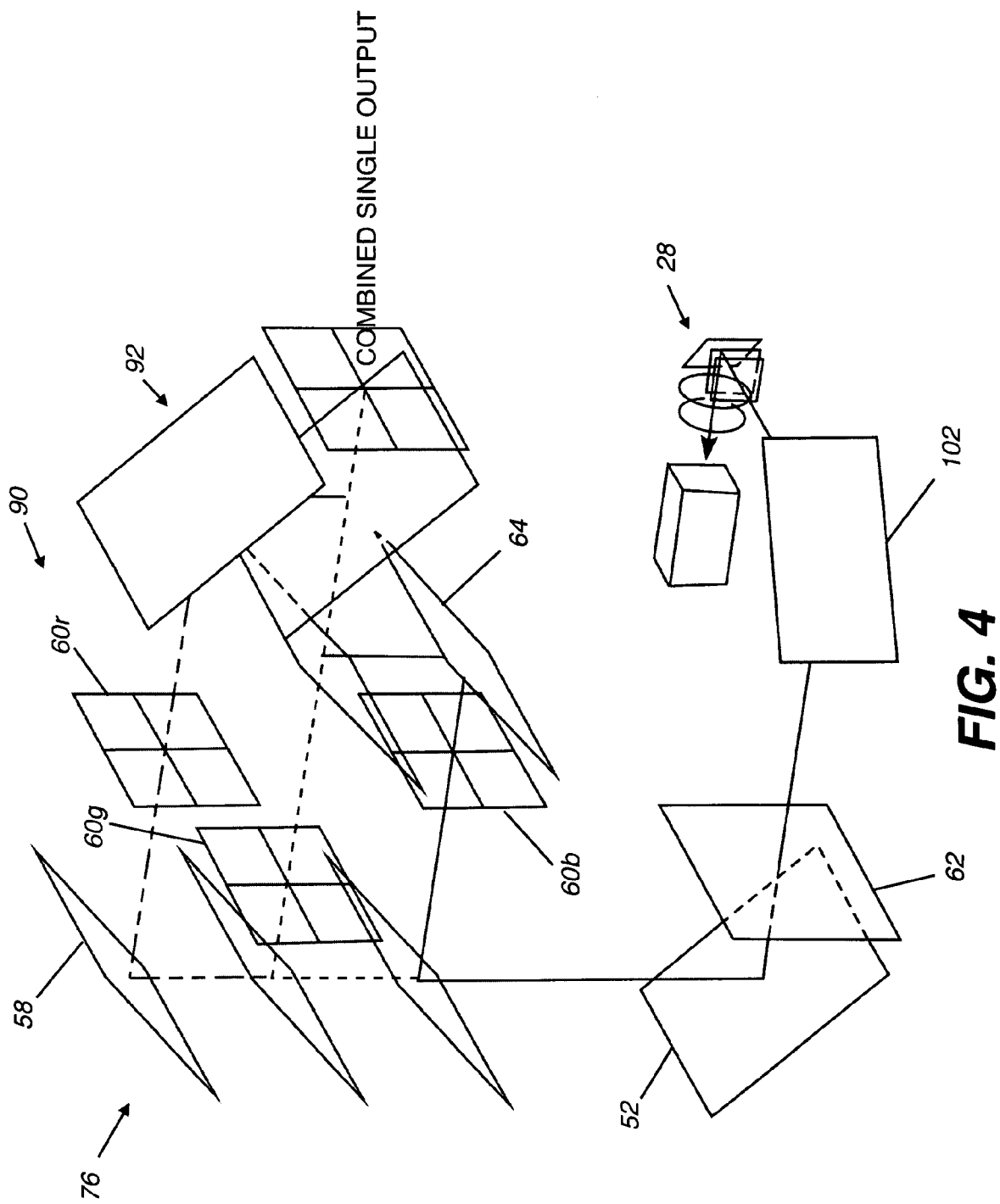
FIG. 4 is a perspective view showing the light beam paths through the projection apparatus of the present invention.

The block diagram view of FIG. 3 and the perspective view of FIG. 4 show dimensional and spatial relationships that apply for projection apparatus 50 of FIG. 2. As shown in FIG. 4, an optional folding mirror 102 may be advantageously used in the illumination path.

It is instructive to note that the design of projection apparatus 50 using the arrangement of FIGS. 2 through 4 may require no intervening optics, other than a Fresnel field len(s) adjacent to the panel, having optical power in the optical path, extending between telecentric lens 62 in illumination source 28 and projection lens 70. Apertures may be provided to minimize stray light. However, no additional lenses are needed in the optics path between lens 62 and projection lens 70 in this embodiment. This simplicity of design leads to relatively low manufacturing costs and enables construction of a lightweight device for high-brightness projection.

Efficiency and Etendue Considerations

As noted earlier in the Background section, conventional electronic projection apparatus, which employ LCOS microdisplay components, have low efficiency, typically less than 10% at best. Their optical geometry, as expressed in terms of etendue, limits the efficiency of these conventional systems, so that attempts to increase brightness, such as using lamps with increased wattage, has little effect on light output.

A simple calculation of etendue is instructive for showing this constraint for apparatus that use microdisplays. As a first example, a rectangular microdisplay SLM (spatial light modulator) panel having a 1.2" (30.48 mm) diagonal (assuming a standard Digital Cinema format of 1.9:1) is illuminated with a cone of light at f/2. From "Projection Displays" p. 244, eq. 11.3, etendue is calculated using:

$$E = \frac{\pi A}{4(f/\#)^2} \quad (1)$$

where:
E is the Etendue of the panel
A is the area of the panel
f/# is the illumination cone For values given in this example, etendue E=0.12 sq. inches steradian (metric: 75 mm² steradian). This represents the maximum usable etendue from the light source in the projection apparatus. In practice, the f/2 illumination cone is very fast, a practical design would use a value not much faster than about f/2.3. Also, as subsequent examples show, losses due to aperture ratio must also be taken into account in terms of system efficiency. This value, typically in the 0.60 to 0.90 range for microdisplays, reduces area A, hence the etendue, proportionately. For example, for the 75 mm² sr value computed above, the actual etendue when aperture ratio is taken into account is typically about 45-53 mm² sr.

Figure 14:
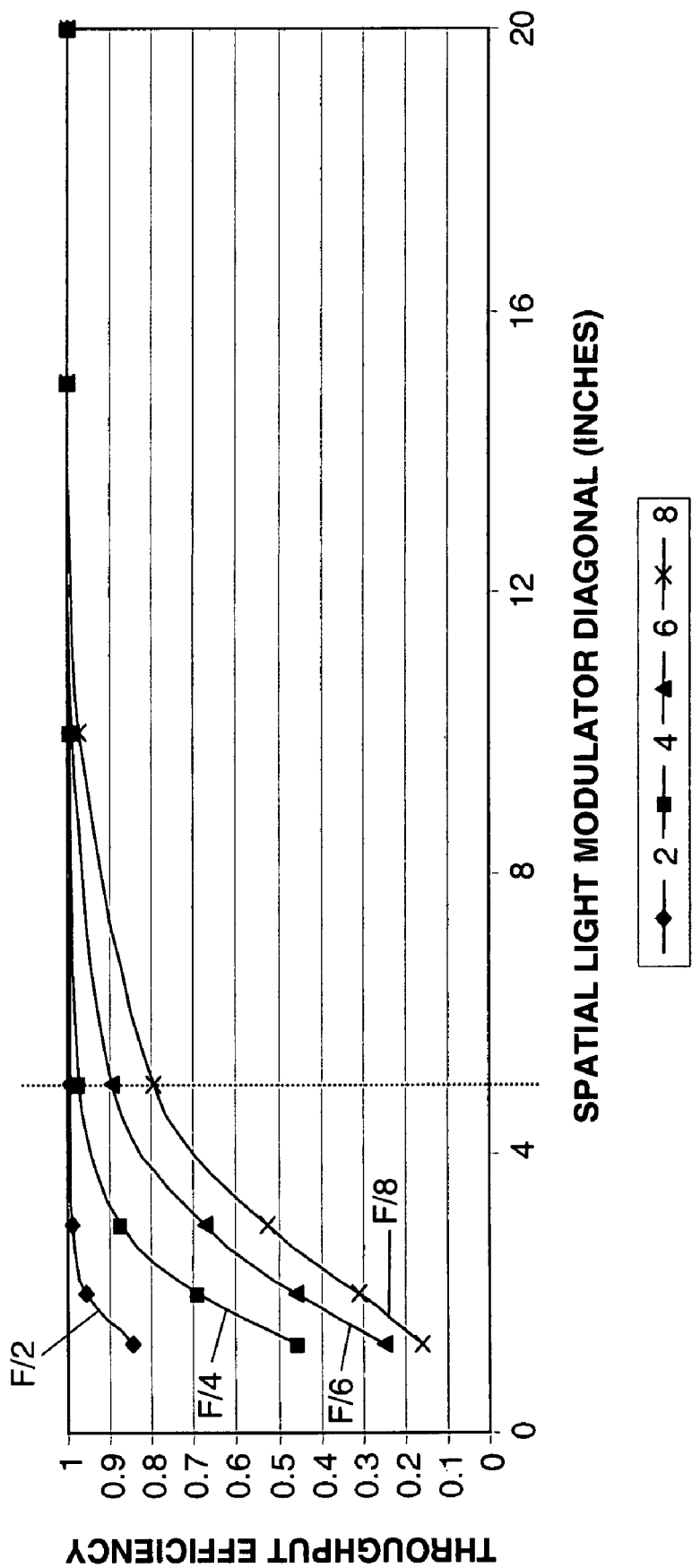
FIG. 14 is a graph comparing projector throughput efficiency at different f/# values.

By profiling theoretical throughput efficiency relative to SLM diagonal, a pronounced difference in throughput between such microdisplays and larger direct view TFT LC or MPC type devices can be observed. The graph of FIG. 14 shows the relationship of throughput efficiency as a function of SLM diagonal, over the range from about 1.3 inches to 20 inches. Four curves are shown, one each for F/2, F/4, F/6, and F/8 optical systems. As noted earlier, F/2 optics would be impractical in most cases. A system with slower than F/8 optics, such as with F/16 optics for example, could also be used, with results following the general pattern shown in FIG. 14. The vertical dotted line, and the area to its right side, indicates the region used for LC TFT devices when using the method of the present invention. Generally, this includes SLM devices of 5 inches diagonal or larger. Below these dimensions, throughput efficiencies are relatively low, dropping dramatically when slower optics are used. Over the preferred range of dimensions, higher than about 5 inches diagonal, throughput efficiencies of 70% or better are obtained, even with relatively slow (F/8) optics.

Using a slower f/# greatly simplifies the problem of angular variations of color shift in dichroics and contrast ratio as mentioned in prior art. Dichroic coatings shift their spectral edges verses angle of incidence, depending on the thin film stack design. While the magnitude of this change varies, it typically falls approximately 2 nm per degree change. Similarly, dichroic coatings are often used to fabricate polarization components, such as beamsplitters, in the prior art. As such, the contrast ratio of the components also decreases as a function of increased angle. Additionally, in some instances, it would be possible to increase the etendue at the panel (i.e. capture more light from the lamp and produce more brightness at the screen) by reducing the f/# from F/8 to a smaller value.

In order to obtain a highly efficient projection apparatus, it is desirable to match the etendue at the light source so that it is close to or less than the etendue at the spatial light modulator. Note that for a microdisplay apparatus, doing this requires an illumination system having a very small light source. This requirement, in turn sets limits on the amount of light output that is available (that is, on the number of lumens reaching the screen). In conventional arc lamps, a larger arc gap is needed in order to provide a higher lamp output, however, this larger gap also increases the illumination etendue at the same time. Consequently, at the illumination end, most attempts to increase lumen output also necessarily increases etendue above the etendue levels that are usable at the LC modulator. The result of conventional design using microdisplay devices, then, is an etendue-limited system that is highly inefficient, wastes power and generates heat that could be particularly damaging to small electro-optical components.

The apparatus and method of the present invention provide a projection apparatus capable of providing higher etendue using transmissive monochrome direct view TFT LC or MPC type devices. These spatial light modulator devices, several times larger than the alternative microdisplay LC devices that have been conventionally used for projection devices, not only offer higher lumen output levels, but also provide advantages of lower energy density on components, simplified optics, and improved light handling by color separation and recombination components.

Projection apparatus 50 provides high brightness and increased efficiency, while at the same time employing a minimum of optical components. One embodiment, given in FIG. 3, shows two locations in the optics path where etendue is substantially equal, making the design highly efficient, well beyond the efficiencies achievable when using conventional LCOS LC devices. With respect to FIG. 3, this is where, substantially:

Illumination etendue=Modulation etendue

Other embodiments can further increase the etendue of the modulator. While a further gain in lumen output would not be obtained, a lower energy density on components would result. Additionally, the pixel dimension at the modulator for a given resolution would be larger, affording other advantages discussed later.

FIGS. 19A, 19B, 19C, and 19D show intensity and angular distribution of light at best possible focus position for CERMAX® Xenon arc lamps of 1.5 kW and 2.4 kW and a 1.9 kW bubble lamp in a compound reflector arrangement. Using this data, illumination etendue can be calculated using equation (1) given earlier, using a 2.4 kW CERMAX® Xenon arc lamp, available from PerkinElmer Inc., Wellesley, Mass. with a 1.9 mm arc gap providing a 20 mm diameter source (using values roughly at the $1/e^2$ points in the upper left-most graph of normalized intensity versus focus position in FIG. 19A) and an f/1.3 reflector. This setup would provide the following typical etendue value at lens 62: $E=146 \text{ mm}^2\text{-sr}$ (assuming no optical losses).

If polarization recovery is utilized, the effective etendue of the lamp system doubles to 292 $mm^2$-sr. Note that this lamp provides a comparatively extreme case in that this offers the highest wattage rating for such a small arc gap available due to its ceramic structure that allows higher gas pressure. A more typical lamp, such as an Osram Xenon bubble lamp of 2 kW has an arc gap of 5 mm.

The modulation etendue at the LC spatial light modulator can be nearly equal to or higher than this Illumination etendue value. Again using equation (1), modulation etendue for the TFT embodiment can be calculated to determine the panel size and f/# combination that closely matches the illumination and modulator etendue. The table below shows this calculation for the CERMAX lamp system discussed previously with and without polarization recovery:

| Device Diagonal inches | Etendue = 146 f/# | Etendue = 292 f/# |
|---|---|---|
| 5 | 6.0 | 4.2 |
| 10 | 12.0 | 8.5 |
| 15 | 17.9 | 12.7 |
| 20 | 23.9 | 16.9 |

When the etendue of the illumination system and modulation system are matched, the overall system is as close to efficient as possible. Using an even larger LC modulator panel or optical system will not significantly alter the optical output of the projector. Although the panel size can be larger, the size of the panel is limited by other system considerations. The system is best configured such that, at a minimum, the majority of etendue is collected, and the panel size becomes a trade-off parameter determined according to panel cost (material cost and fabrication ease) and powered optical element cost (material cost and fabrication ease).

By way of illustration, it is instructive to distinguish the etendue mismatch of existing high lumen microdisplay projectors utilizing LCOS LCD technology from that obtained using the apparatus of the present invention. As an example, one manufacturer has introduced a 10,000-lumen digital cinema projector that uses a 1.55" diagonal LCOS modulator and two 2 kW lamps. The Digital Cinema application requires a minimum of 5,000 lumens to properly illuminate the smallest of true cinema venues. The 10,000-lumen level is significant in that this is the amount of light required to properly illuminate approximately 80% of the cinema screens in the United States. Additionally, the largest LCD chip that has been commercially demonstrated was a 1.7" diagonal (4:3), although no projector has been marketed utilizing this chip.

Using the apparatus of the first example, with illumination optics at F/2.3 (in a more extreme example, since the example projector is optically slower), the etendue of the modulation system would be 95 $mm^2$ -sr. For illumination in this device, two Xenon bubble lamps are used, with polarization recovery provided in the illumination system. Again for extreme comparisons, assume use of the CERMAX lamp cited earlier with a 1.9/mm arc gap. If there were no etendue increase due to the combination of two lamps or polarization recovery (PCS) in the illumination system, then the mismatch between the illumination etendue of 146 $mm^2$ -sr and the modulation etendue would be 54%. This becomes over 200% with polarization recovery (PCS) and an even larger mismatch if there is etendue increase from multiple lamps.

Figure 20A:
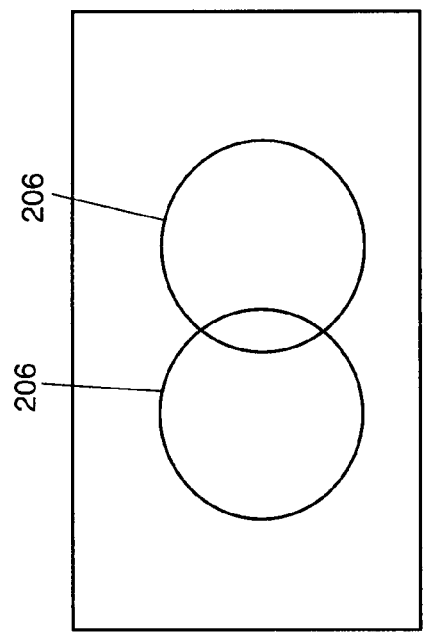
FIGS. 20A and 20B show spot overlap and energy density profile characteristics for embodiments of the present invention using Xenon bubble lamps with polarization recovery.
Figure 20B:
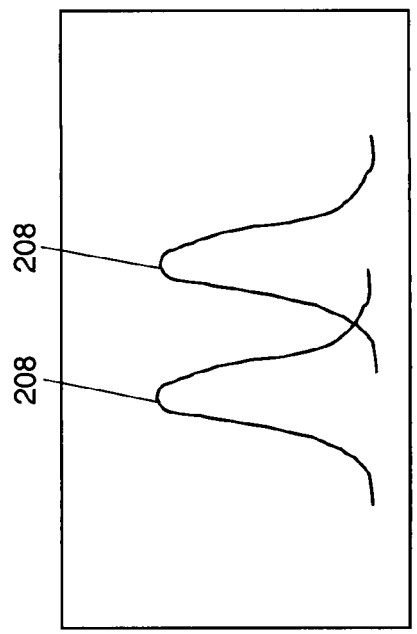

FIGS. 20A and 20B show spot overlap and energy density profile characteristics for embodiments using Xenon bubble lamps with polarization recovery. As shown in FIG. 20A, two spots 206 can be seen to have a slight overlap. As shown in FIG. 20B, their intensity curves 208 may also exhibit a slight spatial overlap where measured prior to uniformization optics.

A second look at this same projection system can help to reinforce this comparison of mismatch conditions. For this, reference is made to data from "Projection Display Throughput: Efficiency of Optical Transmission and Light Source Collection" by F. E. Doany et al. in IBM J. Research Development Vol. 42, No. 3/4 May/July 1998. In this paper, (FIG. 6, page 394) F. E. Doany et al. show how much total power can be collected from arc lamps with varying arc gaps verses a parameter similar to etendue (that is, the numerical aperture (NA) multiplied by the modulator diagonal). In order to determine the magnitude of the etendue of a 5 mm arc gap lamp, consider two cases within the range of operating f/#'s for microdisplay projectors. This total power value is actually a figure merit of the mismatch between the modulator etendue and the illumination etendue. A rough estimate of the illumination etendue can be calculated by taking the ratio of the sensor etendue divided by the system efficiency from the measurements in the F. E. Doany et al. document cited earlier. Variation for f/# occurs because the illumination is truly non-uniform over space and angle and is, in fact, more Gaussian in nature as shown in the upper left-most graph of FIG. 19 for a 1.9 kW ORC Xenon bubble lamp in a compound reflector arrangement. The following gives estimated illumination etendue calculations:

For f/2.3:

$NA \cdot D_{SLM}$ (mm)=8.56 or 4.28 with PCS

For f/4:

$NA \cdot D_{SLM}$ (mm)=4.92 or 2.46 with PCS

For a source having a 5 mm arc gap, the collected power, taken from FIG. 6 in the F. E. Doany article cited earlier for the f/2.3 system with PCS, is about 22%. For the f/4 system with PCS it is about 11%. As was noted, this assumes that the lamp etendue can be calculated by using the sensor etendue and the percentage capture. Thus, the etendue for the 5 mm gap lamp (calculated with f/2.3 information) is 94.950/0.22=431.59 mm$^2$ steradian. When calculated with the f/4 data it is 31.393/0.11=285.39 mm$^2$ steradian. Thus, with this new estimation based on independent measurements, the illumination system is further mismatched to the modulation system for a high lumen projector. While this is an estimation of the actual illumination etendue used, a conservative assumption for f/# value was used, with the assumption that there would be no significant etendue increase due to combining two lamps. Thus it can be seen that common microdisplay solutions for high lumen digital cinema projectors have significant light loss due to etendue mismatch.

By comparison, with the apparatus of the present invention, the modulation etendue is matched, to within 20%, or exceeds the illumination etendue. This contrasts with existing microdisplay-based apparatus, for which output and modulation etendue values can typically differ from each other by about 50% or more.

Figure 13:
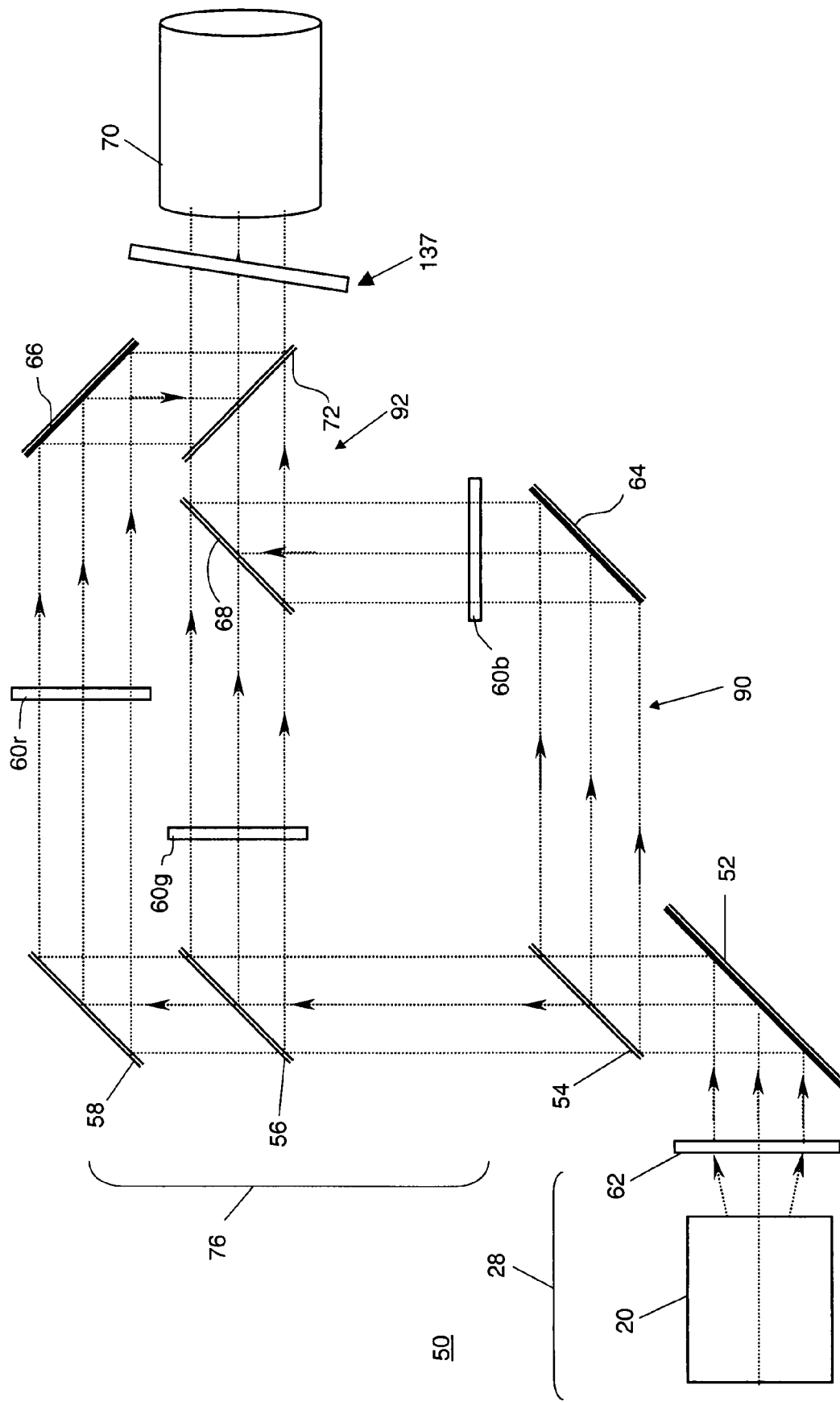
FIG. 13 is a block diagram showing an alternate arrangement with one modulator rotated.
Figure 26:
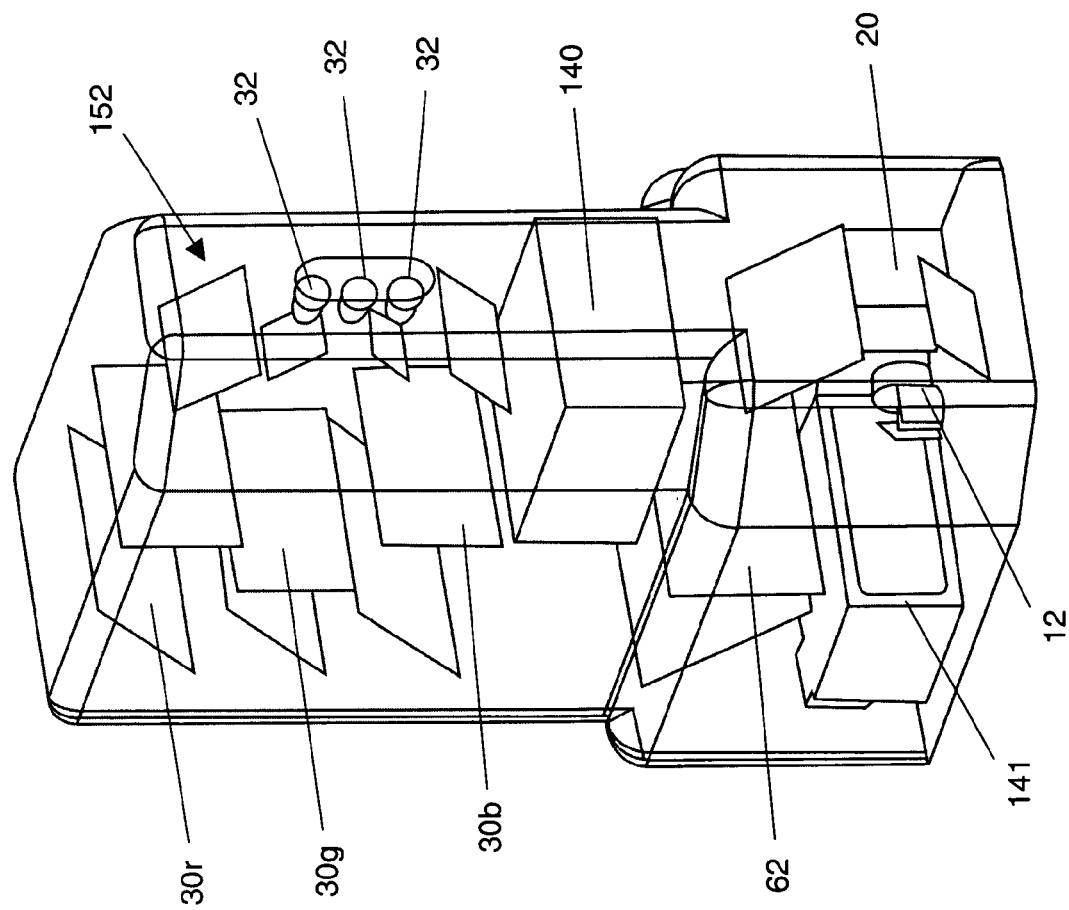
FIG. 26 shows a perspective view of an embodiment having different optical path lengths.

FIG. 13 shows an alternative embodiment, using the same basic arrangement shown in FIG. 2, but with changes in the orientation of components for more favorable packaging. In FIG. 13, for example, spatial light modulator 60*b* is rotated 90 degrees with respect to its original position in FIG. 2. FIG. 26 shows an embodiment packaged with three large direct view TFT LC spatial light modulators and subsequently three projection lenses in a configuration suitable for theatre booth operation for digital cinema.

Illumination Source and Optics

Another advantage of the design shown in FIGS. 2-4 design relates to light source 20. Light source 20 can be any of a number of types of lamps or other emissive components. It can be appreciated that it would be particularly advantageous to select a commercially available component as light source 20 to take advantage of low cost and availability due to high manufacturing volumes. In one embodiment, a conventional CERMAX™ Xenon arc lamp, available from PerkinElmer Inc., Wellesley, Mass., is used. The CERMAX Xenon lamp is advantaged by the higher pressure package that provides a smaller arc gap, as compared to a conventional bubble lamp. This smaller arc gap is desired with micro-display based systems as it enables more light to be utilized by the limited etendue of the system. These lamps, however, tend to be more costly as they are produced in smaller quantities than conventional Xenon bubble lamps. Because of its higher etendue, the large panel LC is more easily adaptable to conventional Xenon bubble lamps, with larger arc gap dimensions, while still maintaining high system efficiency. The capability to use such common off-the-shelf devices is a particular advantage when using a larger size TFT LC device.

Xenon bubble lamps can be configured into arrangements that reduce the effective etendue to below that of the least expensive elliptical reflector commonly used in film projectors. These arrangements vary, but most often compound reflector systems, such as that of the GE Taleria design, are used. Other configurations used include the approach from EELE of Bohemia, N.Y., in which a rectangular spot is produced from the rectangular side profile of the arc gap itself, and more elaborate configurations by others. These reduce the effective illumination etendue, typically to around a similar level to what the CERMAX design offers. (Refer to the various graphs of FIG. 19 comparing 1.5 kW Cermax to 1.9 kW ORC bubble lamp in compound reflector arrangement). They also substantially increase the cost and complexity of the illumination system. A simplified arrangement of the EELE approach may in fact be the least costly and most efficient method of coupling light to the preferred embodiment. Where a common Xenon bubble lamp is imaged from the side such that the arc gap image roughly matches the width of the panel image and the polarization recovery is done to have the height match the aspect ratio; and subsequently followed by uniformizing optics such as lenslet arrays.

Figure 21A:
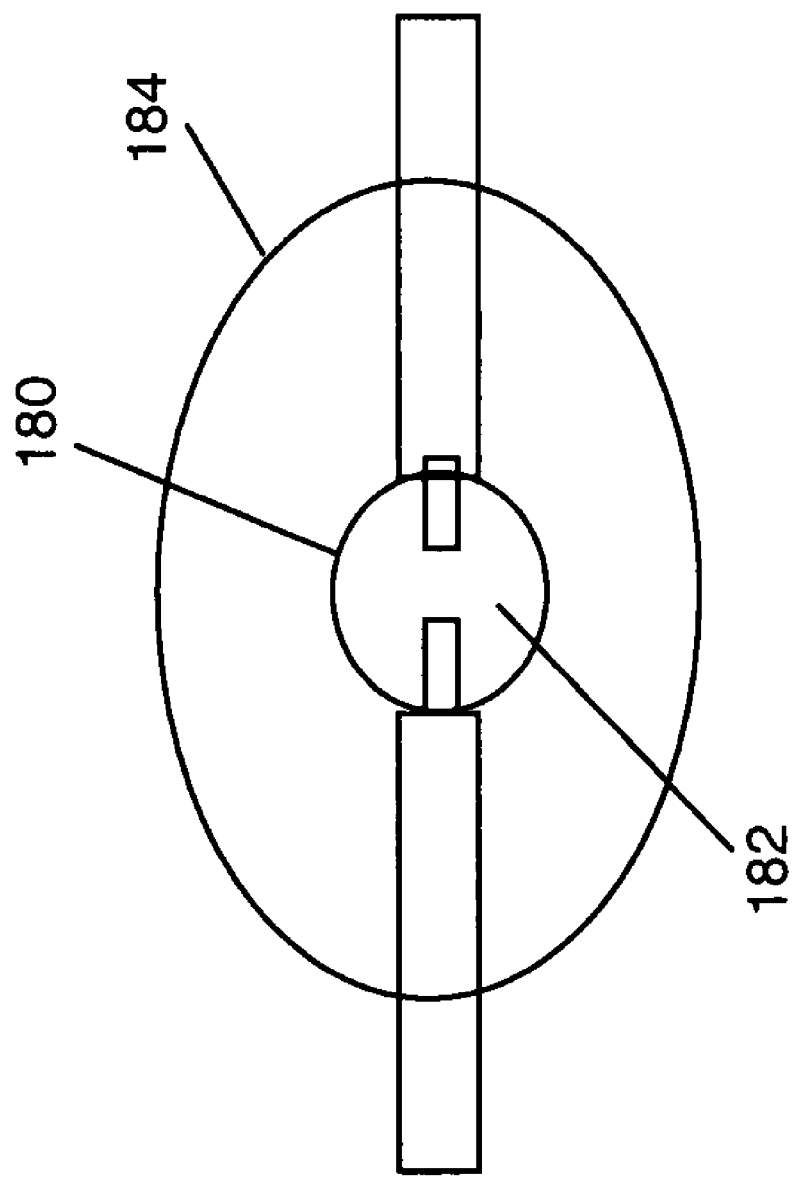
FIGS. 21A, 21B, and 21C are front, side, and image-wise views for embodiments using bubble lamp illumination in one embodiment exemplary of the present invention.
Figure 21B:
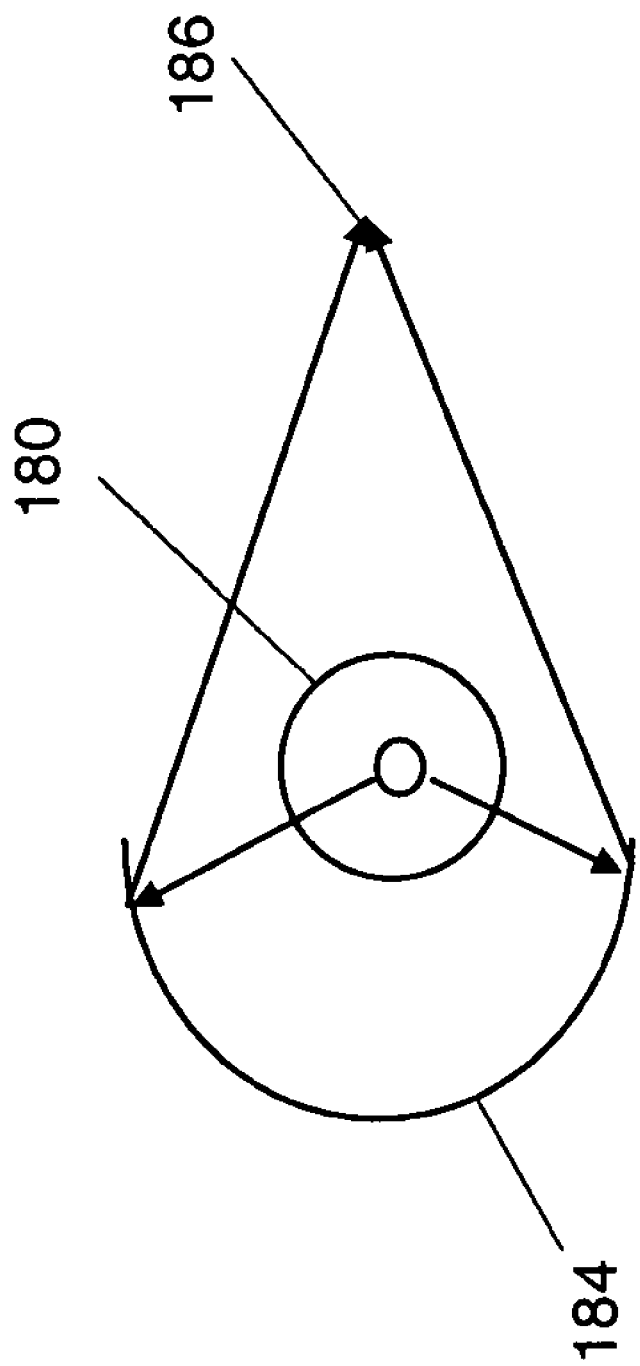
Figure 21C:
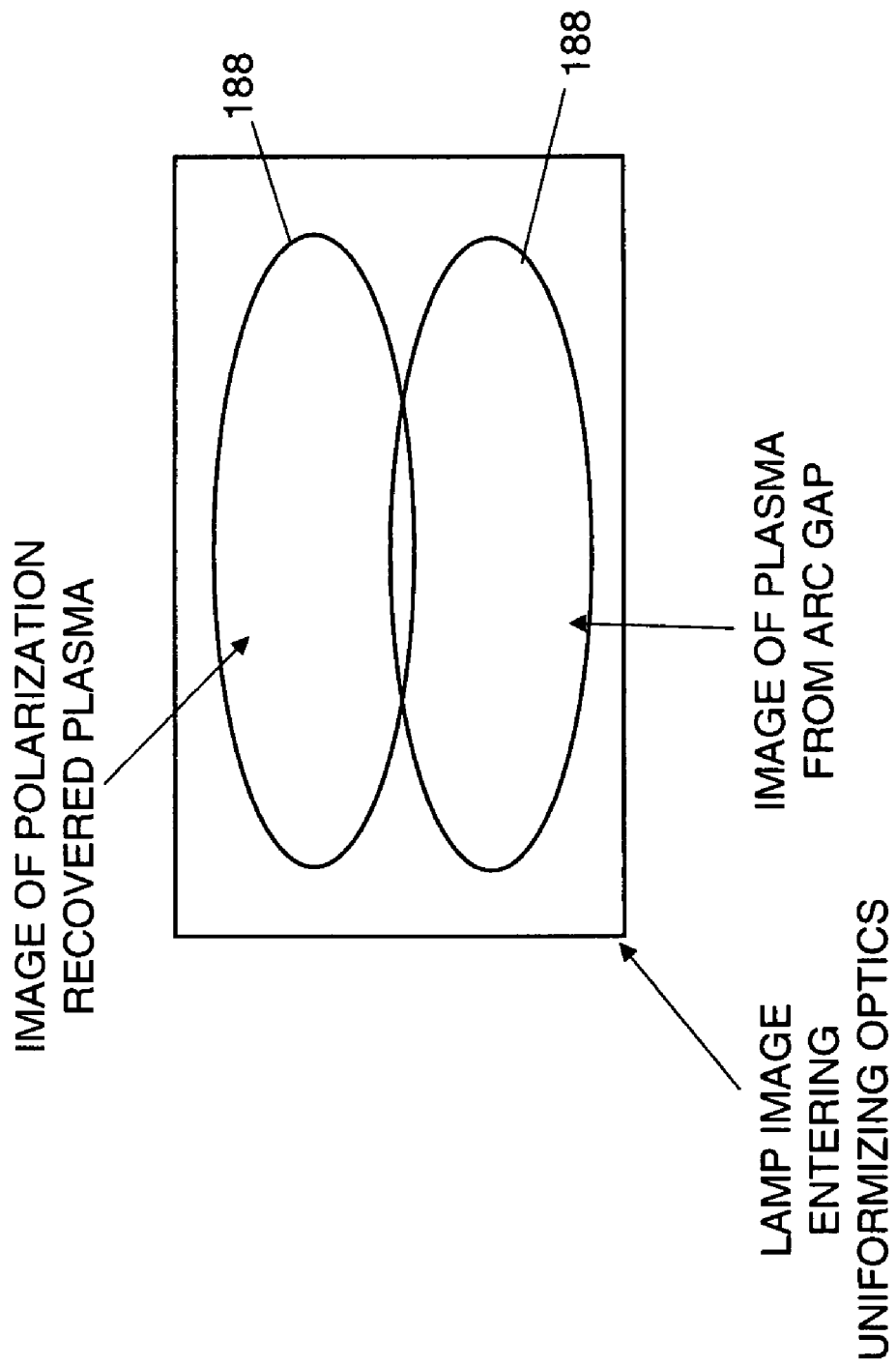

FIG. 21A shows a plan view of a bubble lamp 180 having an arc gap 182 and housed within a reflector 184. FIG. 21B shows this illumination arrangement in a side view, with a focus 186. FIG. 21C shows images 188 from plasma of arc gap 182, as the image enters uniformizing optics, when using polarization recovery. This arrangement is advantaged in that there is less loss in the uniformization process whereby two round spots are converted to a rectangle to better match the image proportions.

Similarly, multiple lamp systems are utilized to take advantage of the smaller arc gaps and, therefore, lower etendue. Since the illumination spots and angles are roughly Gaussian in form, the multiple Gaussians of several lamps are combined to utilize only the peaks of the Gaussian, overlapping the functions in the tail region to increase the overall output. This approach can still be utilized with the preferred embodiment, while still capturing a significant portion of the illumination of the tail regions. This is to be contrasted with using smaller microdisplay components that typically require one or more of these more custom light source solutions in order to provide the required output.

Figure 22B:
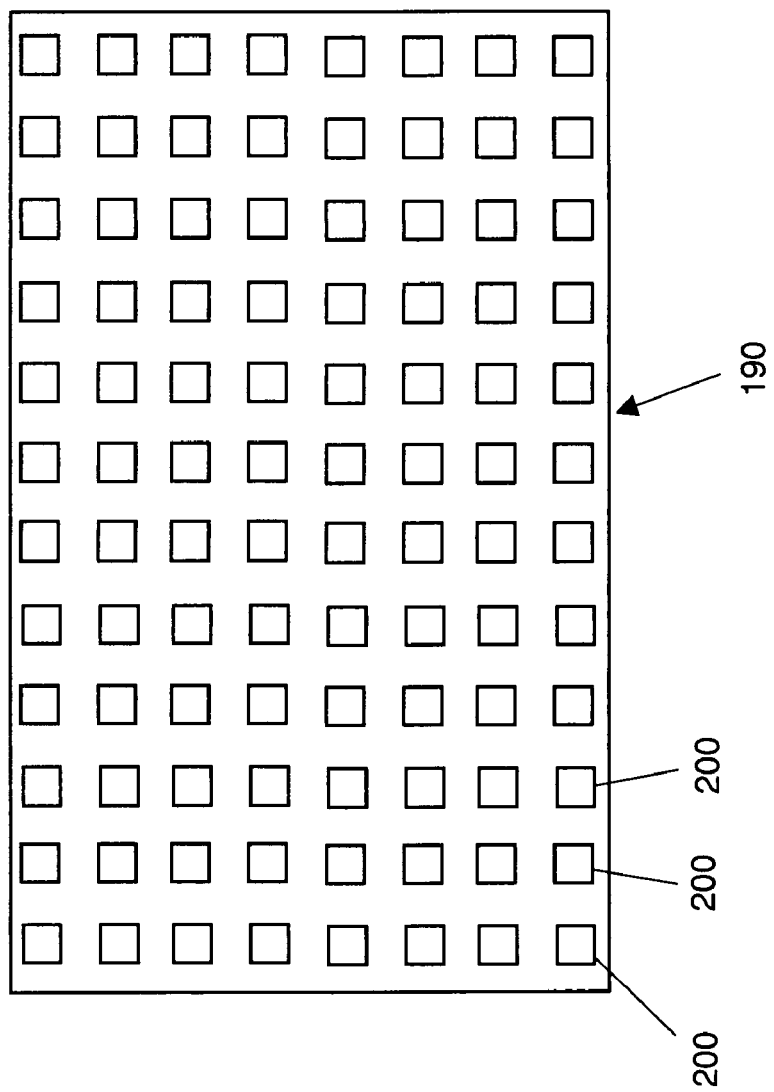
FIGS. 22A and 22B show side and front views, respectively, of an LED array having polarization recovery components.
Figure 22A:
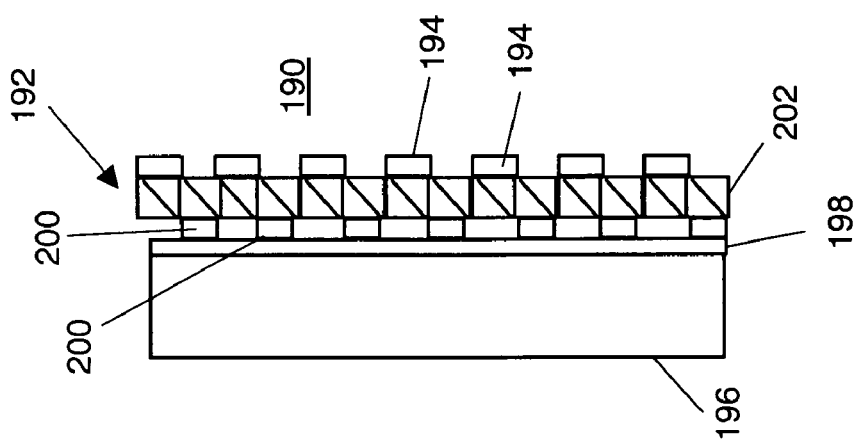

Other alternative light sources include high-power LEDs, which can be distributed in an array with polarization recovery as shown in FIGS. 22A and 22B. An LED array 190 has an arrangement of LEDs 200 formed on a chip substrate 198. LED array 190 is provided with a heatsink 196 or other support apparatus for cooling. Each LED 200 has a corresponding polarization beamsplitter 202 in a polarization beamsplitter array 192. A half waveplate 194 provides polarization recovery, as described earlier.

Figure 23:
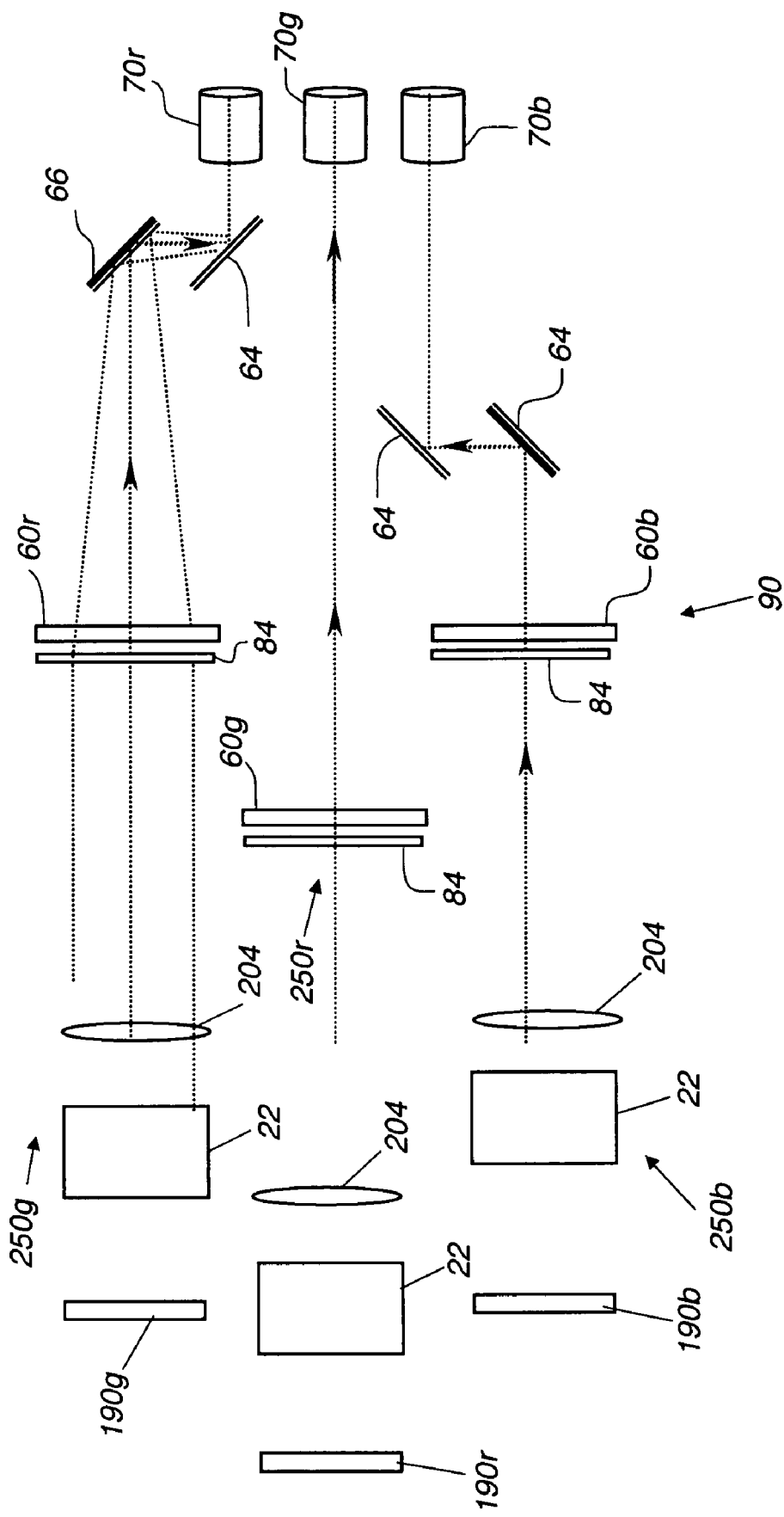
FIG. 23 is a schematic diagram showing an alternate embodiment using LED arrays as light sources.

FIG. 23 shows an embodiment using large panel LCDs for digital cinema with individual LED arrays 190*r*, 190*g*, 190*b*, one for each primary color (RGB) in a color channel 250*r*, 250*g*, 250*b*, for each of the display panels. Uniformizing elements 22 and an illumination relay 204 are used with each LED array 190*r*, 190*g*, 190*b*. One example, as was shown in FIGS. 22A and 22B, would be to make an area array of single spectral band LEDs and to provide a means of polarization recovery for the array, such as using a beamsplitter and half waveplate for each LED. This illumination can be uniformized utilizing lenslets or other techniques and then relayed to one of the display panels. Similarly each panel would have its own spectrally dedicated LED array.

Another option is to use ultra-high pressure Mercury lamps, for example. The LED approach may be a direct substitute for the Xenon lamp, where the LEDs are combined to provide a white light source that is uniformized and split. Recent developments in LED power from companies such as Lumiled with their Luxeon line, Luminus with their PhlatLight™ line or Osram and their Ostar™ line of high power LED chips currently deliver between 200-400 mW/mm$^2$ depending on the color. LEDs are advantaged in that the wavelengths can be selected to deliver the specific desired color gamut without the need to filter the light output, thus providing increased efficiency. As sources, however, these devices are relatively large, with a single chip being around 4 mm square. Thus, these devices have a large etendue. Hence, the proposed embodiment is favored for using LEDs as an illumination source as compared with a microdisplay.

Figure 5:
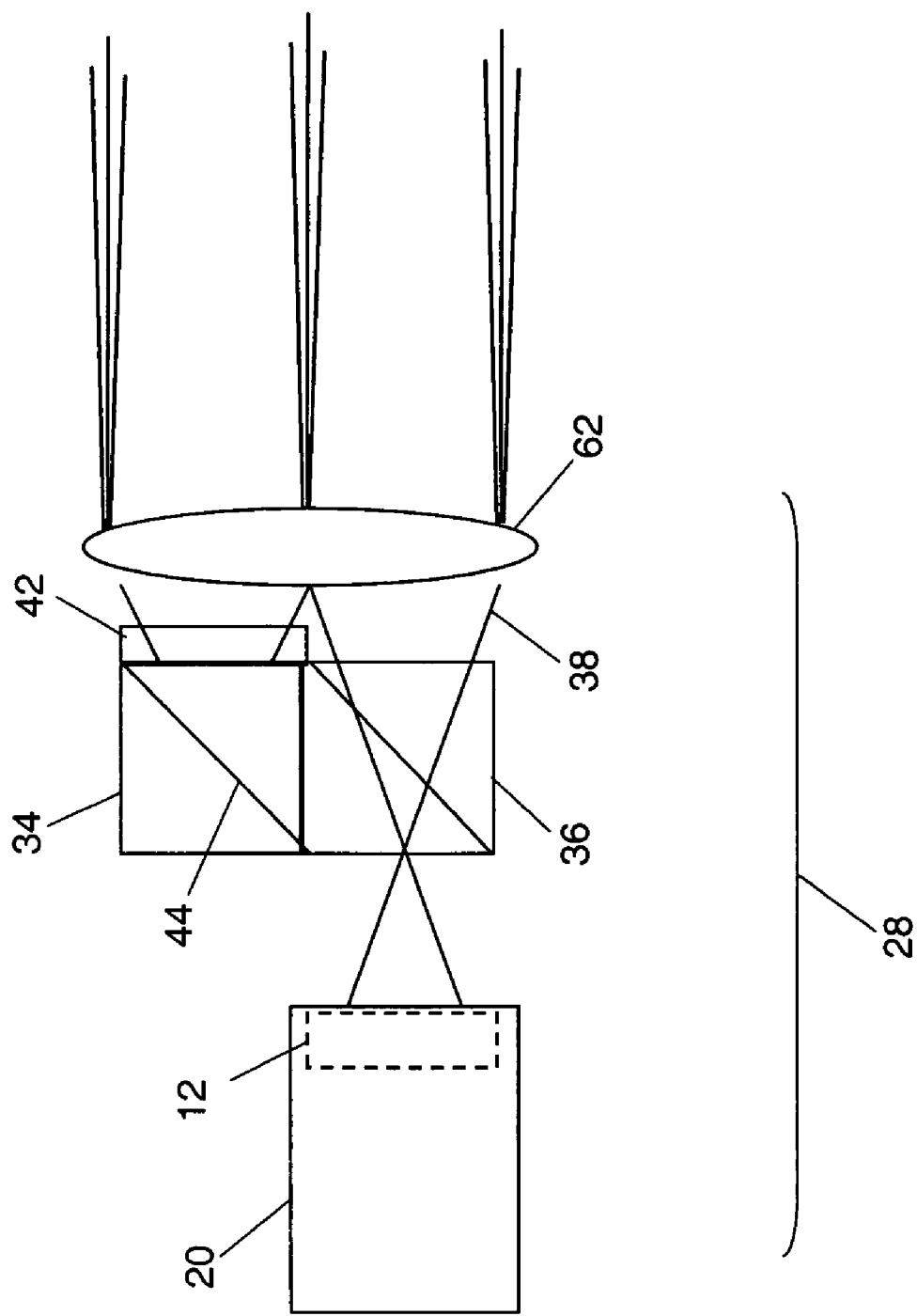
FIG. 5 is a block diagram of an illumination source for the apparatus of the present invention.

FIG. 5 shows the arrangement of illumination source 28 for providing the telecentric polarized polychromatic light beam in one embodiment. Light source 20 provides unpolarized polychromatic (white light) collimated illumination. The illumination can be collimated by using a parabolic mirror or by using an elliptical mirror combined with collimating optics. Light source 20 directs the collimated illumination to a broadband wavelength polarizer 34 for providing a substantially polarized illumination beam 38. Polarizer 34 transmits light having p-polarization. A polarizing beam splitter 36 transmits light having p-polarization and reflects light having s-polarization. A reflective polarization sensitive coating 44, then directs the light having s-polarization through a half wave plate 42. Half wave plate 42 converts this incident light to p-polarization. In this way, the complete polarized illumination beam has the same polarization state. This polarized light can subsequently be uniformized by methods that essentially maintain the polarization state of the light, such as lenslet arrays, not shown in the drawing. Thus, substantially all of the light output from light source 20 is converted to telecentric uniform polychromatic light of the same polarization state. This method provides light over a wider area and can be used with larger transmissive LC panels such as those used in the apparatus of the present invention. While conventional LCOS LCD projection systems utilize polarization recovery schemes like this, they are inherently more limited by the etendue limitations, thus they cannot fully take advantage of this type expanded light output.

In one embodiment of this polarization recovery method, polarizing beamsplitter 36 uses a wire grid polarizer, such as the polarizer type disclosed in U.S. Pat. No. 6,452,724 entitled "Polarizer Apparatus for Producing a Generally Polarized Beam of Light" to Hansen et al. Wire grid polarizers of various types are commercially available from Moxtek, Inc., Orem, Utah. The wire grid type of polarizer is particularly advantaged for handling high levels of light intensity, and is relatively insensitive to angles, unlike conventional types of thin film beamsplitters. In this embodiment it is preferred to have this wire grid polarizer placed such that its wire elements on its wire surface side face toward the imaging path of the system. This particular configuration may reduce thermally induced birefringence as disclosed in commonly assigned U.S. Pat. No. 6,585,378 entitled "Digital Cinema Projector" to Kurtz et al. Polarizing beamsplitter 36 could alternately be a conventional prism polarizer, such as a MacNeille polarizer, familiar to those skilled in the electronic imaging arts.

In conjunction with the lamp and polarization recovery system, the large TFT LC projection utilizes uniformizing optics 12 for providing a uniform illumination from a light source 20. Uniformizing optics 12 condition the output from light source 20 to provide a uniformly bright illumination beam for modulation. In one embodiment, an integrating bar provides uniformizing optics 12. Alternate embodiments include the use of lenslet arrays or some combination of lenslet and other integrating components.

Polarization

It is important to attempt to maintain the quality of the polarization state of the light to the spatial light modulator in order to achieve the required high contrast ratio of 1500:1 or better. An additional polarizer may be used after the polarization recovery scheme, uniformizing optics, or telecentric lens 62 in order to further increase the polarization ratio of the illumination. In the case where the energy density is high or angular requirements at the polarizer are fairly demanding, it is preferred to use non-absorbing polarizer such as a wire grid polarizer with the wires facing the modulator. In the case where the energy density is low and the spatial area is high, it may be preferred, due to cost or component availability, to utilize a film-based polarizer, such as absorptive dye, or iodine polarizers, or complex polarization structures like DBEF™ films, known as diffuse reflective polarizer films. In either case, it is important to pay attention to the impact of illumination levels on the optical components.

In the preferred embodiment, if additional polarization control is required after telecentric lens 62, a polarizer can be placed prior to, but preferably spaced apart from, the LCD panel.

Compensation

One advantage of the present invention is that compensators may not be needed or at least that the need for a compensator may be minimized. As is well known in the art, there are several basic types of compensator films. An uniaxial film with its optic axis parallel to the plane of the film is called an A-plate. An uniaxial film with its optical axis perpendicular to the plane of the film is called a C-plate. A biaxial film is where the index of refraction varies in all three dimensions, typically called an O-plate. Alternately, the A-plate can be described as providing XY birefringence (an anisotropic medium with XY retardance) in the plane of the compensator, while the C-plate provides Z birefringence along the optical axis in the direction of beam propagation through the compensator. A uniaxial material with $n_e$ greater than $n_o$ is called positively birefringent. Likewise, a uniaxial material with $n_e$ smaller than $n_o$ is called negatively birefringent. Both A-plates and C-plates can be positive or negative depending on their $n_e$ and $n_o$ values. As is well known in the art, C-plates can be fabricated by the use of uniaxially compressed polymers or casting cellulose acetate, while A-plates can be made by stretched polymer films such as polyvinyl alcohol or polycarbonate. The present invention minimizes or eliminates the need for C-plate compensators, since using the larger LC panels as modulator panels 60*r*, 60*b*, 60*g* results in reduced angular sensitivity. Similarly, biaxial films may be utilized, where the index of refraction varies in the x, y, and z planes to provide the needed retardation to optimize the system contrast.

First the substantially linearly polarized light of the illumination must be matched to the preferred polarization axis of the LC material. Where the LC has its orientation in parallel or orthogonal direction to folds in the system, such as in a vertically aligned arrangement, only a small amount of A-plate compensation may be required to fine-tune the polarization match. In the case where the panel is TN, the polarization is typically at a 45-degree rotation to that of the illumination polarization. This requires near half waveplate retardation to correct for the polarization states. Finally C-plate compensation may be desired to handle the small cone angle into the panel, which is typically 12 degrees or under. While reducing the angle of the input cone to the LC improves the contrast without C-plate compensation, proper compensation has been commercialized; for example, LG Philips LCD has a monitor with 1600:1 contrast ratio and a demonstration of 3000:1 contrast on a 100" demonstration LCD panel.

Where optical compensation is required, it is desirable to place the optical compensation component either after this "clean up" prepolarizer or just after the LCD panel and prior to the first polarization analyzer. In one embodiment, compensation may be effected by a combination of components both just before and just after the LCD panel.

Energy Density

A significant advantage to using large panel TFT LC devices instead of microdisplays relates to energy density at the light modulators and at other components in the light path. Energy density is a concern when designing with microdisplay devices, chiefly because the amount of heat generated from light absorption can be destructive. Because of energy density concerns, high-brightness projection apparatus using microdisplays must use more expensive components, more robust and resilient to higher heat levels, or must provide elaborate cooling apparatus. For example, thin absorptive polarization films cannot be used in intense energy light beams; instead, more heat-resilient wire grid devices must be used.

By comparison, for applications such as that shown in the embodiment of FIGS. 2 through 4, energy density at spatial light modulators 60*r*, 60*b*, and 60*g* is much less than the energy densities that would be required with a high-brightness microdisplay design, even when providing considerably higher output. For example, for a projection apparatus utilizing 1.3-inch diagonal LCD microdisplay devices and providing about 10,000-15,000 lumens at output, energy densities for internal light modulation and polarization components are in the range of about 6 W/cm$^2$, while component limitations such as the LCD device have a damage threshold of around 15 W/cm$^2$, ultimately limiting the amount of light to no more than about 20,000 lumens. By comparison, when using a 15-inch diagonal large panel LCD based system providing as much as 70,000 lumens at output, the energy densities for internal light modulation and polarization components are much less, in the range of about 1 W/cm$^2$. This lower intensity means that lower-cost supporting optical components such as thin-film absorptive polarizers, previously unusable because of high intensity heat concerns, can now be used in an electronic projection apparatus providing high light output. In turn, higher light output capacity means that a display screen of larger dimensions can be illuminated. In this and similar ways, the apparatus and methods of the present invention, using high-etendue design, obtain higher performance at lower cost.

As a related energy density concern, the material in telecentric lens 62 is chosen to have either a low light absorption or a low stress birefringent coefficient in order to reduce the impact of thermally induced birefringence. Quality molded Fresnel lenses are typically fabricated utilizing acrylic, which has a reasonably high level of heat tolerance and high transmission. Acrylic parts fabricated using compressive molding are preferred due to the lower inherent birefringence from this process. Alternatively glass or more durable polymers such as Zeonex from Zeon Chemicals, Louisville, Ky. can be used for this telecentric lens 62.

Telecentric Lens

Referring back to FIG. 2, telecentric lens 62 conditions the illumination to provide telecentric behavior. A lens can be telecentric in object space, image space, or both. With telecentric light, the chief rays for all points across an object or image are collimated and parallel to the optical axis. In effect, the entrance pupil and exit pupil of the telecentric lens are at infinity, so that angular distribution of light through the lens is fairly uniform. In the FIG. 2 embodiment, however, only the exit pupil is at infinity. Here it is only telecentric in image space (near the LCD panel); a consequence of the exit pupil being projected to infinity. Telecentricity is important in this application as color artifacts from the separate color illumination channels and variable panel angles would cause color non-uniformities at the final image if different pixels from the spatial light modulators contained different angular space. This is an important issue in multi-panel projection systems. Telecentric lens 62 can be spherical or aspherical. In one embodiment, telecentric lens 62 is a Fresnel lens. An alternative approach to using a fresnel lens as telecentric lens 62 is to use at least one reflective element. Reflective elements do not induce lateral color or structurally induced Moiré and may be easier to fabricate, such as by molding a large plastic element. While telecentricity from lens 62 is important to this approach, some deviation from perfect telecentricity is acceptable and desirable as a tradeoff that allows a smaller beam to pass through the dichroic beamsplitters. In this case a beam expander may also be utilized in order to properly size the illumination at the display panels.

As was shown in the embodiment of FIG. 2, the telecentric polarized polychromatic light beam that is output from illumination source 28 goes to color separator 76 and is split into two or more spectral bands. For full-color operation, color separator 76 forms at least three separate spectral bands, typically Red, Green, and Blue. Advantageously, incident angles for the bulk of the polychromatic illumination are within a constrained range, minimizing angularly induced spectral shift effects.

Figure 15:
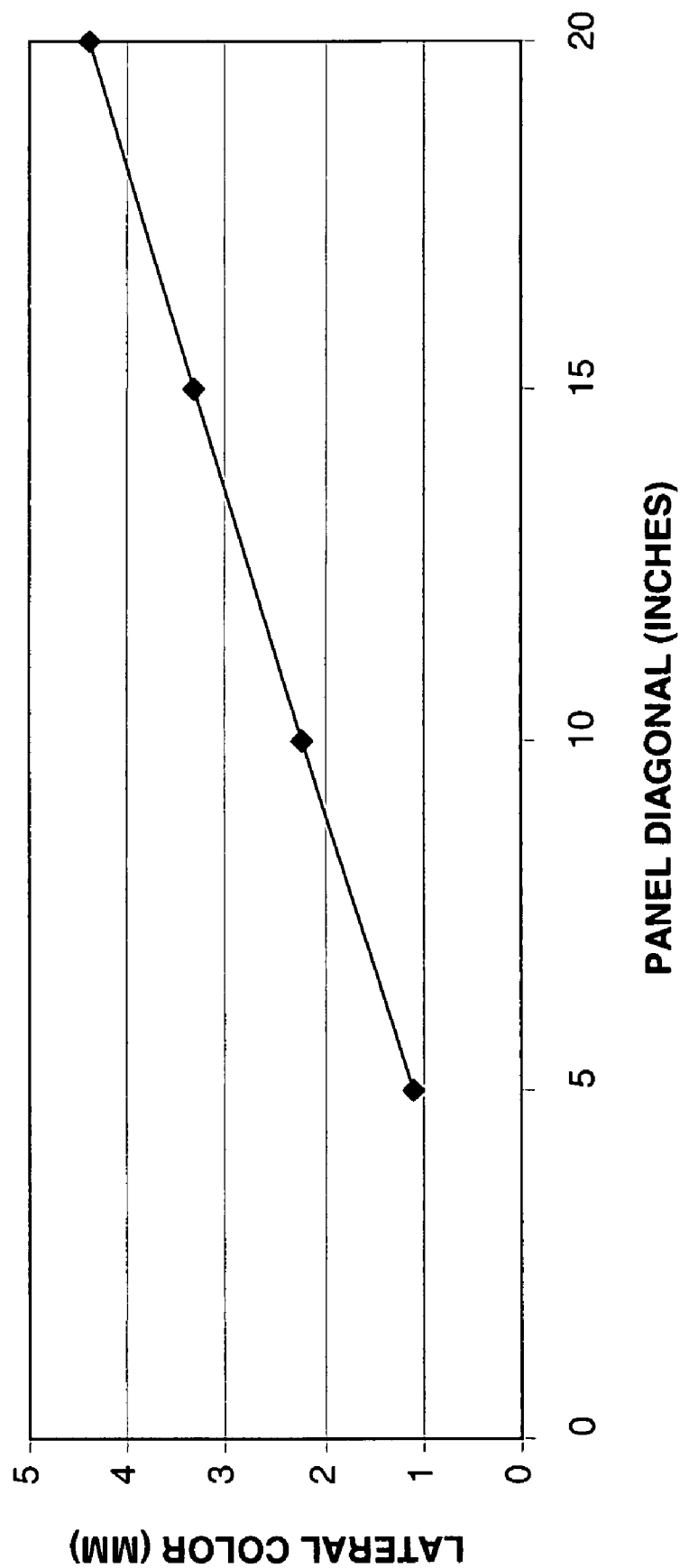
FIG. 15 is a graph showing lateral color effects related to LC panel size.

For the apparatus of the present invention, telecentric lens 62 may be fairly large, on the order of the dimensions of the active area of any of spatial light modulators 60*r*, 60*g*, or 60*b*. One potential difficulty when using a lens element of a relatively large diameter relates to lateral color, causing the different color channels to form images that differ slightly in dimension. Referring to the plan view of FIG. 6, there are shown the relative sizes of overlaid images 14*r*, 14*g*, 14*b* for red, blue, and green color channels, respectively. Due to lateral color, image 14*r*, the red channel is slightly larger than images 14*g* and 14*b* for green and blue channels, respectively. The image for the blue color channel, image 14*b*, is smallest in dimension. The graph of FIG. 15 shows the increase in lateral color relative to diagonal dimensions of spatial light modulators 60*r*, 60*g*, or 60*b*.

Correction for lateral color can be obtained by using an optional correction lens in the illumination path. In one embodiment, a Fresnel lens could be added to one or more color channels to correct for lateral color. These lenses can be placed in conjunction with telecentric lens 62, or along the optical path between lens 62 and the LCD panel.

An alternative approach to compensating for the lateral color would be to use an optional dispersive element prior to telecentric lens 62 such that lateral color of an equal, but opposite magnitude is induced in the optical path. One approach would be to design telecentric lens 62 with optimal performance for the central spectral band, for example, green wavelengths, and have the lateral color appear in the red and blue channels. An optional lateral color-inducing lens can then be designed with dispersive properties that compensate for the lateral color inherent in telecentric lens 62.

In any case, it is important to design the illumination path such that the illumination levels and uniformity, including edge rolloff of each spectral channel, most closely match that of the neighboring channels so that optical efficiency is not lost in color balancing for uniformity across the screen.

In general, it is considered optimal to achieve equal optical path lengths in the imaging path (between the display panel and the projection lens) for each color channel, as is disclosed, for example, in the '390 McKechnie et al. and '709 Tiao et al. patents cited earlier. However, adjustment to optical path length in the illumination path has been shown to be advantageous for projection apparatus 50 when using TFT LCD panels of larger size, as in embodiments of the present invention. With the particular arrangement of the present invention, focus of light along the optical paths for illumination becomes less critical than with conventional designs. This means, for example, that adjusting the relative position of one of spatial light modulators 60r, 60g, 60b along the optical axis O can be done without requiring that the modulator be positioned exactly at a focal, point of telecentric lens 62. This allows adjustment to allow for equalizing path length for imaging side optics, which is more sensitive to matched path lengths.

Moiré Compensation

Figure 17:
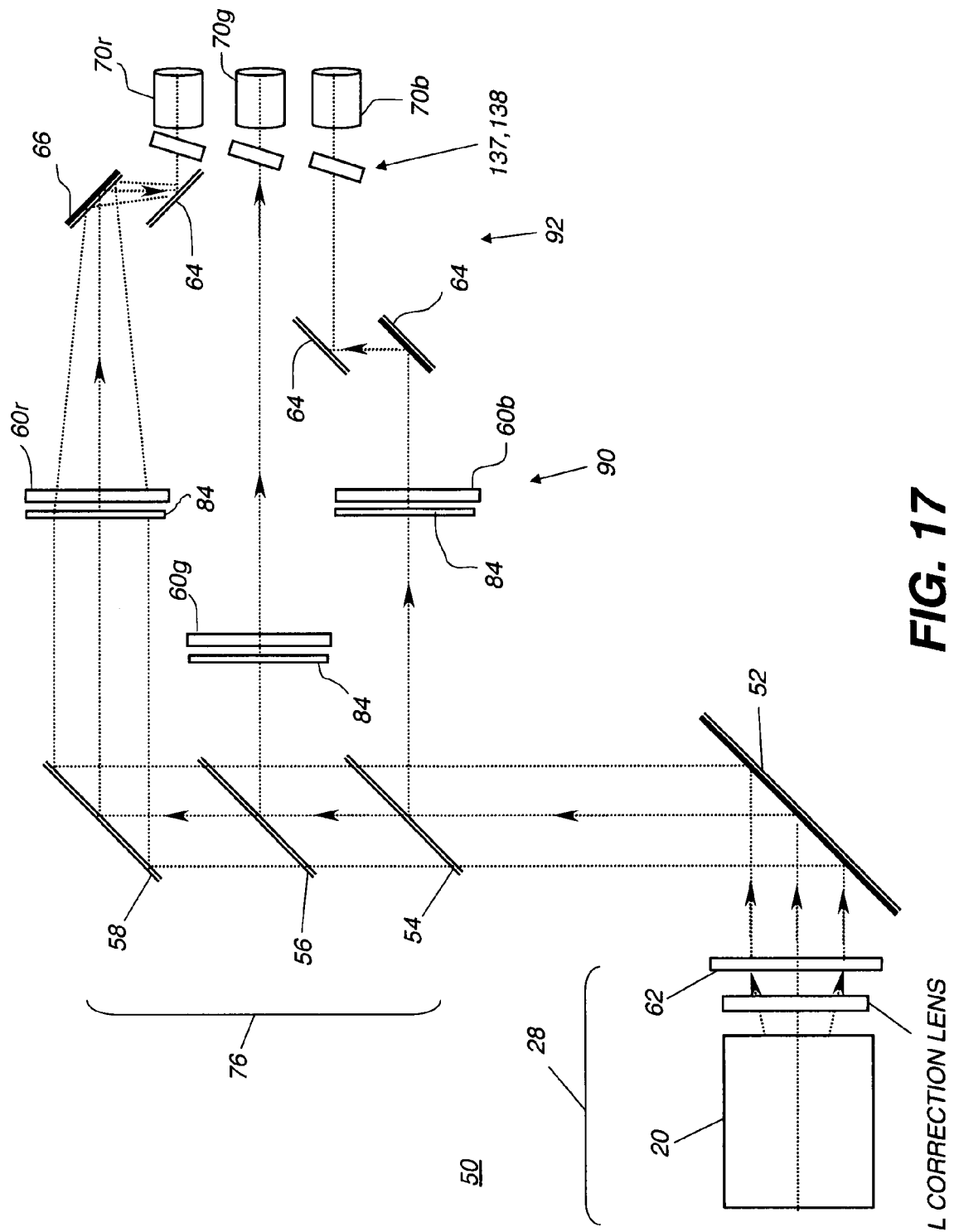
FIG. 17 is a block diagram of an embodiment of the present invention using a projection lens in each color path.
Figure 25:
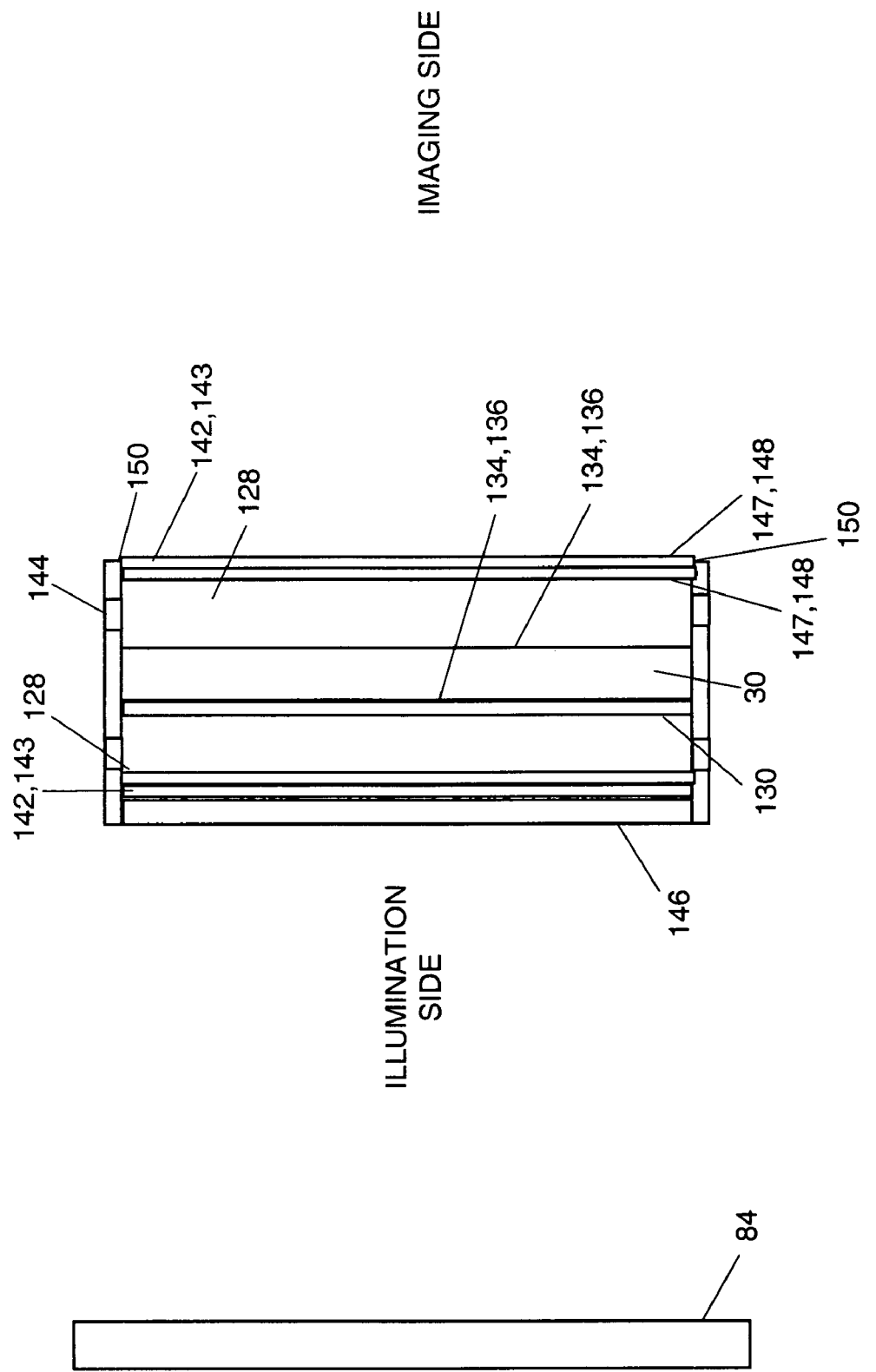
FIG. 25 is a block diagram showing an arrangement of components relative to the spatial light modulator in one exemplary embodiment of the present invention.

Moiré is one potential artifact that results from using a fresnel lens 84, shown in FIG. 17, in conjunction with a repetitive structure such as a large panel LCD. One possible strategy for reducing Moiré effects is to defocus the illumination light sufficiently enough to reduce the imaging properties of the Fresnel lens such that intensity beating does not occur. An alternative would be to utilize crossed cylinder lenses rotated at the proper angle so that frequency beating between the two spatial patterns is reduced or eliminated. Referring to FIG. 25, a very small angle of diffusion from an optional diffusion layer 146 can be used to remove residual structure. In addition, by moving the Fresnel field lens 84 away from the LCD panel, the Moiré patterns lessen and eventually visually disappear.

One way to correct this problem is to enlarge the size of the telecentric beam that impinges on field lens 84 so that, even with the field lens separated from the LCD panel by some amount, the converging beam of light is still sufficiently large to fill the entirety of the panel. There are at least two techniques that can achieve this result. One technique is to modify the telecentric lens (at some position before the illumination dichroic beamsplitters) so that the beam emerging from it is wider than the LCD panel width. Another technique is to enlarge the beam after it passes through the dichroic beam splitters by adding a negative lens, causing the telecentric entering beam to emerge as a divergent beam. Then, field lens 84 would intercept the enlarging beam and redirect it to the projection lens pupil.

In the preferred embodiment Fresnel field lens 84 is on the illumination side of the LCD panel. While this has advantages, it also means that the light impinging the LC panel is not telecentric. This requires the panel to have good angular polarization compensation (C-plate over approximately 12 degree field). Otherwise, the contrast ratio will drop toward the device edges. An alternative embodiment would be to move Fresnel field lens 84 to a position in front (that is, on the imaging side) of the LCD modulator panel. This would require relatively good image quality and require Moiré to be corrected by an alternate means. In addition or conjunction with the above methods, a diffusive layer may be added to the absorptive polarizer prior to the panel between the telecentric lens 62 and the polarizer to further reduce Moiré.

Configuration of Spatial Light Modulator 60r, 60g, 60b

Figure 7A:
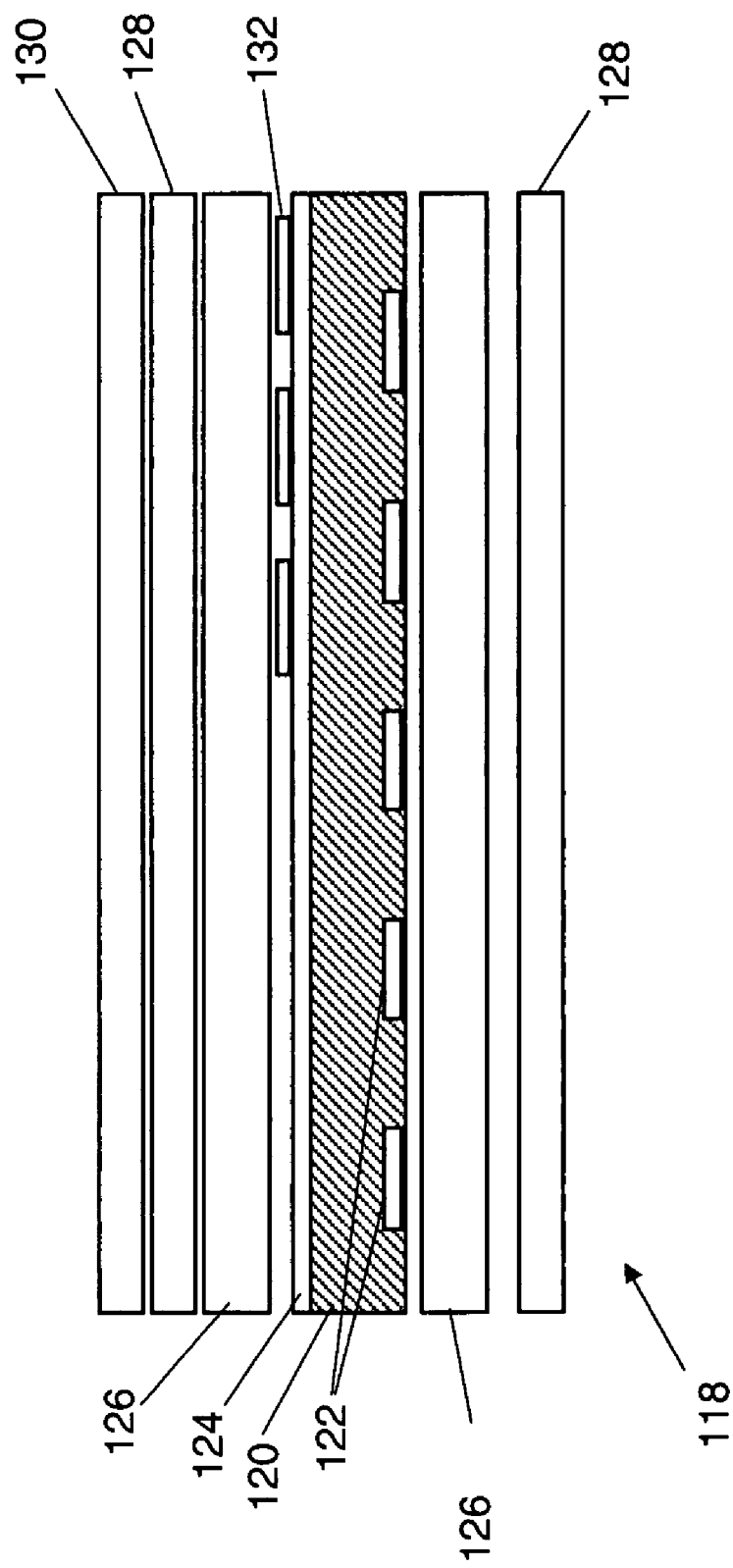
FIG. 7A is a cross section of a conventional large panel LC device.

For the embodiment of FIGS. 2-4, spatial light modulator panels 60r, 60g, 60b are transmissive TFT LC panels each having a diagonal of 5 inches or greater. A high resolution panel component, (2048×1080 or 4096×2160 pixels) would be particularly advantaged for applications such as digital cinema. In the embodiments of FIGS. 2 through 4, LC modulator panel 60r, 60g, 60b is modified and simplified from conventional use as a "direct view" panel, for use in a projection application. Referring first to FIG. 7A, there is shown a conventional LC modulator panel 118 as provided by the manufacturer for display use. In this conventional arrangement, LC material 120, with its control electrodes including an ITO layer 124 and thin-film transistors 122 is sandwiched between plates of glass 126, along with a color filter array 132. Front and rear polarizers 128 are absorptive sheets whose performance is compromised by high heat levels. The absorptive nature can be self-damaging, lowering contrast and spectral transmission, as well as impacting the performance of the liquid crystal layer by heat transfer. Ultimately, the high heat levels lead to variable contrast and image non-uniformity. A compensation film 130 is also provided for enhancing contrast, especially in an attempt to increase the viewing angle of the display. These compensation films are typically designed to retain acceptable contrast levels by direct viewers that may be utilizing the device a full 180 degrees in two dimensions. In many devices, other enhancement films are used, but not shown, such as diffusing layers, layers to help recycle polarization, and layers that even out the illumination from the backlight. The panel is then combined with a backlight unit that typically combines cold cathode fluorescent tubes feeding into a total internal reflection optical component (that is, a light guide) that allows light to be emitted relatively uniformly toward the panel.

Figure 7B:
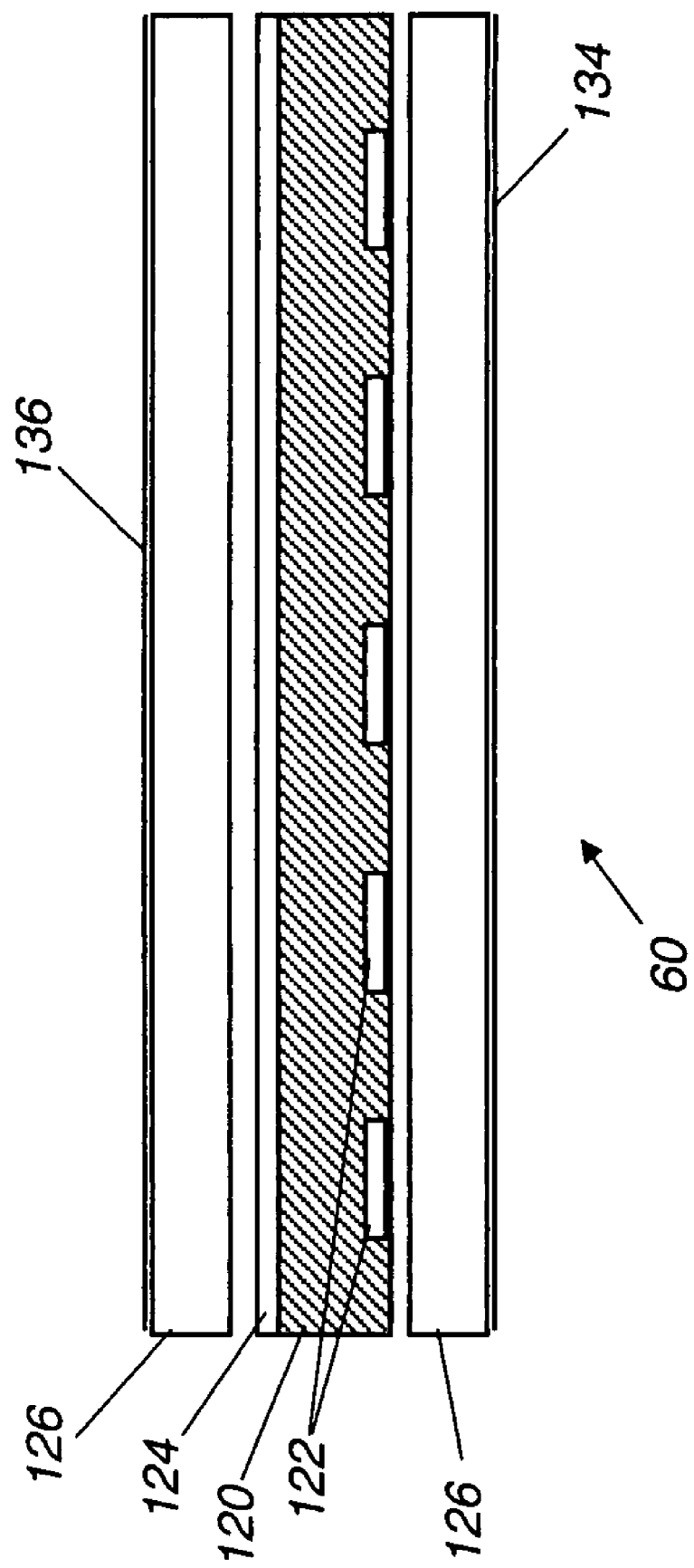
FIG. 7B is a cross section of a simplified large panel LC device according to the present invention.

FIG. 7B shows the simplified arrangement of LC spatial light modulator 60r, 60g, 60b panel as used in the present invention. The LC panel includes a pixilated structure with transistors in the borders surrounding the transmissive region. The transistor is protected by a black matrix, however, sub-pixels for colors and color filter arrays are not needed. The LC material is sandwiched between two transmissive substrates having at least some rigidity. The substrates are preferably dielectric anti-reflection coated (this can be provided on a separate film base), but do not have anti-glare or other diffusive treatments. Polarization films are removed, as are diffusing films, angular control films, and other specially functioning films. Compensation film 130 may be removed; even if maintained, the performance requirements and cost of compensation film 130 are significantly reduced, due to the extremely low angular deviation of the light from normal to the LC surface. While typical "direct-view" displays typically need uniform contrast ratio over a viewer's complete axis (up to 180 degrees in both directions), this system has an angular requirement of around 2 degrees for a 15" panel. Front and rear polarizers 128 are also removed from direct contact with the spatial light modulators 60r, 60g, 60b themselves. Others, such as in the Clifton disclosure cited earlier, have attempted the use of large LCD panels for lower lumen systems. In this art, the approach described in the Clifton disclosure utilizes color filter arrays (CFAs) and has an additional black matrix associated with the subpixels. Both of these components present drawbacks when trying to provide for high lumens and a large effective etendue. Additionally Clifton discusses removing materials such as polarizers, compensation films, and anti-glare layers so that the sequential contrast can be enhanced by keeping the incident angle to the panels small. While separating out the polarizers for a high lumen application is desirable to prevent heat affecting the uniformity, compensation films may be more desirable and would improve the contrast when properly designed. Clifton also fails to recognize the necessity of anti-reflective coatings to prevent back reflections from the substrates causing a loss in ANSI or checkerboard contrast (a decrease in contrast of a black pixel by a neighboring white pixel). For a digital cinema projector, a high ANSI contrast of 200:1 or greater is required. Additionally, the conventional approach does not recognize the negative impact from an image quality standpoint of the aperture ratio causing a "screen door" artifact.

Optional wire grid polarizers located in proximity to the LC panel are capable of handling high light levels without absorbing substantial amounts of light energy and are particularly well suited to high intensity application in projection apparatus 50. Wire grid polarizers are designed to reflect the non-transmitted polarization state. Ideally, the polarizer would be inexpensive in a sheet form, as disclosed in US Patent Publication 2006/0061862 A1, by Mi et al. The contrast ratio would not need to be extremely high (on the order of 100:1, as the pre-polarizer is able to provide a reasonable level of polarization). On the imaged side of the display panel, it is desired to place the wire-grid polarizers in a position such that this reflected light does not return to the LCD, so as not to impact the ANSI contrast. There are two alternatives to implementing this: the first is to utilize the reflected polarization state for the imaging light. The second alternative is to tilt the wire-grid such that the reflected return light bypasses the LCD modulator, either blocked by an aperture stop or by simple spatial separation. In this case, the diverging image light is transmitted through a tilted plate, which introduces optical aberration into the system. Utilizing a thin wire-grid structure minimizes this effect. In addition, a second plate may be placed into the beam at an opposing angle in order to directly compensate for astigmatism in the beam. The remaining aberrations will generally not be significant enough to require further compensation in order to maintain image quality.

Spacing the polarizers apart from LC material 120 prevents heat transfer that would negatively impact the uniformity of the image. Color filter array 132 is no longer needed, as the spectral light is spatially separated. This removal of the color filter array is particularly advantageous for a high luminance system such as would be used for digital cinema, where the absorptive nature of the color filter array would present a performance and degradation problem due to the heat generated. Use of a reflective color filter array is possible, however, loss of the reflected light is not desirable. In this case a color recovery system may be utilized to maintain system level brightness. Part of the color filter array structure includes a black mask, provided as a means of blocking light from directly hitting the transistor structure, and for providing a retention means for the color filter materials. While the light blocking is still desired, the retention means is no longer needed. Other means such as reflective coating or continued use of a black mask may be used to protect the transistor from incident light. An optional antireflection coating 134, 136 may be provided on both external surfaces of glass 126. Antireflection coating 134, 136 would help to reduce checkerboard effects and increase the ANSI contrast ratio, minimizing the interactions of neighboring pixels from stray light.

In the preferred embodiment, on the imaging side of the LCD panel, a relatively highly transmissive absorptive polarizer is used as a first level analyzer in the system. This enables the polarization state of light transmitted through this analyzer to be substantially linear, thus less affected by any phase shifts due to reflective components that may be introduced into the system. This contrast ratio could be subsequently improved as shown in FIG. 17 by placing a smaller higher contrast ratio tilted polarizer 137 later in the system, for example, using a wire grid or other polarizer appropriate for the energy density, tilted in the projection lens space, so that the return light does not impinge upon the spatial light modulator. For example, this can be placed prior to the projection lens or for a smaller component, within the projection lens in the proximity of the aperture stop.

Screen Door Effect

Figure 27:
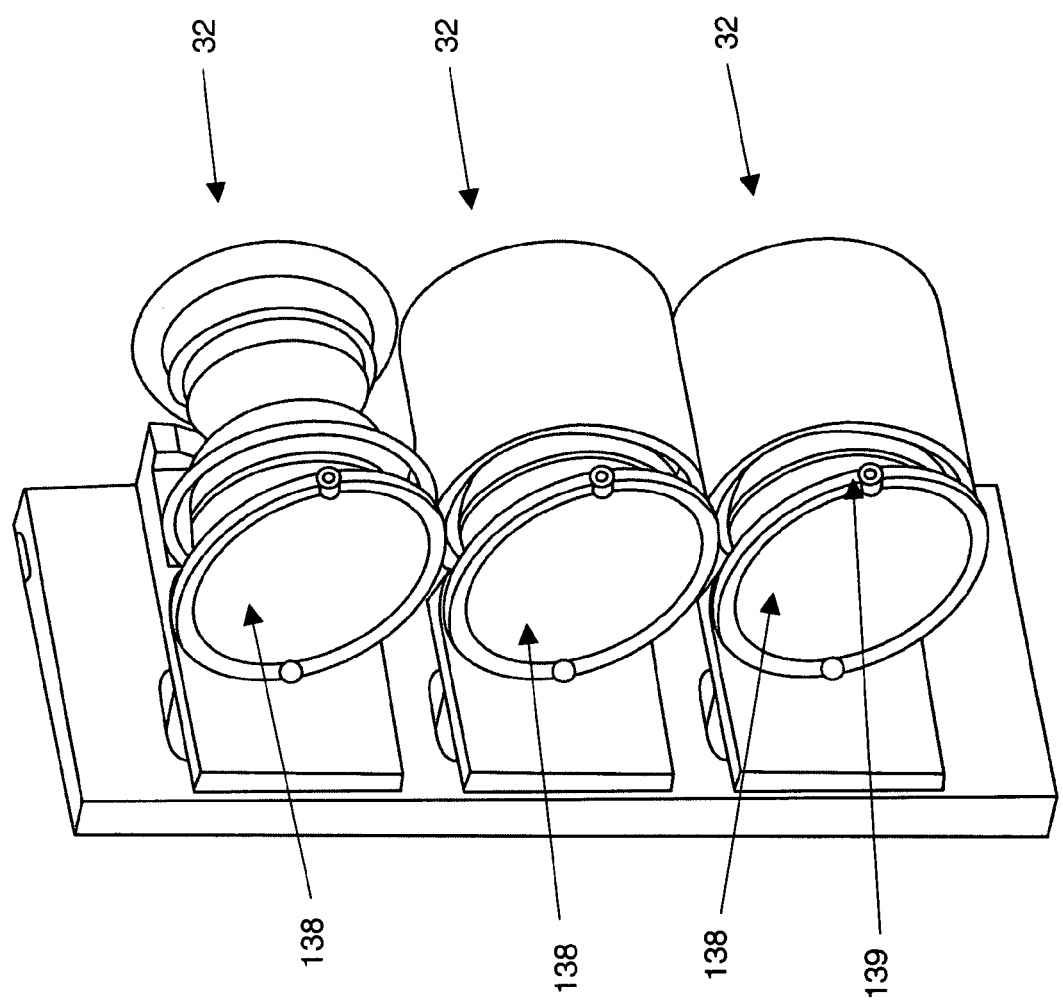
FIG. 27 shows a perspective view of an embodiment of the present invention using a dither mechanism.

Since the aperture ratio of the "direct view" LCD displays is relatively large as compared with that of microdisplay devices, the borders around the pixels negatively impact the image quality. Unlike the direct viewing situation, these borders may be quite visible on a large screen, particularly where the display is magnified. This effect is commonly known as a screen door artifact and is considered unacceptable to the high quality requirements of digital cinema projection. It is possible to soften these distinct pixel edges and the borders surrounding them by shifting the individual pixel images by roughly ½ the distance of the aperture border during the exposure of the individual motion frame. In that way the light energy of the pixel is spread into the aperture region and the viewing eye time-averages this effect to make the pixel appear to fill the region. The timing or driving signal can be adjusted to control the exposure profile; for example, a sinusoid or a step function may be used. This technique, known as dithering is sometimes used in printing in order to provide edge softening or increased resolution, as shown in commonly assigned U.S. Pat. No. 6,930,797 by Ramanujan. Dithering can be performed by many methods, including by moving the display panels, by moving the projection lenses, or by rotating a tilted plano optical plate or an optical wedge in the imaging path. In one embodiment, a wiregrid polarizer disposed just prior to the projection lens is repeatedly tipped in two orthogonal directions to provide motions to smooth both the top and side apertures of the pixels. In one embodiment, partially shown in FIG. 27, a dither plate 138 is mounted to a dual axis gimbal mount using frictionless flexure pivot bearings 139. The dithering motion for pivoting can be performed using a cam on a motor, a piezo-electric pusher, a solenoid, or some other controlled actuator. The dithering motion required at this point in the system is less than 5 degrees in one embodiment.

Alternatives to physical actuation of an element to reduce the screen door artifact would be use of a polarization blur filter, as is commonly used in digital cameras. Defocus is perhaps the simplest means for screen door artifact compensation, however, this causes some overlap of energy from one pixel into its neighbor. With defocus, some edge sharpness is lost, resulting in some decrease in the modulation transfer function. Another approach is to create a cut frequency filter for the specific frequency of the aperture and design this into the system.

Mounting Arrangement for Spatial Light Modulators

In one embodiment (not shown), spatial light modulators 60r, 60g, 60b are mounted together into a pre-aligned assembly held adjacently nominally in a common plane. For example, utilizing a typical "direct view" pixel dimension of between 100-250 um, it would not be mechanically difficult to have the three spatial light modulators 60r, 60g, 60b pre-aligned to the remaining projection optics in such a fashion that the projection lens adjustment could be done in the field to provide a properly focused and converged image. This modular approach is advantaged for digital cinema applications in that the entire assembly containing spatial light modulators 60r, 60g, 60b may be removed and replaced as a field-replaceable unit. For example, if the panels become damaged or technologically obsolete, the assembly may be replaced with undamaged or higher performing components. This would not be nearly as simple for a micro-display based projection system.

Additionally, this spatial light modulator assembly could be protected by windows 142, 143, spaced apart from the spatial light modulator itself, on the imaging and/or illumination side of the modulator. These windows can be useful to defocus dust that can accumulate during operation. These same windows can be part of a polarization and/or compensation assembly, where the films become the window, or are bonded to the window substrate itself. In either case, AR coatings (147, 148) are desired to reduce back reflections and light loss. Additionally, it is also desired to have a durable surface that can be cleaned for longevity of operation. Vents 144, shown in FIG. 25 may be incorporated between the subpanels and the LC panel, where filtered air may be used to sufficiently cool the panel and polarizer components.

Similarly, the tolerances from panel to panel are significantly larger than with micro-display systems. For example, alignment held to ½ pixel in a microdisplay device is approximately 5 microns, while in a large panel this is approximately 50 to 100 um. Therefore, it is possible to replace a single panel in the system and either have a factory reference alignment with respect to a datum structure within the modulator mounting system, or simply realign the single panel to the other two in the field. This is particularly important for the blue channel, as LCD materials and the polyimide alignment layers are most sensitive to the higher energy spectrum of blue and UV light. Therefore, it is anticipated that the blue spatial light modulator may have a shorter reference mounting of each panel with respect to the machine and/or with each other. Examples may include a spaced subpanel containing, at minimum, a polarizer prior to the LCD and a spaced subpanel after the LCD containing, at minimum, a polarizer with AR coatings on both sides.

LC Modulator Panel

As noted earlier with respect to FIG. 14, the dimensions of LC modulator panel 60 can be optimized to suit the performance requirements of projection apparatus 50. In contrast to the miniaturized LCOS LCD solutions previously used, LC modulator panel 60 can be a larger scale device larger than typical laptop displays, from about 5 to 20 diagonal inches or more. Although early LC panels were disappointingly slow, ongoing work has provided speed improvements of 100% and better, and it appears that increased speeds are feasible. Improved response times of 4 msec or shorter have been reported. For the stringent requirements of digital cinema, it is important to try and balance these response times across all code values of each of the panels used. This will help to reduce motion artifacts. Shuttering or blanking using a shutter may also be utilized to effectively block the light during image transitions.

Ideally, modulator panel 60 can be sized just large enough such that the full lamp system etendue can be utilized, yet small enough to give the fastest response time, with the optimum size for pixel structure and electronics to be fabricated utilizing standard TFT LC panel methods. Additionally, the size dimension impacts the projection lens dimensions, so manufacturing and technology factors associated with the projection lens design are significant considerations. One key consideration is to achieve the resolution required by the digital cinema system with a pixel size that is achievable and commercially available, in order to take advantage of the large panel-manufacturing infrastructure utilized for televisions and monitors.

The conventional TFT LC panel device has an aperture ratio in the 60-70% range, significantly less than the aperture ratio of approximately 90% for LC microdisplay devices. Some percentage of lost aperture is due to drive transistors and interconnection components. However, a portion of the reduced aperture ratio is due to the black matrix fabricated as part of the color filter array 132 (FIG. 7A) for the LC device. Because the present invention uses embodiments with separate color channels, however, the color filter array for the LC device is not needed and is removed. At least that portion of the black matrix that separates one color from another can also be removed so that, for example, the lost aperture area between red and green color portions is reclaimed, creating additional active area (FIG. 7B). This can result in an aperture ratio improvement of as much as 8-12% or more for some LC panel designs. While most monochrome LC panels maintain this, for example, high resolution TFT LC panels made for direct view medical applications, this application would benefit from a custom panel that no longer retains these pixel obscurations. It is important however, to maintain the highest level of light blocking on the transistor structure, since light levels will be relatively high compared with conventional large panel direct view illumination.

This reduced aperture ratio of large TFT LC panels relative to microdisplay creates a light loss of anywhere from 20-40%. Higher efficiency can be obtained by the use of micro-lenses on a pixel-by-pixel basis, focusing the light into the unapertured area of the LCD structure. This microlens array can be separate from the panel, but is preferably fabricated onto the LCD glass under the same process that forms either transistors or aperture blocking arrays, such that alignment between the pixels and lenses is part of the manufacturing process. Similarly, a micro-lens array can be utilized on the imaged side of the panel to fill the gaps of light due to the light-blocking aperture in the panel.

Projection Optics

Figure 8:
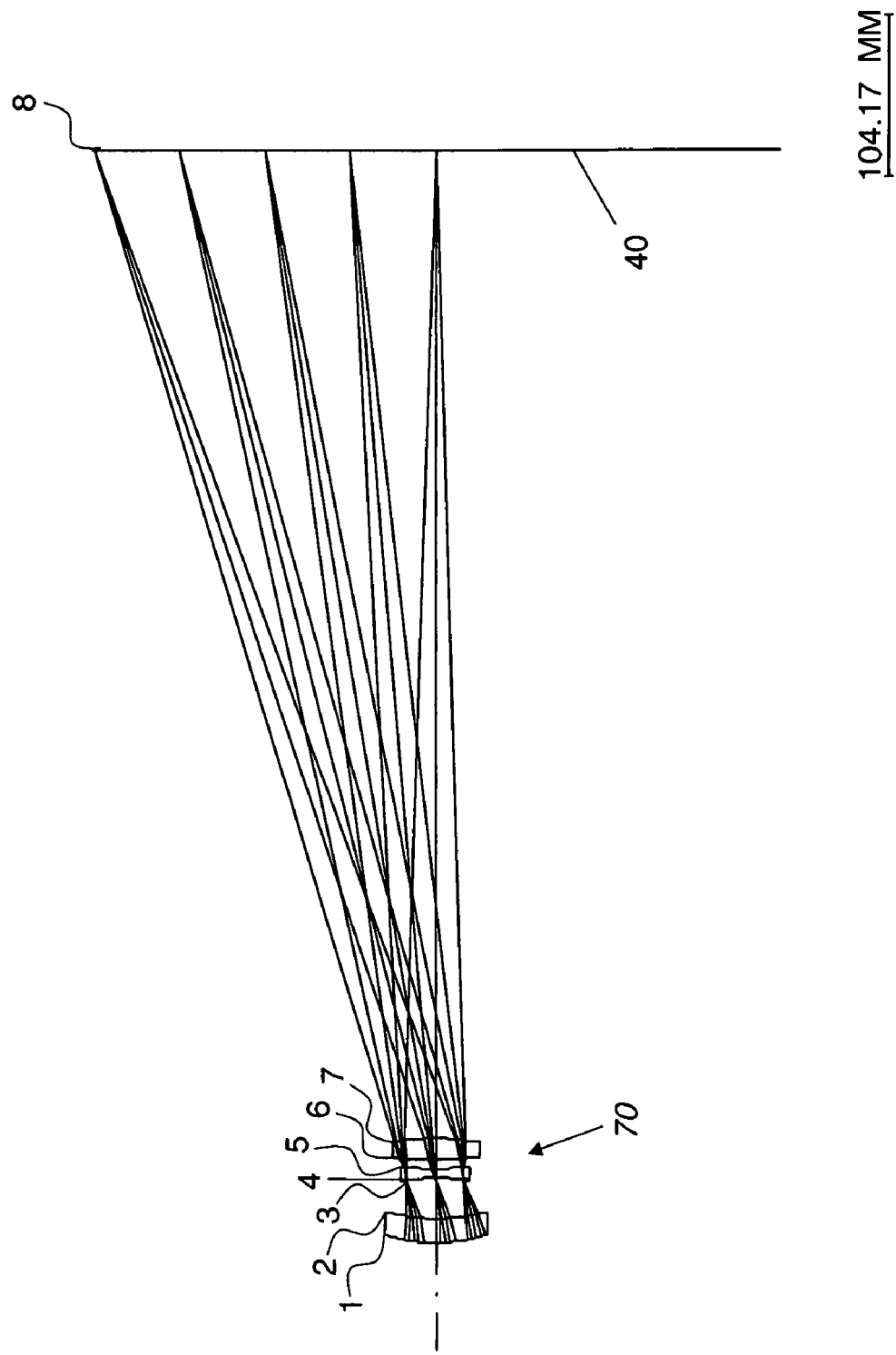
FIG. 8 is a side view showing a projection lens for use in the apparatus of the present invention.
Figure 9:
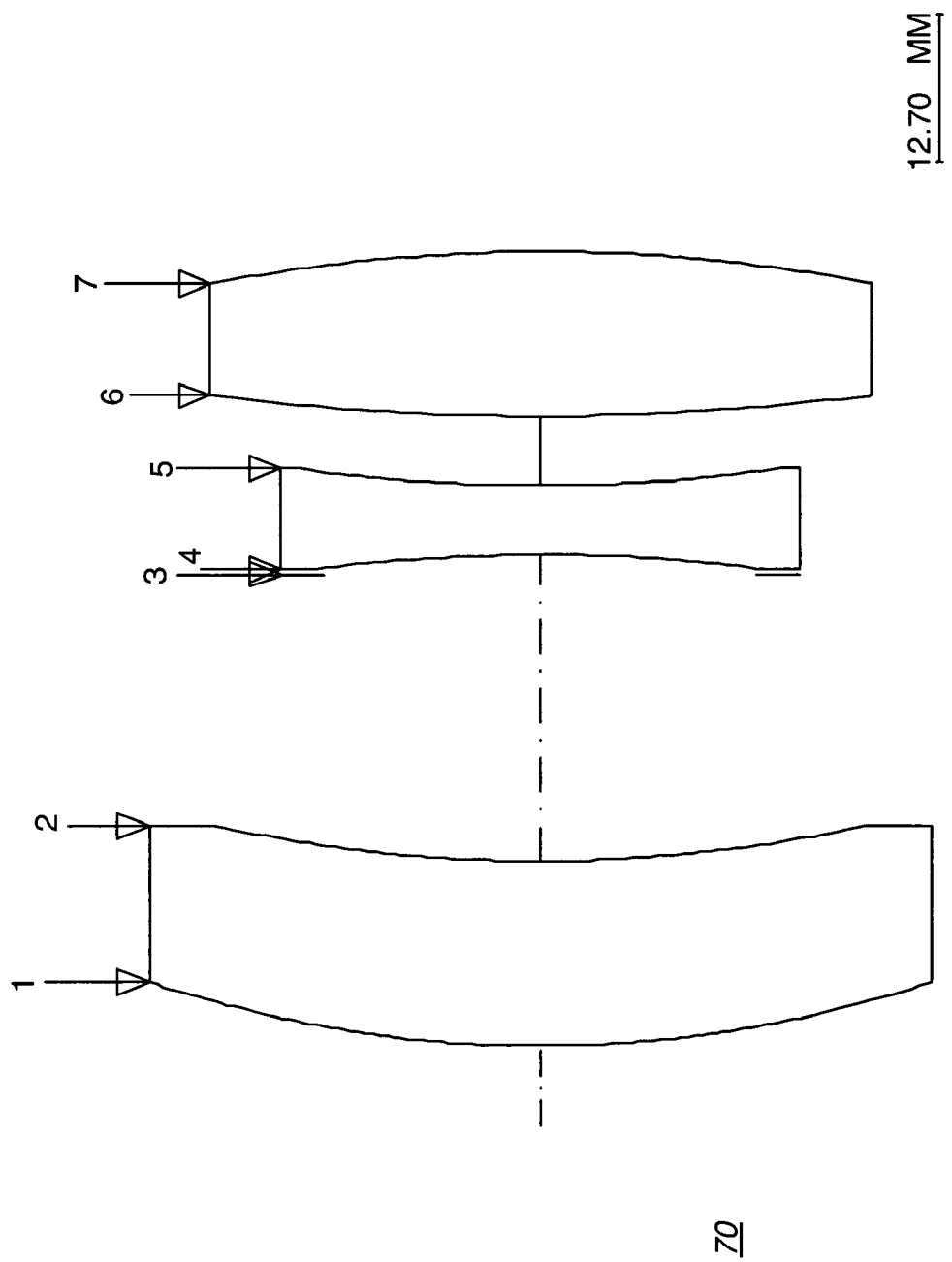
FIG. 9 is a side view of projection lens components in one embodiment of the present invention.

With the embodiment of FIGS. 2-4, projection lens 70 shown in FIG. 8 has component lenses that are fairly large in diameter. In order to suitably capture all of the light in the modulated color beams, the lens diameter of the first lens element (left-most in the arrangement of FIG. 9) may be approximately the same as the diagonal of spatial light modulator 60r, 60g, 60b. While this can be difficult for conventional glass optics, it should be noted that although the size of the lens components and modulator increases, the optical power of the elements and the required optical surface quality decreases. Thus, thin conventional glass or plastic optics may be more easily fabricated, perhaps even by molding. Fresnel optics, diffractive optics, gradient index, and reflective optics may be considered for this application.

Figure 10:
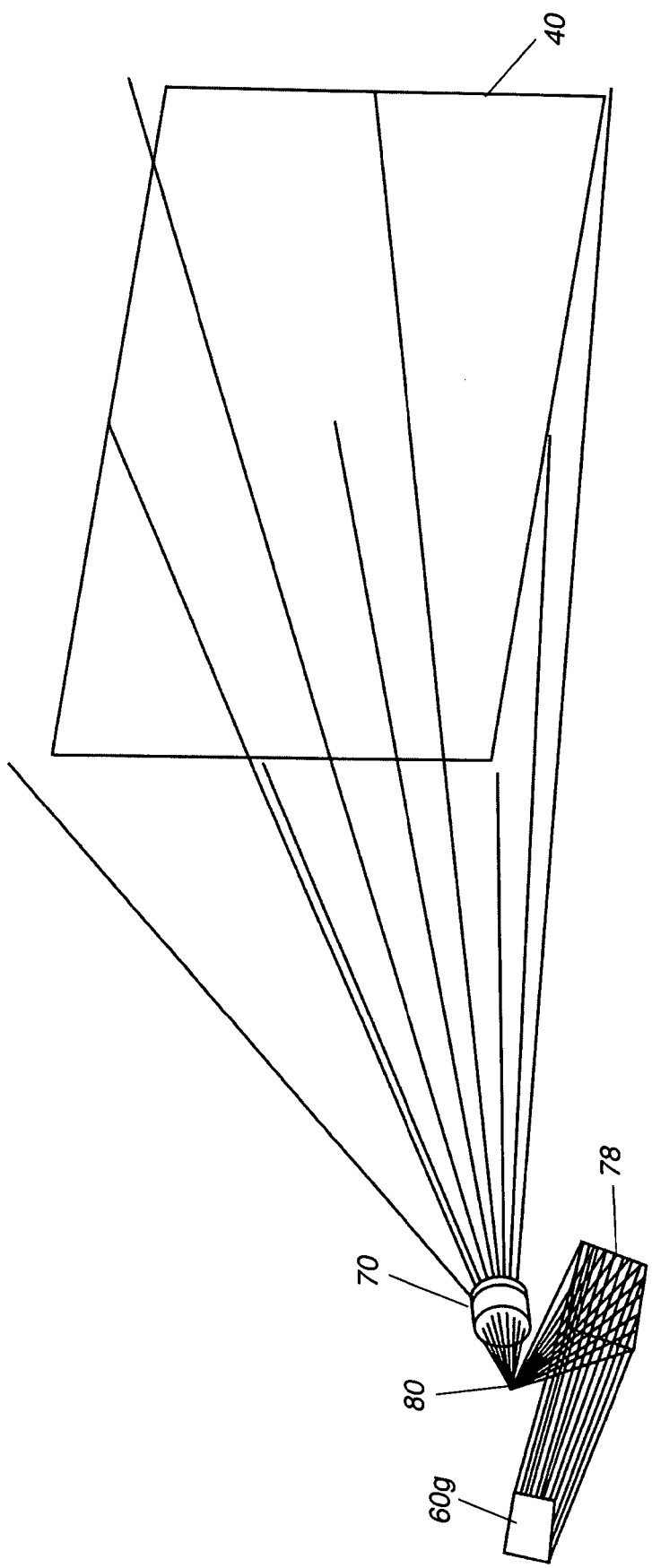
FIG. 10 is a perspective view showing an alternate arrangement of components in the modulated light path according to one embodiment of the present invention, using a pair of reflective surfaces.
Figure 11:
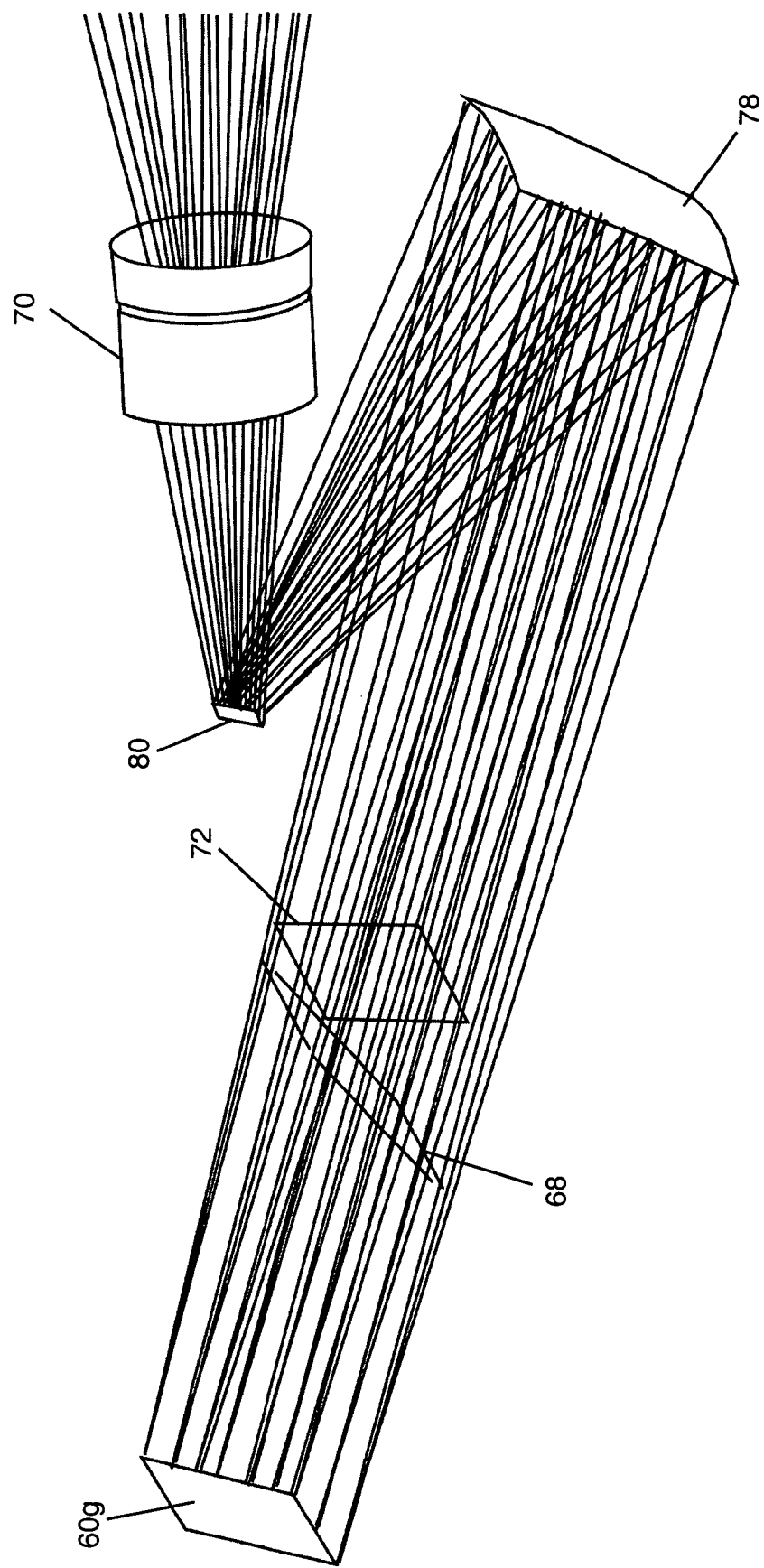
FIG. 11 is a closer perspective view from a different angle than that of FIG. 10, showing an alternate arrangement of reflective surfaces in the modulated light path according to one embodiment of the present invention.
Figure 12:
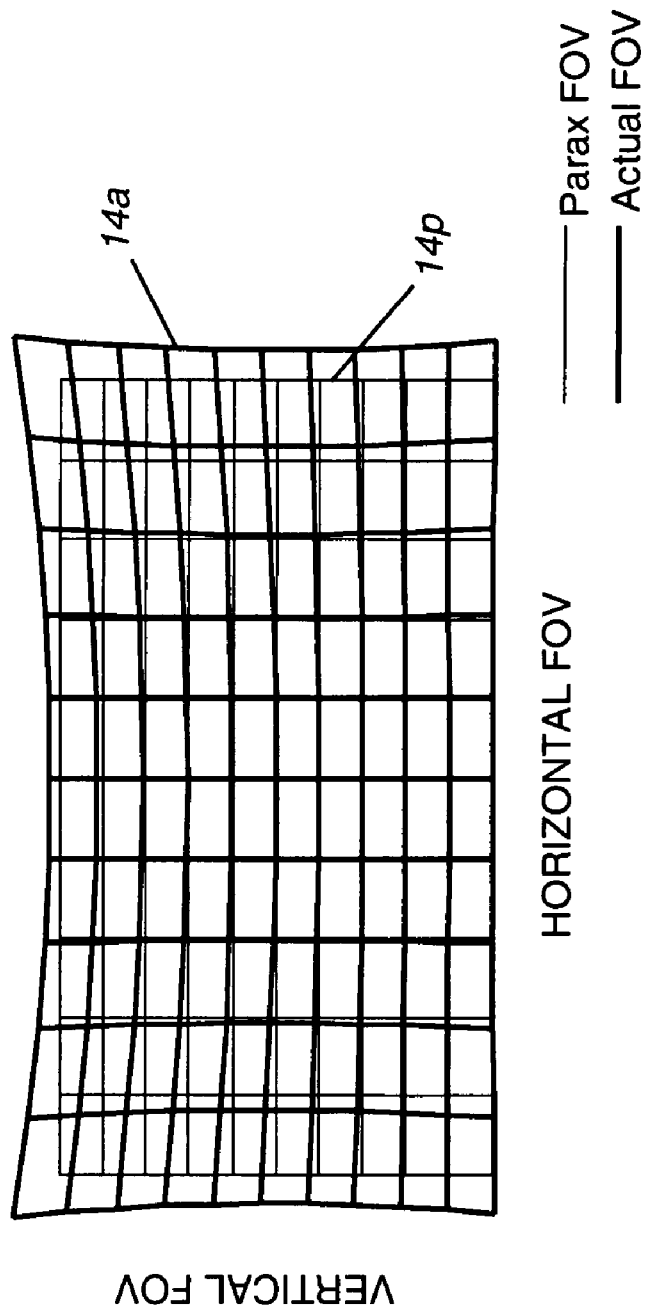
FIG. 12 is a plan view showing distortion of the field of view when using reflective surfaces.

An example embodiment using reflective components is shown in the embodiments of FIGS. 10 and 11. These use reflective optics to fold and concentrate the multicolor modulated color beam obtained from spatial light modulator 60g and from spatial light modulators 60r and 60b (not shown in FIGS. 10 and 11) using dichroic surfaces 68, 72 to recombine this light onto a single output axis. As noted earlier, reflective surfaces are advantaged because they do not exhibit lateral or axial color. They do, however, exhibit other errors such as the non-symmetric distortion shown in FIG. 12. A first curved reflective surface 78 shown in FIG. 11 redirects the multicolor modulated color beam toward a second curved reflective surface 80. Using this configuration, second curved reflective surface 80 can be positioned at the focal plane of projection lens 70 or can be used to fold the optical path. In the embodiment shown, first curved reflective surface 78 is concave, second curved reflective surface 80 is convex. Either or both first and second reflective surfaces 78, 80 can be aspherical. First reflective surface 78 can be toroidal to help reduce distortion along both major axes. FIG. 12 shows distortion over the vertical and horizontal fields of view, comparing an actual image 14a with the more ideal paraxial image 14p. Various types of coatings could be used to provide a reflective surface, including dichroic coatings.

Another advantage of the arrangement shown in FIGS. 10 and 11 relates to polarization. Where further polarization is helpful, this arrangement allows the addition of a single polarizing element, such as a wire grid polarizer, instead of requiring a polarizing element in each color channel, when separate projection lenses are used.

In addition to adding components in the optical path, changes to the color profile might be advantageous in some embodiments. For example, while FIGS. 2, 3, and 13 show projection apparatus 50 using the conventional set of red, green, and blue component colors, other arrangements are possible, including the use of additional colors, to provide an enhanced color gamut, with the corresponding changes for incorporating these colors into the optical path. Or, different component colors could be used to form the projected color image.

Figure 1A:
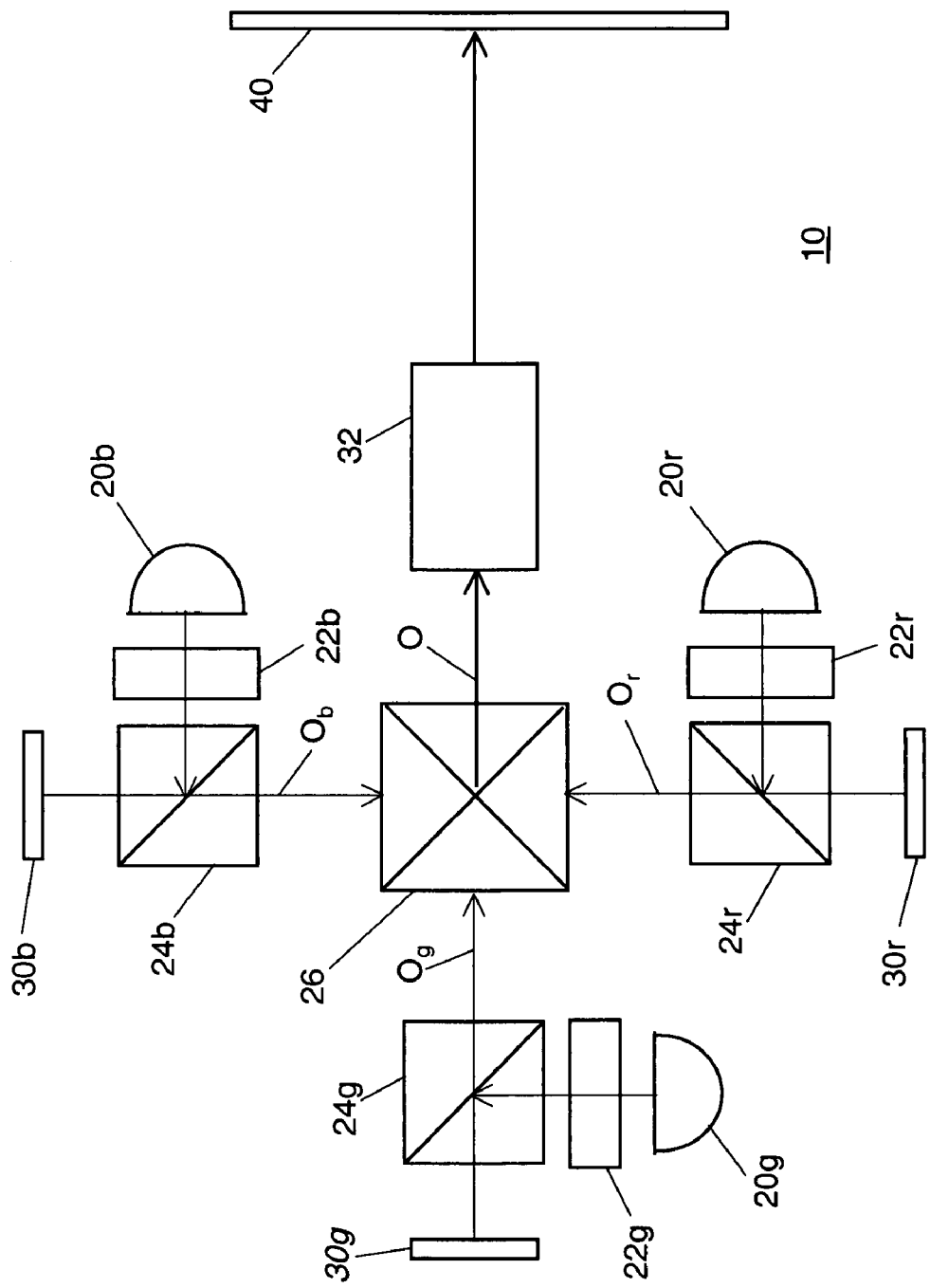
FIG. 1A is a block diagram showing a conventional projection apparatus using LCOS LCD devices.

By comparison with the conventional projection apparatus 10 in FIG. 1A, the arrangement of projection apparatus 50 in FIG. 2 and following provides a system capable of considerably higher brightness levels. Where spatial light modulators 30r, 30g, and 30b of the conventional arrangement in FIG. 1A are miniaturized LC devices, the Lagrange invariant and energy-carrying capacity of these devices constrains the amount of brightness that is available to a range from about 5,000 to no more than about 25,000 lumens. In contrast, the embodiments of FIG. 2 and following enjoy an expanded luminance range, allowing projection well in excess of 30,000 lumens to as much as 70,000 lumens or more.

Multiple Projection Lens Embodiments

Figure 18:
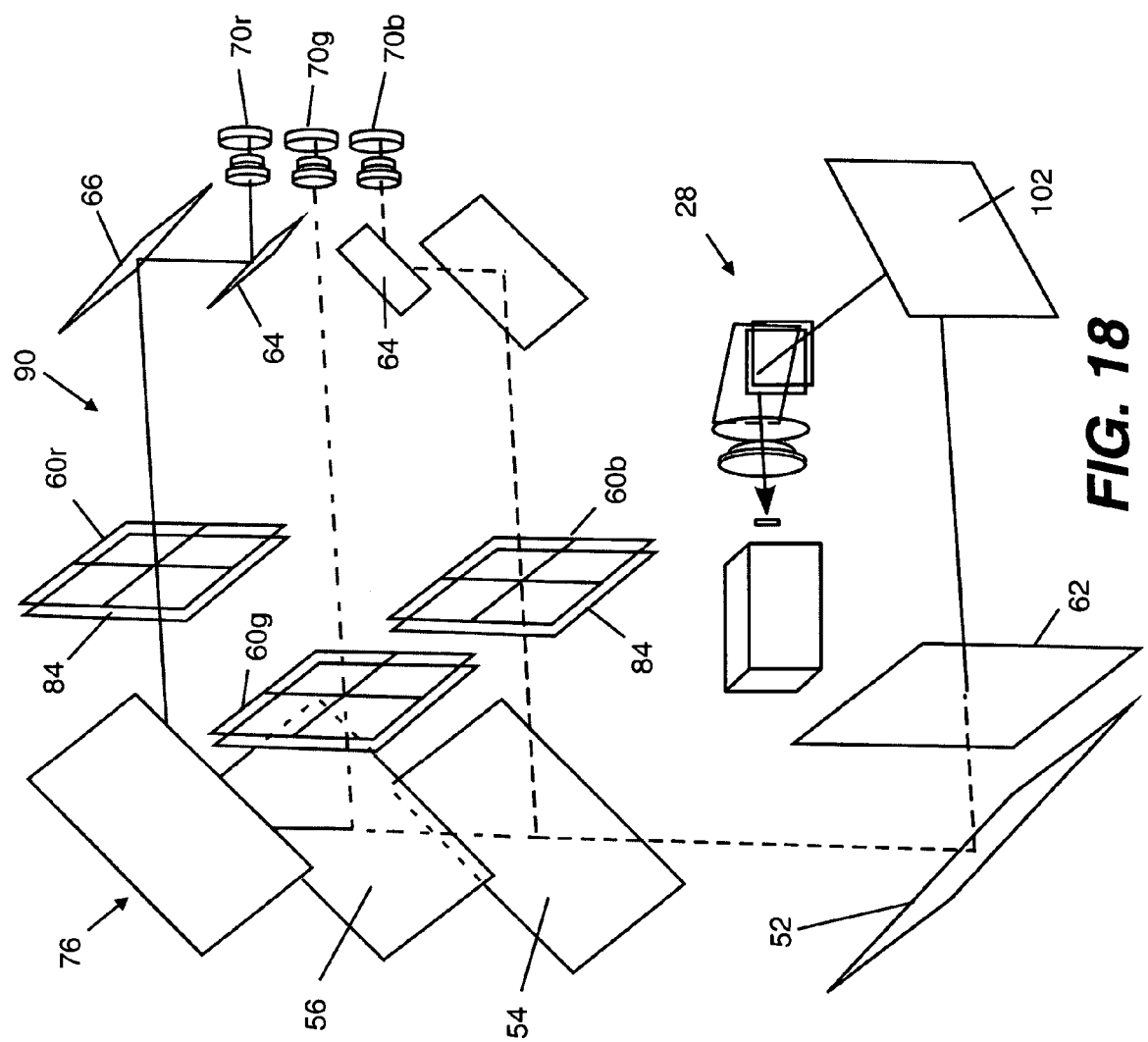
FIG. 18 is a perspective view of components in an embodiment of the present invention according to the three-projection lens model of FIG. 17.
Figure 19A:
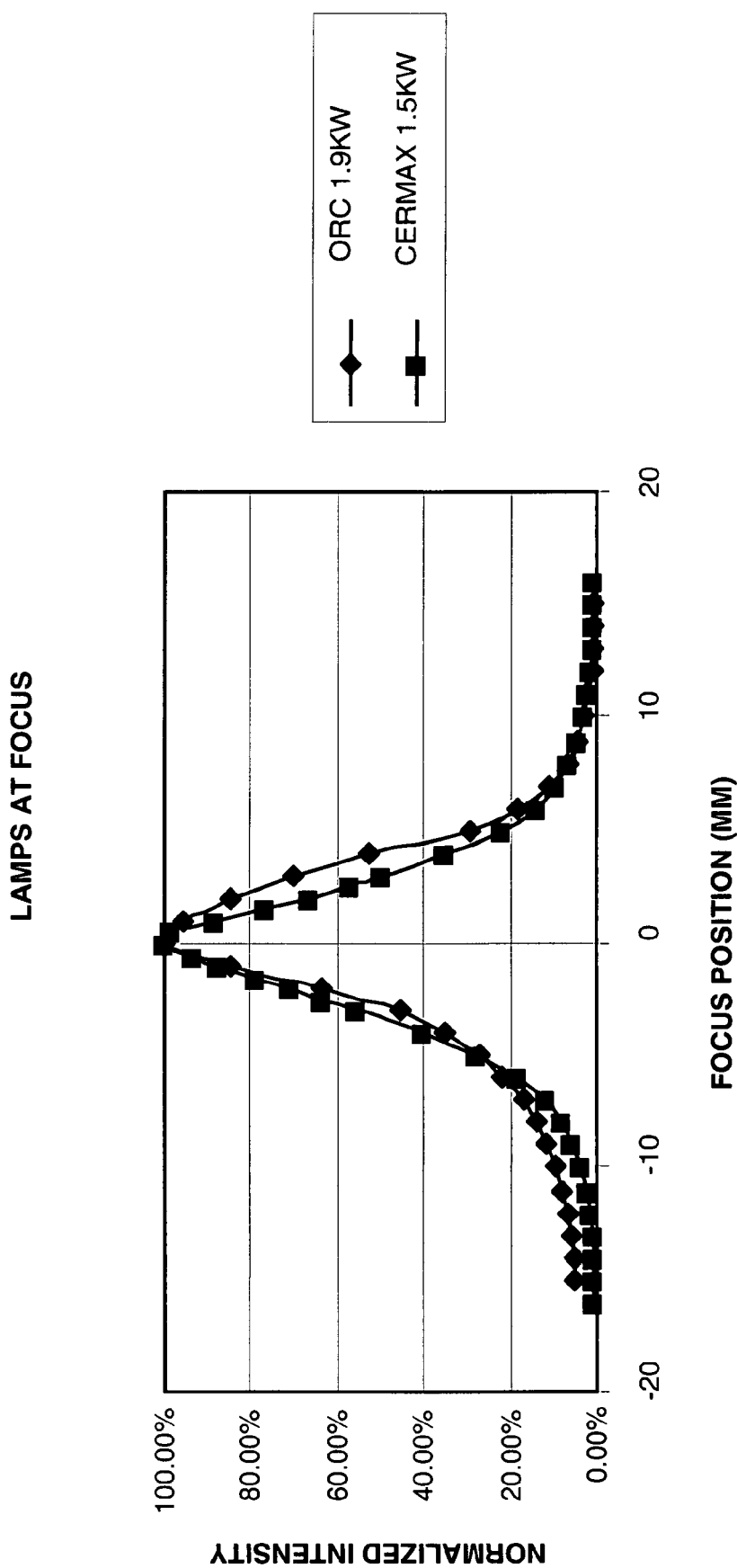
FIGS. 19A, 19B, 19C, and 19D are graphs that compares intensities and other characteristics of two different lamp types that could be used.
Figure 19B:
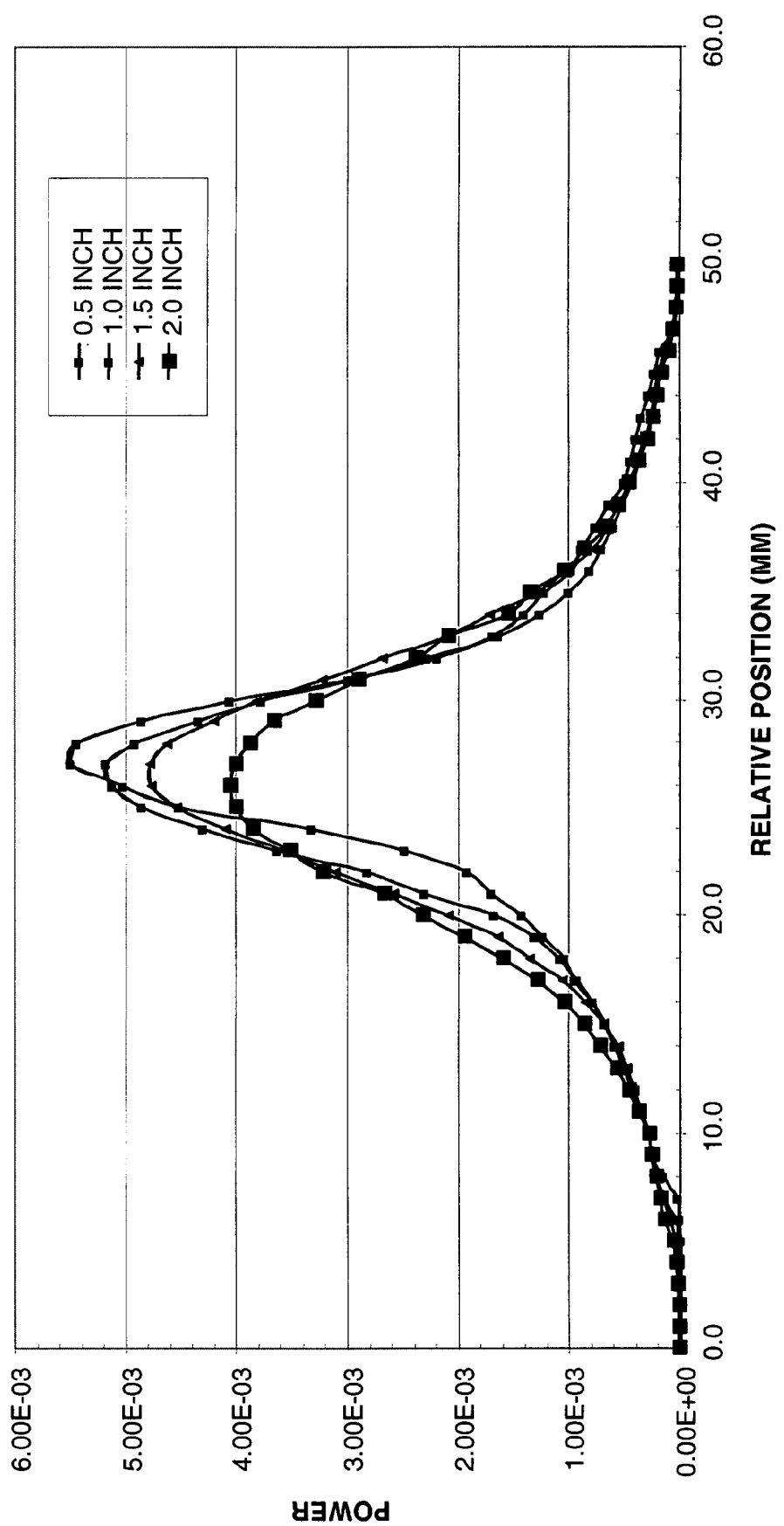
Figure 19C:
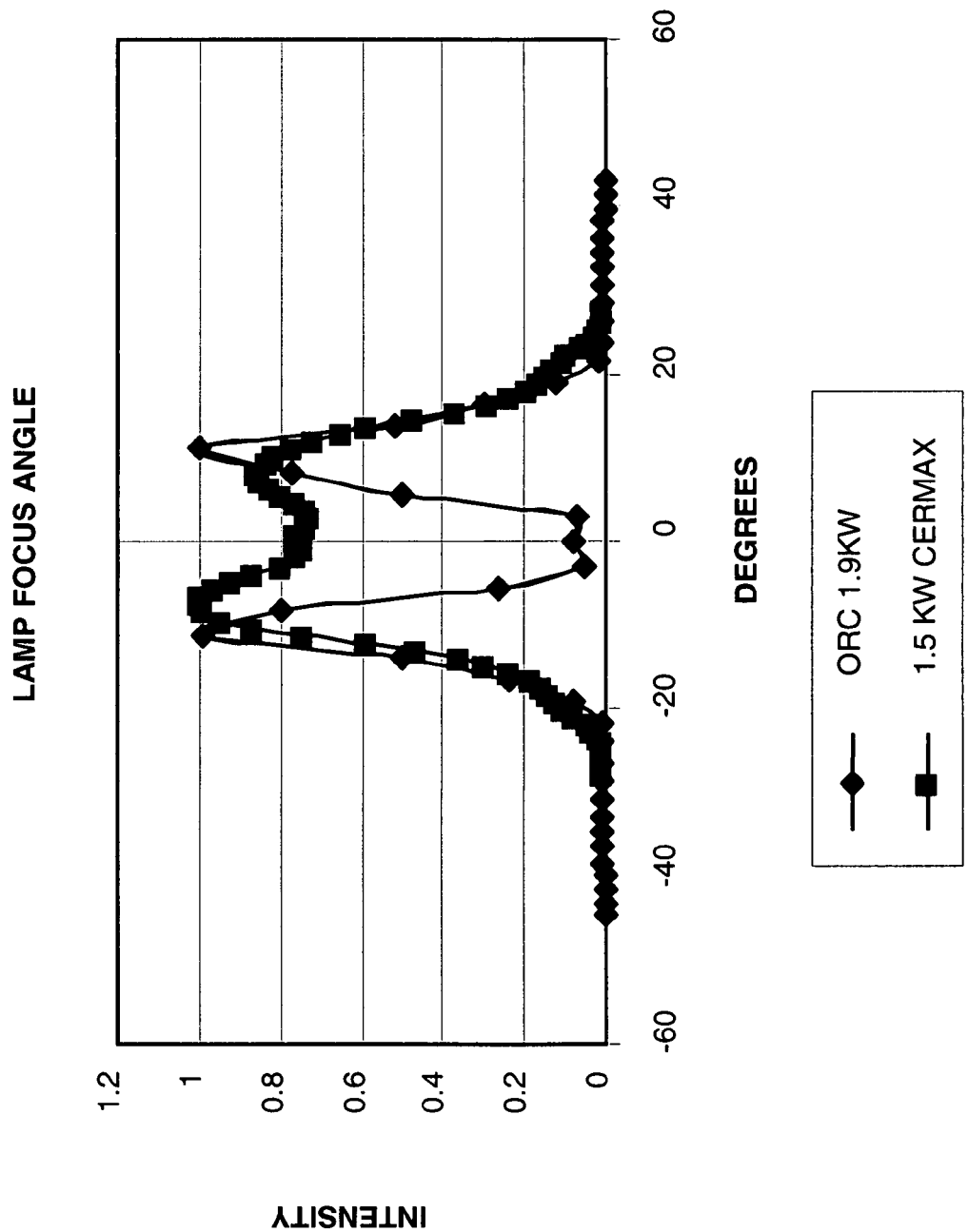
Figure 19D:
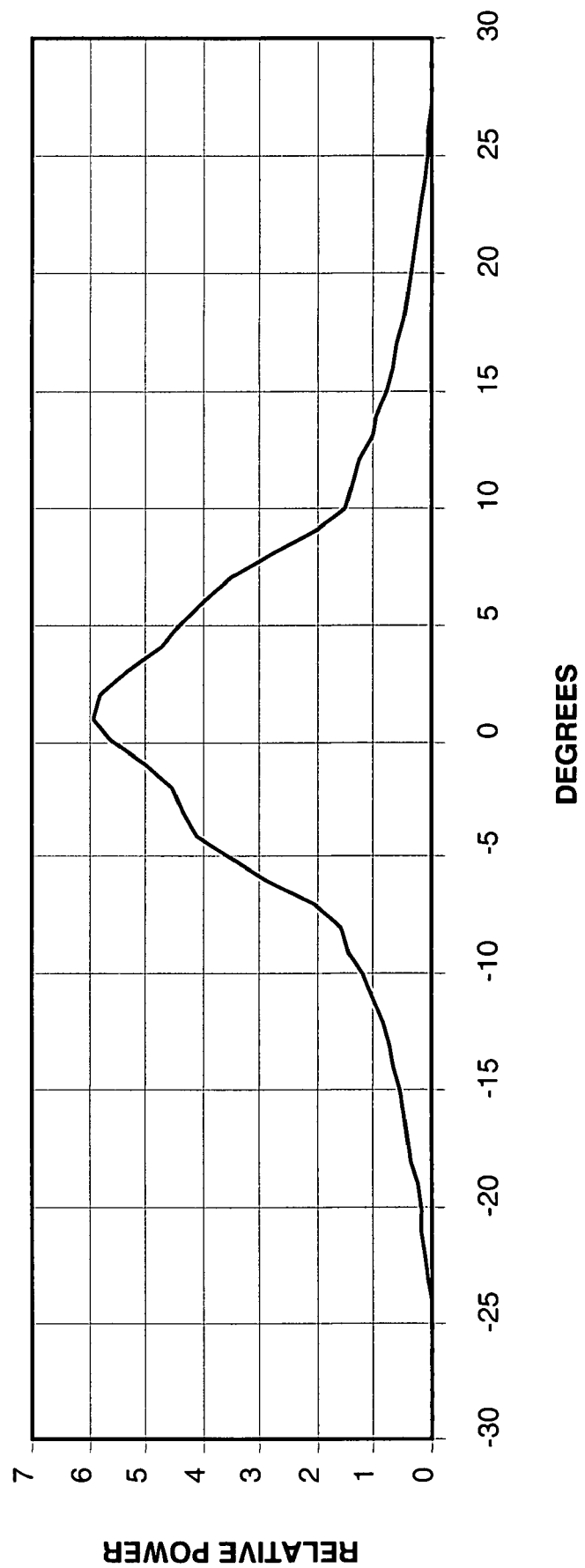

Referring to FIG. 17, there is shown an embodiment of projection apparatus 50 using separate projection optics for each color channel. Projection lenses 70r, 70g, and 70b are provided for red, green, and blue color channels, respectively. There is also an additional lens 84 in each color channel for condensing light for each projection lens 70r, 70g, and 70b. The perspective view of FIG. 18 shows an arrangement of optical components in one embodiment. This embodiment is advantaged in that the required lens elements are not very large and are fairly simple to manufacture, providing a cost advantage compared to projection lenses in microdisplay systems. While alternate configurations of multiple projection lenses can be made, such as horizontal and circular, the vertical orientation has the advantage of being able to utilize a single anamorphic lens to change the aspect ratio of projection. Digital cinema application sometimes has format differences ranging from 1.85 to 2.39 for particular pictures. Therefore, the picture format may not match the format of the modulators. Often, letter-boxing is used to obtain the different aspect ratio, however, valuable pixels can be lost in using such an approach. This can be corrected optically by the use of an anamorphic lens, whereby one axis of the image is magnified more than its respective orthogonal axis. The vertical arrangement of the multiple projection lenses in the preferred embodiment allows for the implementation of a single anamorphic lens attachment (cylindrical lenses) to stretch or shrink the wide proportion of the image.

Since the spatial light modulators 30 can be large, the multiple projection lenses would naturally be spatially separated by a significant amount, if the optical axis of the modulators were directed straight out of the projector. These spatially separated projection lenses would be a disadvantage in that they would cause parallax error in the image, as well as, require either multiple anamorphic lens attachments or a very large singular attachment. Similarly, the mechanics to maintain and adjust focus for all three lenses together would grow. In the preferred embodiment, a periscopic mirror arrangement 152 as shown in FIG. 26 is utilized to minimize the distance between the lenses. This mirror arrangement is further advantaged by allowing a rotational mirror alignment to control the lateral image alignment of the panels to each other without rotation of the actual panel image.

Because of polarization recovery, the projection lens must capture a cone of light in the horizontal direction that is twice as large as that needed in the vertical direction. The simplest method of manufacturing a projection lens that would capture all of the light would be to build it with rotational symmetry so that the f/# of the lens is sufficient to capture the fastest cone from the illumination system in all directions. The illumination beam would simply underfill the lens in the vertical direction.

There are less obvious reasons for considering a projection lens that has a different f/# in the two orthogonal directions. This could be accomplished by placing an elliptical aperture stop in the projection lens. One advantage for doing this would be that the smaller aperture in the vertical direction would help to eliminate stray light and would therefore potentially improve the system contrast. Another advantage for a slower f/# in the vertical direction is that the projection lens clear apertures become smaller in that direction and allows the possibility of slabbing off upper and lower segments of the projection lenses; accordingly, allowing the lenses to be mounted closer to one another, thereby, reducing the effects of parallax from three separated projection lenses.

Stereoscopic Projection

There is considerable interest in obtaining stereoscopic, or so-called "3-D" projection for cinema-based projection, particularly with the advent of digital projectors in theatres. The highest quality stereoscopic systems use different polarization states for left and right eyes, with appropriately designed glasses used by the viewer to transmit and block light according to its polarization. Typically, left- and right-handed circular polarization states are used for the two different views. The LC conversion device, that rotates the polarization state of the light exiting the projector, is better able to handle the full spectrum with chromatic artifacts by working with these two polarization states. Large panel LC projection is advantaged in this application in that the light exiting the imaging system is already polarized in a particular state by the nature of LC modulation. Thus a conversion device may be incorporated with or within the projection lens to convert the output state of polarization to the correct state for each eye on a time sequential basis. This system is brightness advantaged over a DMD-based system that must polarize the light before doing this conversion. Currently, large screen digital 3-D projection has been only shown at 5 ft lamberts, which is substantially lower than the 14 ft lamberts standardized for conventional digital cinema projection. Clearly current systems are not meeting the best imaging performance that can be delivered by this high etendue system.

Figure 16:
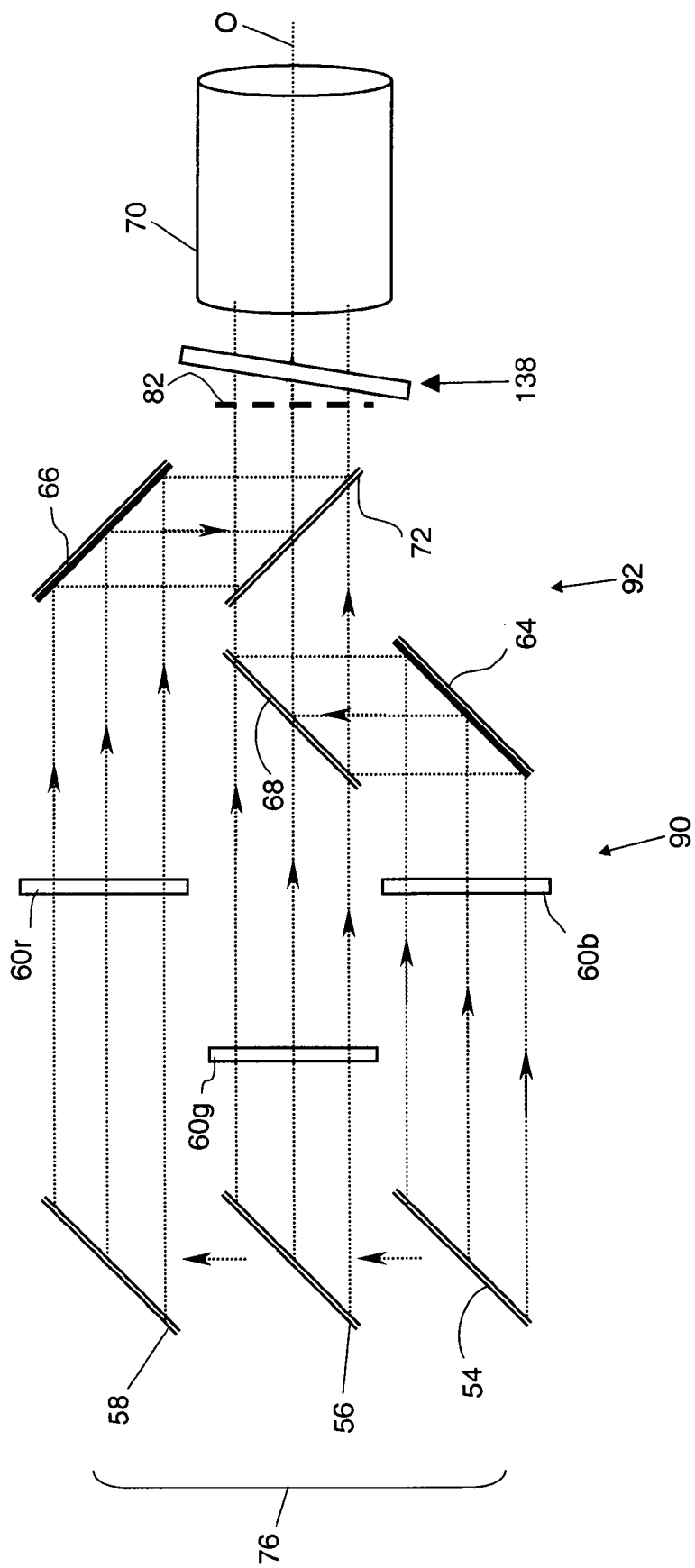
FIG. 16 is a block diagram showing the optional position for an analyzer.

Referring to FIG. 16, a polarization converting device 82, such as the ALPS™ device from Colorlink, Boulder, Colo., can be placed on the output side of the imager following the "clean up" analyzer. In the case of a single lens system, the polarization converting device 82 needs to be achromatized for all color bands. In the three projection lens approach of FIG. 17, three separate polarization converting devices (rotating the polarization state for left and right eyes) can be used. This alternate arrangement simplifies the structure of the polarization converting device so that it only needs achromatic performance over a smaller band potentially enabling linear polarization to be utilized. Linear polarization has a cost advantage, since it requires a polarizer without retardation materials, unlike the circular polarization viewing glasses that are typically used.

Figure 24:
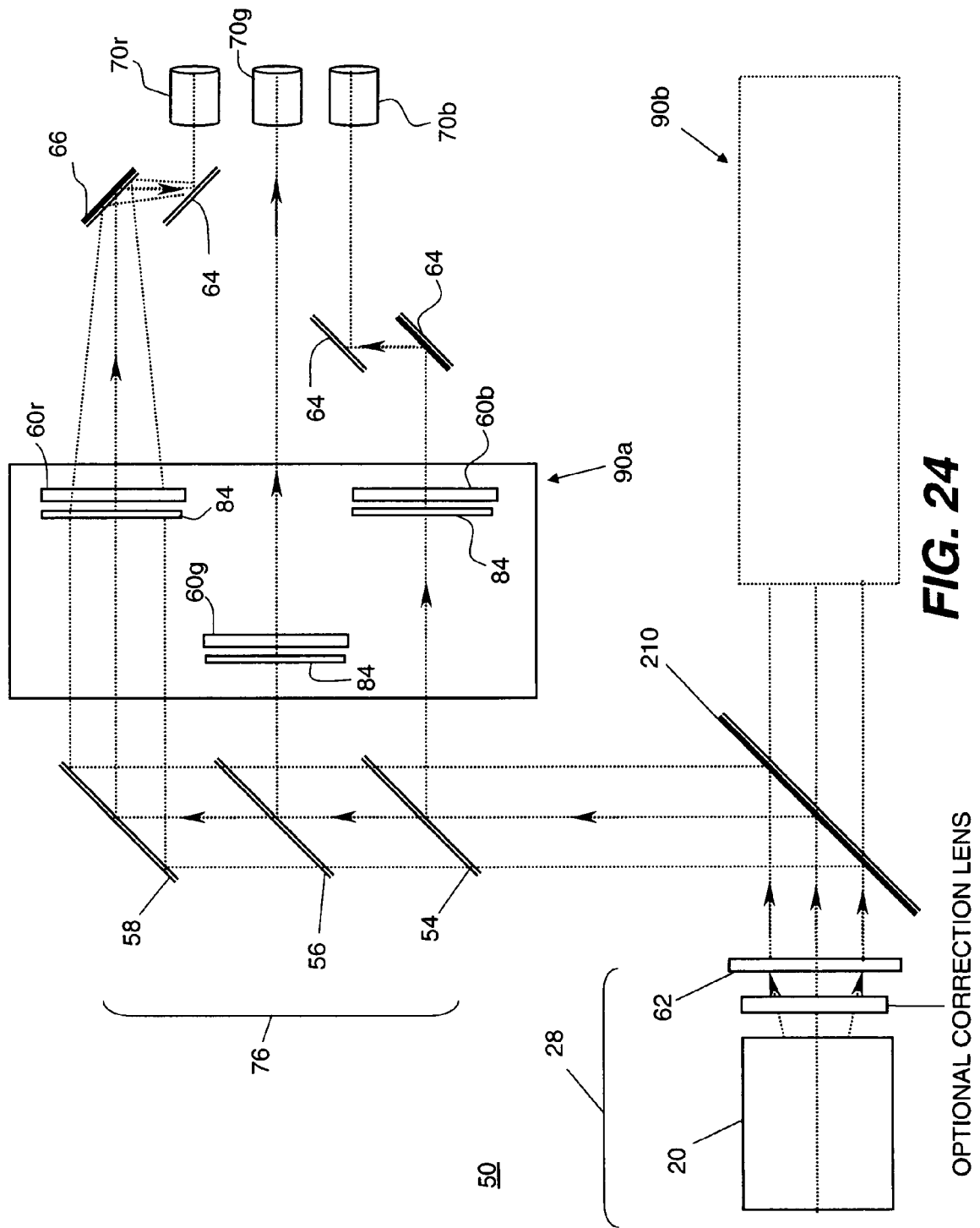
FIG. 24 shows a stereoscopic embodiment whereby the two linearly polarized light paths are separated into paths for projection for each eye.

Another stereoscopic embodiment employs linearly polarized light, where light for the left eye is again orthogonally polarized with respect to light for the right eye, and separate LC panels are used for left- and right-eye images, as shown in FIG. 24. A polarization beamsplitter 210 directs one polarization to a first color modulation section 90a and the orthogonal polarization to a second color modulation section 90b, represented only in outline in FIG. 24; in practice, second color modulation section 90b would have the same component arrangement as is used for first color modulation section 90a. With this arrangement, the two separate states of polarization can be projected to the eyes simultaneously, without perceptible flicker between the eyes that occurs where there are alternating dark states for each eye. Additionally, motion artifacts would be reduced by the use of separate LC panels for each eye, because the panels would not need to be driven twice as fast, as with a single panel implementation. Correspondingly, a half wave plate is used on one of the projection channels (left or right eye) to rotate the polarization such that both optical paths are identical, up to the modulating LC panel, using the same preferred states of polarization into the optics and LC devices. For example, instead of using a polarization recovery scheme to rotate the illumination polarization to a single state, each orthogonal polarization state could be used to deliver illumination to a set of large TFT panels, each set for viewing by a single eye. The half-wave plate is used prior to the panels so that the polarization states into the panels are the same. On the imaging side, another half-wave plate is required to rotate the polarization state for one panel, so that each eye sees light of an orthogonal polarization state.

An alternative to using polarization to provide the varied information between the left and right eye is to employ shifted spectral points. In this case, the illumination source for each eye can have spectral shift occur in a sequential manner, whereby the viewer wears a device that only allows the preferred spectrum into the individual eye. Another option would be to provide a separate set of LC panels for each eye, whereby the illumination is directed to the appropriate set of panels. In either case, it would be important to properly color balance each eye such that the white points substantially match.

With its capability for using brighter light sources and use of a large-area image generator, projection apparatus 50 using TFT LC modulator panel 60r, 60g, 60b as in FIG. 2 and following offers an overall efficiency on the order of 40-50%. This is in contrast to the typical efficiency of earlier LCOS LCD designs, shown in FIG. 1A, where, as noted earlier, much lower efficiencies are common. Moreover, projection apparatus 50 of the present invention provides higher brightness, operating at higher etendue, than with conventional projector designs, in contrast with the general principle that increased etendue results in a more complex and costly optical design.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, alternative types of more recently introduced TFT components can be used, including organic thin-film transistors (OTFTs) based on conjugated polymers, oligomers, or other molecules and thin film transistors utilizing monolayers of well-dispersed single-wall carbon nanotubes. Spatial light modulators could use liquid crystal technology for light modulation or could use the recently developed Magneto-Photonic Crystal (MPC) devices that modulate light using the Faraday effect. Thus, what is provided is an apparatus and method for an electronic projection apparatus using a TFT LC panel for forming the projection image.

| PARTS LIST | |
|---|---|
| 10. | Projection apparatus |
| 12. | Uniformizing optics |
| 14a, 14p, 14r, 14g, 14b. | Image |
| 20. | Light source |
| 20r, 20g, 20b. | Light source, red; light source, green; light source, blue |
| 22. | Uniformizing element |
| 22r, 22g, 22b. | Uniformizing element, red; Uniformizing element, green; Uniformizing element, blue |
| 24r, 24g, 24b. | Polarizing beamsplitter, red; Polarizing beamsplitter, green; Polarizing beamsplitter, blue |
| 26. | Dichroic combiner |
| 28. | Illumination source |
| 30r, 30g, 30b. | Spatial light modulator, red; Spatial light modulator, green; Spatial light modulator, blue |
| 32. | Projection lens |
| 34. | Polarizer |
| 36. | Polarizing beamsplitter |
| 38. | Illumination beam |
| 40. | Display surface |
| 42. | Half-wave plate |
| 44. | Coating |
| 48r, 48g, 48b. | Polarizer |
| 50. | Projection apparatus |
| 52. | Cold mirror |
| 54, 56. | Dichroic surface |
| 58. | Reflective surface |
| 60r, 60g, 60b. | Spatial light modulator |
| 62. | Telecentric lens |
| 64, 66. | Mirror |
| 68. | Dichroic surface |
| 70, 70r, 70g, 70b. | Projection lens |
| 72. | Dichroic surface |
| 76. | Color separator |
| 78, 80. | Reflective surface |

-continued

PARTS LIST

| | |
|---|---|
| 82. | Polarization converting device |
| 84. | Fresnel Field Lens |
| 90, 90a, 90b. | Color modulation section |
| 92. | Color combiner |
| 94. | Half wave plate |
| 96. | Polarizer |
| 98. | Mirror |
| 102. | Mirror |
| 118. | LC modulator panel |
| 120. | LC material |
| 122. | Thin-Film Transistor |
| 124. | ITO layer |
| 126. | Glass |
| 128. | Polarizer |
| 130. | Compensation film |
| 132. | Color filter array |
| 134, 136. | Antireflection coating |
| 137 | Tilted Polarizer |
| 138 | Dither Plate |
| 139 | Frictionless Flexture Pivot Bearings |
| 140 | Media Electronics |
| 141 | Power Supply |
| 142, 143 | windows |
| 146 | Optional Diffusion Layer |
| 147, 148 | Antireflection Coatings |
| 150 | Dust Seals |
| 152 | Periscopic mirror arrangement |
| 180. | Bubble lamp |
| 182. | Arc gap |
| 184. | Reflector |
| 186. | Focus |
| 188. | Image |
| 190, 190r, 190g, 190b. | LED array |
| 192. | Polarization beamsplitter array |
| 194. | Waveplate |
| 196. | Heat sink |
| 198. | Chip substrate |
| 200. | LED |
| 202. | Polarization beamsplitter |
| 204. | Illumination relay |
| 206. | Spot |
| 208. | Intensity curve |
| 210. | Polarization beamsplitter |
| 250r, 250g, 250b. | Color channel |
| O, $O_r$, $O_g$, $O_b$. | Optical axis |

The invention claimed is:

1. A digital cinema projection apparatus comprising:
 a) an illumination source having a first etendue value for providing polarized polychromatic light;
 b) a first lens element in the path of the polarized polychromatic light for forming a substantially telecentric polarized polychromatic light beam;
 c) a color separator for separating the telecentric polarized polychromatic light beam into at least two telecentric color light beams;
 d) at least two transmissive spatial light modulators that modulate the two telecentric color light beams and form at least two modulated color beams,
 wherein there is an etendue value associated with each spatial light modulator, and wherein the etendue value is within 15% or greater than the first etendue value corresponding to the illumination source;
 e) a color combiner for combining the modulated color beams along a common optical axis, forming a multicolor modulated beam thereby; and
 f) a projection lens for directing the multicolor modulated beam toward a display surface.

2. The apparatus of claim 1 wherein the first spatial light modulator has an active surface diagonal of greater than about 5 inches.

3. The apparatus of claim 1 wherein the multicolor modulated beam exceeds 5,000 lumens.

4. The apparatus of claim 1 wherein the first lens element comprises a Fresnel lens.

5. The apparatus of claim 1 further comprising a second lens element in the path of at least one modulated color beam.

6. The apparatus of claim 1 further comprising a first compensator in the path of at least one modulated color beam.

7. The apparatus of claim 6 further comprising a first polarization analyzer disposed between the first compensator and the projection lens.

8. The apparatus of claim 6 further comprising a second compensator in the path of at least one telecentric color light beam.

9. The apparatus of claim 1 further comprising a polarization rotator in the path of at least one modulated color beam.

10. The apparatus of claim 1 further comprising an uniformizer optically coupled to the illumination source.

11. The apparatus of claim 1 wherein the illumination source comprises an element taken from the group consisting of an LED, an LED array, a Xenon lamp, a laser and a Mercury lamp.

12. The apparatus of claim 10 wherein the uniformizer comprises a lenslet array.

13. The apparatus of claim 10 wherein the uniformizer comprises an integrating bar.

14. The apparatus of claim 1 wherein the illumination source further comprises a polarization rotation element for at least a portion of the illumination.

15. The apparatus of claim 1 further comprising a reflective color filter array that provides color recycling.

16. The apparatus of claim 1 wherein at least one spatial modulator is a transmissive thin-film transistor liquid crystal modulator.

17. The apparatus of claim 16 wherein the thin film transistors are organic thin film transistors.

18. The apparatus of claim 16 wherein the thin film transistors comprise carbon nanotubes.

19. The apparatus of claim 1 wherein the illumination source further comprises a wire grid polarizer.

20. The apparatus of claim 1 further comprising a polarizer in the path of at least one modulated color beam.

21. The apparatus of claim 20 wherein the polarizer is taken from the group consisting of an absorptive polarizer and a reflective polarizer.

22. The apparatus of claim 1 further comprising a diffuse reflective polarizer film in the path of the telecentric polarized polychromatic light.

23. The apparatus of claim 1 further comprising a dispersive optical component in the path of the first telecentric color light beam.

24. The apparatus of claim 1 wherein at least one transmissive liquid crystal spatial light modulator has a active surface diagonal of greater than about 10 inches.

25. The apparatus of claim 1 wherein at least one transmissive liquid crystal spatial light modulator is formed on a non-crystalline substrate.

26. The apparatus of claim 1 wherein the color separator further forms a third telecentric color light beam and the apparatus further comprises a third transmissive spatial light modulator in the path of the third telecentric color light beam and modulating the third telecentric color beam to form a third modulated color beam,
 and wherein the color combiner further combines the third modulated color beam with the first and second modulated color beams along the common optical axis, forming the multicolor modulated beam thereby.

27. The apparatus of claim 1 wherein at least one transmissive liquid crystal spatial light modulator comprises an anti-reflection coating.

28. The apparatus of claim 1 wherein optical path lengths between the illumination source and the at least two spatial light modulators differ.

29. The apparatus of claim 9 wherein the polarizer comprises a stacked polarizer.

30. The apparatus of claim 1 wherein the projection lens comprises an anamorphic lens.

31. The apparatus of claim 1 wherein at least one transmissive liquid crystal spatial light modulator comprises a dust barrier.

32. The apparatus of claim 1 wherein the illumination source comprises a bubble lamp.

33. The apparatus of claim 32 wherein the illumination source images the side profile of the bubble lamp.

34. The apparatus of claim 1 wherein the illumination source comprises at least two LEDs having a different spectral range.

35. The apparatus of claim 1 further comprising at least one dithering actuator taken from the group consisting of a motor, a piezo-electric actuator, and a solenoid.

36. The apparatus of claim 35 wherein the at least one dithering actuator tilts a plano glass plate.

37. The apparatus of claim 1 further comprising a blur filter in the path of at least one modulated color beam.

38. The apparatus of claim 1 further comprising a blur filter in the path of the multicolor modulated color beam.

39. The apparatus of claim 1 further comprising a rotating wedge in the path of the multicolor modulated color beam.

40. The apparatus of claim 1 further comprising a rotating plate in the path of the multicolor modulated color beam.

41. The apparatus of claim 40 wherein the rotating plate is tilted with respect to the common optical axis.

42. The apparatus of claim 1 further comprising a shutter in the path of the telecentric polarized polychromatic light.

43. The apparatus of claim 1 further comprising a concave curved reflective surface for redirecting the multicolor modulated beam toward a convex curved reflective surface.

44. The apparatus of claim 43 wherein the convex curved reflective surface is disposed near the focal plane of the projection lens.

45. The apparatus of claim 43 wherein the convex curved reflective surface is aspheric.

46. The apparatus of claim 43 wherein the concave curved reflective surface is toroidal.

47. The apparatus of claim 1 wherein at least one transmissive spatial light modulators is mounted as a single field-replaceable unit.

48. The apparatus of claim 35 wherein the at least one dithering actuator tilts a wire grid polarizer.

49. The apparatus of claim 1 wherein at least one transmissive spatial light modulator uses magneto-photonic crystal modulation.

50. The apparatus of claim 1 further comprises at least one periscopic mirror assembly to package the projection lenses closer together.

51. A digital cinema projection apparatus comprising:
a) an illumination source comprising a lens element for providing polarized telecentric polychromatic light at a first etendue value;
b) a spectral separator for separating the polarized telecentric polychromatic light beam into at least a first telecentric color light beam and a second telecentric color light beam;
c) a color modulation section comprising at least:
  i) a first transmissive spatial light modulator in the path of the first telecentric color light beam and modulating the first telecentric color beam to form a first modulated color beam;
  ii) a second transmissive spatial light modulator in the path of the second telecentric color light beam and modulating the second telecentric color beam to form a second modulated color beam,
wherein there is a second etendue value at the first spatial light modulator and wherein the second etendue value is within 15% of the first etendue value;
d) a color combiner for combining at least the first and second modulated color beams along a common optical axis, forming a multicolor modulated beam thereby; and
e) a projection lens coaxial to the common optical axis for directing the multicolor modulated beam toward a display surface.

52. The apparatus of claim 51 wherein at least one transmissive spatial light modulator uses magneto-photonic crystal modulation.

53. A digital cinema projection apparatus comprising:
a) an illumination source comprising a lens element for providing polarized telecentric polychromatic light;
b) a spectral separator for separating the polarized telecentric polychromatic light beam into at least a first telecentric color light beam and a second telecentric color light beam;
c) a color modulation section comprising at least:
  i) a first spatial light modulator in the path of the first telecentric color light beam and modulating the first telecentric color beam to form a first modulated color beam;
  ii) a second spatial light modulator in the path of the second telecentric color light beam and modulating the second telecentric color beam to form a second modulated color beam,
d) a color combiner for combining at least the first and second modulated color beams along a common optical axis, forming a multicolor modulated beam thereby;
e) a concave curved reflective surface for redirecting the multicolor modulated beam toward a convex curved reflective surface; and
f) a projection lens coaxial to the common optical axis for directing the multicolor modulator beam toward a display surface.

54. The projection apparatus of claim 53 wherein the convex curved reflective surface is disposed near the focal plane of the projection lens.

55. The projection apparatus of claim 53 wherein the convex curved reflective surface is aspheric.

56. The projection apparatus of claim 53 wherein the concave curved reflective surface is toroidal.

57. The projection apparatus of claim 53 wherein at least one transmissive spatial light modulator is a transmissive liquid crystal formed on a non-crystalline substrate.

58. The apparatus of claim 53 wherein at least one transmissive spatial light modulator uses magneto-photonic crystal modulation.

* * * * *